United States Patent
Adams et al.

(10) Patent No.: US 10,399,493 B2
(45) Date of Patent: *Sep. 3, 2019

(54) ELECTRONICS FOR REMOTELY MONITORING AND CONTROLLING A VEHICLE

(71) Applicant: HARTFORD FIRE INSURANCE COMPANY, Hartford, CT (US)

(72) Inventors: Isaac D. Adams, Canton, CT (US); Steven J. Fernandes, West Hartford, CT (US); Marc J. Natrillo, Avon, CT (US); Paul Brendan Olson, Hartford, CT (US); Pankaj Prakash, Rocky Hill, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,566

(22) Filed: Jul. 16, 2018

(65) Prior Publication Data

US 2018/0339653 A1 Nov. 29, 2018

Related U.S. Application Data

(63) Continuation of application No. 15/181,237, filed on Jun. 13, 2016, now Pat. No. 10,023,114, which is a
(Continued)

(51) Int. Cl.
*B60Q 9/00* (2006.01)
*G06Q 40/08* (2012.01)
(Continued)

(52) U.S. Cl.
CPC ............ *B60Q 9/00* (2013.01); *G06Q 40/08* (2013.01); *G07C 5/008* (2013.01); *G07C 5/0825* (2013.01); *G07C 5/0841* (2013.01)

(58) Field of Classification Search
CPC .......... B60Q 9/00; G06Q 40/08; G07C 5/008; G07C 5/0841; G07C 5/0825
See application file for complete search history.

(56) References Cited

U.S. PATENT DOCUMENTS 7,559,316 B2 * 7/2009 Matsushita ............... B60Q 1/44
                                                                                       123/525
8,140,358 B1 * 3/2012 Ling ....................... G06Q 40/08
                                                                                       705/4
(Continued)

*Primary Examiner* — Mohamed Barakat
(74) *Attorney, Agent, or Firm* — Volpe and Koening, P.C.

(57) ABSTRACT

A system and method configured to monitor use conditions of a vehicle and provide feedback to a user of the vehicle to maintain use within certain parameters is described. The description includes a plurality of sensors located proximate to the vehicle, each sensor configured to monitor at least one vehicle parameter, the plurality of sensors selected from an accelerometer, speed, temperature, mileage, oil level, oil pressure, run-time and location sensors, each sensor generating a signal encapsulating the monitored vehicle parameter and transmitting the generated signal to a control unit. The description includes a control unit that receives the generated signal from each of a plurality of sensors, the control unit including a memory that stores the received signal and selectively combines the received signal with other signals received from others of the plurality of sensors. The description includes a first transmitter coupled to the control unit capable of transmitting the combined signal. The description includes a second transceiver remote from the vehicle that receives a transmitted condition, and compares that condition to received conditions from other vehicles and provides feedback to adjust the use of the vehicle based on the comparison, and a user interface for providing feedback to a user including at least one of visual indication, audible indication, and physically altering the use of the vehicle. The description includes coupling of the plurality of sensors to the control unit with a controller area bus (CAN). The first transmitter may transmit over an RF network.

20 Claims, 34 Drawing Sheets

Related U.S. Application Data continuation-in-part of application No. 14/518,750, filed on Oct. 20, 2014, which is a continuation-in-part of application No. 14/145,142, filed on Dec. 31, 2013, said application No. 15/181,237 is a continuation-in-part of application No. 14/145,142, filed on Dec. 31, 2013, and a continuation-in-part of application No. 14/145,165, filed on Dec. 31, 2013, now abandoned, and a continuation-in-part of application No. 14/145,181, filed on Dec. 31, 2013, now abandoned, and a continuation-in-part of application No. 14/145,205, filed on Dec. 31, 2013, now abandoned.

(51) Int. Cl.
*G07C 5/08* (2006.01)
*G07C 5/00* (2006.01)

(56) References Cited

U.S. PATENT DOCUMENTS

| | | | |
|---|---|---|---|
| 9,758,145 B2 * | 9/2017 | Yoshikawa | B60W 30/182 |
| 2012/0072244 A1 * | 3/2012 | Collins | G06Q 10/10 |
| | | | 705/4 |
| 2012/0303254 A1 * | 11/2012 | Kirsch | G07C 5/0808 |
| | | | 701/123 |

* cited by examiner

Figure 5:
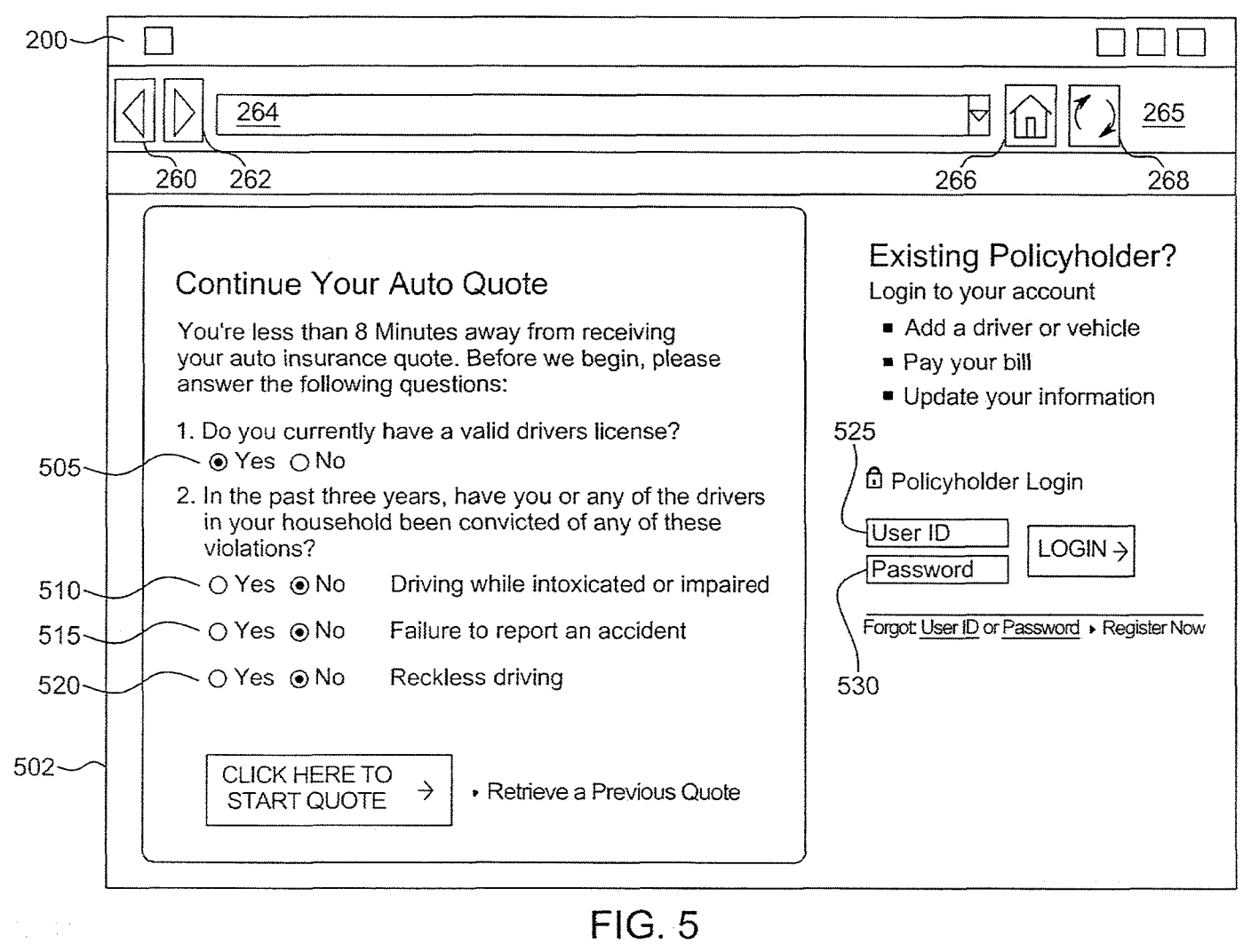

Continue Your Auto Quote

You're less than 8 Minutes away from receiving your auto insurance quote. Before we begin, please answer the following questions:

1. Do you currently have a valid drivers license?
   ● Yes  ○ No

2. In the past three years, have you or any of the drivers in your household been convicted of any of these violations?

○ Yes  ● No   Driving while intoxicated or impaired
   ○ Yes  ● No   Failure to report an accident
   ○ Yes  ● No   Reckless driving

[ CLICK HERE TO START QUOTE → ]   • Retrieve a Previous Quote

Existing Policyholder?
Login to your account
- Add a driver or vehicle
- Pay your bill
- Update your information 🔒 Policyholder Login

[ User ID ]
[ Password ]

[ LOGIN → ]

Forgot User ID or Password • Register Now

ELECTRONICS FOR REMOTELY MONITORING AND CONTROLLING A VEHICLE

CROSS REFERENCE TO RELATED APPLICATIONS

This application is a continuation of U.S. patent application Ser. No. 15/181,237, filed Jun. 13, 2016, which is a continuation-in-part of U.S. patent application Ser. No. 14/518,750, filed Oct. 20, 2014, which is a continuation-in-part of U.S. patent application Ser. No. 14/145,142, filed Dec. 31, 2013;

a continuation-in-part of U.S. patent application Ser. No. 14/145,142, filed Dec. 31, 2013;

a continuation-in-part of U.S. patent application Ser. No. 14/145,165, filed Dec. 31, 2013;

a continuation-in-part of U.S. patent application Ser. No. 14/145,181, filed Dec. 31, 2013;

and a continuation-in-part of U.S. patent application Ser. No. 14/145,205, filed Dec. 31, 2013, each of which are incorporated by reference as if fully set forth.

BACKGROUND

Motor vehicles are often used in a non-complaint manner. That is, motor vehicles are used beyond the rules and laws that define their use. Often operators of motor vehicles misrepresent or underrepresent how they use their motor vehicles. Sometimes such misrepresentations are intentional to enable the user to obtain certain benefits and to be able to use the vehicles outside the rules and laws. Other times, operators do not even realize how they operate the vehicle. As such, a need exists for electronics for remotely monitoring and controlling the use of a vehicle.

SUMMARY

A system and method configured to monitor use conditions of at least one vehicle and provide feedback to the vehicle to maintain use within certain parameters is described. The description includes a plurality of sensors located proximate to a vehicle and configured to monitor the use of the vehicle. The description includes sensors selected from an accelerometer, speed and location sensors, wherein each of the plurality of sensors sense at least one condition of the at least one vehicle. The description includes a control unit that is coupled to each of the plurality of sensors, the control unit including a memory that stores the sensed at least one condition from each of the plurality of sensors. The description includes a first transmitter coupled to the control unit capable of transmitting the sensed at least one condition and a second transceiver remote from the vehicle that receives a transmitted condition, and compares that condition to received conditions from other vehicles and provides feedback to adjust the use of the vehicle based on the comparison. The description includes coupling of the plurality of sensors to the control unit with a controller area bus (CAN). The first transmitter may transmit over an RF network.

Systems and methods are disclosed herein for determining driver signatures via feedback with the sensors. These driver signatures may be used to provide feedback to a driver to improve driving, for example. Users may identify the vehicles and identify the drivers of the vehicle. The systems and methods disclosed herein identify driver signature structures, based on sensor feedback about the use of the vehicle, which characterize how the vehicle is being driven. This sensor feedback may be used to identify the driver of the vehicle, such as by sensing the radio station, ignition key used, Bluetooth connectivity of a cellular device, acceleration patterns, sensed location and destination, and the like. Further, the sensor feedback may be used to provide feedback to a driver to adjust driving. This may include audible, visual, and other cues to alert the driver to alter patterns. The vehicle may also be controlled to apply the brakes, lower acceleration ability or other corrective action in order for the vehicle to be operated in a more compliant manner.

Systems and methods are disclosed for using sensors and information to determine the use of at least one autonomous feature on a vehicle. These include a computer memory that stores biographical information at least including information regarding the at least one autonomous feature; a processor that receives information from sensors associated with at least one of the vehicles, concerning use of the at least one vehicles and the at least one autonomous feature; the processor further configured to determine discrete segments of use by at least one vehicles, and to determine a driver signature associated with each of the discrete segments of use; and the processor further configured to provide feedback to the vehicle regarding use.

Assessing the use of a vehicle using sensors on the vehicle relative to the expected use of the vehicle and providing feedback to control the vehicle to adapt the use to the expected use is described. A system for assessing the use of a vehicle relative to the expected use of the vehicle is disclosed. The system comprising, a processor configured to generate a driver proxy score (DPS); the processor, configured to receive information associated with sensors, wherein the sensor feedback includes a plurality of use based information; the processor further configured to determine a driver telematics score (DTS) based on the information associated with the sensors; and the processor further configured to provide feedback to the vehicle based on the DPS and the DTS, which measures a variance of the sensors from the expected value.

The system may use sensor information gained by sensors on the vehicle to provide feedback such as the type of destination (e.g. restaurant, amusement park, supermarket and a library, etc.) to provide feedback regarding the various destinations. The system may use historical loss data associated with each destination as an indicator regarding the destination. The vehicle may be moved from the destination, for example, using autonomous driving.

BRIEF DESCRIPTION OF THE DRAWINGS

A more detailed understanding may be had from the following description, given by way of example in conjunction with the accompanying drawings wherein:

FIG. 5 is an example web page soliciting additional preliminary information regarding a request for a vehicle insurance quote;

FIG. 6 is an example web page soliciting name and address information of the individual requesting a vehicle insurance quote;

FIG. 14 is another example web page soliciting additional driver information regarding a request for a vehicle insurance quote;

DETAILED DESCRIPTION

A system and method configured to monitor use conditions of a vehicle and provide feedback to a user of the vehicle to maintain use within certain parameters is described. The description includes a plurality of sensors located proximate to the vehicle, each sensor configured to monitor at least one vehicle parameter, the plurality of sensors selected from an accelerometer, speed, temperature, mileage, oil level, oil pressure, run-time and location sensors, each sensor generating a signal encapsulating the monitored vehicle parameter and transmitting the generated signal to a control unit. The description includes a control unit that receives the generated signal from each of a plurality of sensors, the control unit including a memory that stores the received signal and selectively combines the received signal with other signals received from others of the plurality of sensors. The description includes a first transmitter coupled to the control unit capable of transmitting the combined signal. The description includes a second transceiver remote from the vehicle that receives a transmitted condition, and compares that condition to received conditions from other vehicles and provides feedback to adjust the use of the vehicle based on the comparison, and a user interface for providing feedback to a user including at least one of visual indication, audible indication, and physically altering the use of the vehicle. The description includes coupling of the plurality of sensors to the control unit with a controller area bus (CAN). The first transmitter may transmit over an RF network.

Figure 1:
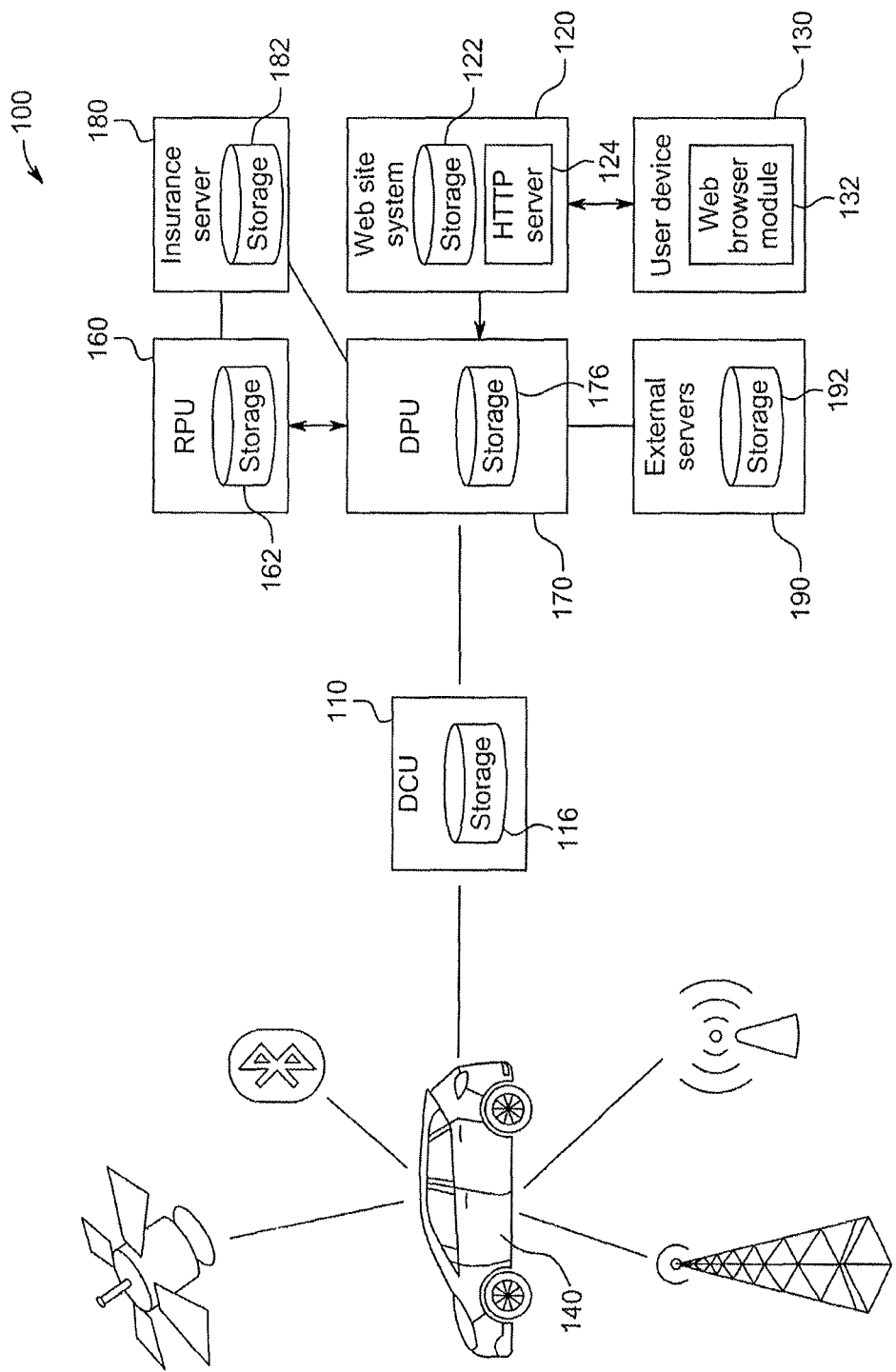
FIG. 1 shows an example system architecture that may be used for remotely monitoring the use of a vehicle.

FIG. 1 shows an example system 100 that may be used for monitoring a vehicle. The example system 100 includes a vehicle 140 equipped with one or more telematics devices (not pictured in FIG. 1 but shown in FIG. 1B and described herein below), for example a TrueLane® device. The telematics devices may further include smartphones, tablets, laptops, OEM connectivity devices and/or similar devices. The vehicle 140 may be in communication with multiple devices over different networks, including a satellite, a cellular station, a Wi-Fi hotspot, BLUETOOTH devices, and a data collection unit (DCU) 110. The DCU 110 may be operated by a third party vendor that collects telematics data. The DCU 110 may include storage 116. The DCU 110 collects the telematics data and may then transmit the telematics data to a data processing unit (DPU) 170. The telematics data may be communicated to the DPU 170 in any number of formats. The telematics data may be transmitted as raw data, it may be transmitted as summary data, or it may be transmitted in a format requested by the DPU 170. For example, the DPU 170 may transmit a customized summary of the telematics data to the DPU 170, in a format usable by the DPU 170. The DPU 170 may also be configured to communicate with a risk and pricing unit (RPU) 160 including storage 162, internal servers 180, including storage 182, and external servers 190 (e.g. social media networks, official/government networks), which are all connected by one or more networks.

The one or more telematics devices associated with the vehicle 140 may communicate with a satellite, Wi-Fi hotspot, BLUETOOTH devices and even other vehicles. The telematics devices associated with the vehicle 140 report this information to the DCU 110. As will be described in greater detail hereafter, the DCU 110 may transmit this telematics data to the DPU 170 which may be configured to consolidate biographic and telematics data to monitor the use of a vehicle.

The web site system 120 provides a web site that may be accessed by a user device 130. The web site system 120 includes a Hypertext Transfer Protocol (HTTP) server module 124 and a database 122. The HTTP server module 124 may implement the HTTP protocol, and may communicate Hypertext Markup Language (HTML) pages and related data from the web site to/from the user device 130 using HTTP. The web site system 120 may be connected to one or more private or public networks (such as the Internet), via which the web site system 120 communicates with devices such as the user device 130. The web site system 120 may generate one or more web pages that provide communication setting information, may communicate the web pages to the user device 130, and may receive responsive information from the user device 130.

The HTTP server module 124 in the web site system 120 may be, for example, an APACHE HTTP server, a SUN-ONE Web Server, a MICROSOFT Internet Information Services (ITS) server, and/or may be based on any other appropriate HTTP server technology. The web site system 120 may also include one or more additional components or modules (not depicted), such as one or more load balancers, firewall devices, routers, switches, and devices that handle power backup and data redundancy.

The user device 130 may be, for example, a cellular phone, a desktop computer, a laptop computer, a tablet computer, or any other appropriate computing device. The user device 130 may further be configured to operate as a telematics device. The user device 130 includes a web browser module 132, which may communicate data related to the web site to/from the HTTP server module 124 in the web site system 120. The web browser module 132 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 132 may implement Rich Internet Application (RIA) and/or multimedia technologies such as ADOBE FLASH, MICROSOFT SILVERLIGHT, and/or other technologies. The web browser module 132 may implement RIA and/or multimedia technologies using one or more web browser plug-in modules (such as, for example, an ADOBE FLASH or MICROSOFT SILVERLIGHT plug-in), and/or using one or more sub-modules within the web browser module 132 itself. The web browser module 132 may display data on one or more display devices (not depicted) that are included in or connected to the user device 130, such as a liquid crystal display (LCD) display or monitor. The user device 130 may receive input from the user of the user device 130 from input devices (not depicted) that are included in or connected to the user device 130, such as a keyboard, a mouse, or a touch screen, and provide data that indicates the input to the web browser module 132.

The example system 100 of FIG. 1 may also include one or more wired and/or wireless networks (not depicted), via which communications between the elements in the example system 100 may take place. The networks may be private or public networks, and/or may include the Internet.

Each or any combination of the modules shown in FIG. 1 may be implemented as one or more software modules, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules may perform functionality described herein with reference to FIGS. 2-25.

Figure 1A:
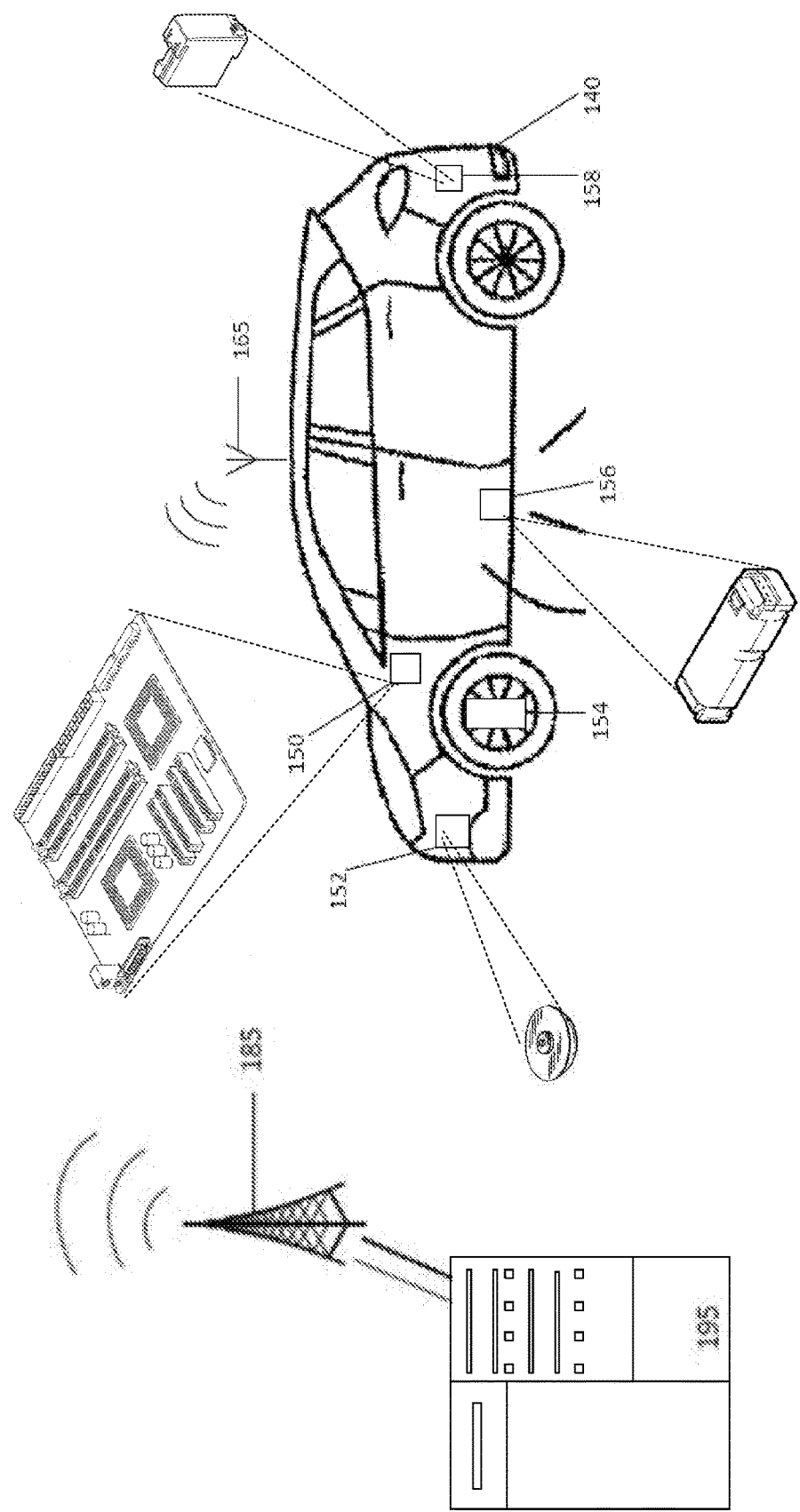
FIG. 1A illustrates the example system of FIG. 1 with additional detail regarding the sensors associated with the vehicle.

FIG. 1A illustrates the example system of FIG. 1 with additional detail regarding the sensors associated with the vehicle. Vehicle 140 may include a number of sensors. As depicted, sensors may include a first sensor 152, a second sensor 154, a third sensor 156, and a fourth sensor 158. Any number and type of sensors may be used, and the use of four sensors is only to demonstrate the concepts described herein. These sensors may include an accelerometer, speed and location sensors, for example. By way of non-limiting example only, these sensors may include temperature, weight, tire pressure, oil pressure sensors, as well as systems that provide other types of vehicle data. Other types of sensors including impact sensors, chemical sensors and pressure sensors may be utilized in the present system. For ease of understanding and describing, first sensor 152 may be an accelerometer, second sensor 154 may be a speed sensor, third sensor 156 may be a pressure sensor, and fourth sensor 158 may be a location sensor that monitors distance traveled. Each of sensors 152, 154, 156, 158 may be coupled to a control unit 150. Control unit 150 may be DCU 110, separate therefrom, or a portion thereof. Control unit 150 may collect the measurements of each of the sensors 152, 154, 156, 158 and store the measurements for subsequent transmission to a second transceiver 185 remote from the vehicle that receives transmitted measurements and stores the measurements within a server 195. Server 195 may process the measurements such as by comparing the measurements to other received measurements from other vehicles and adjust vehicle use characteristics based on the processing.

As shown in the exploded view of FIG. 1A, control unit 150 may include circuitry that is part of, or includes the electronic circuitry of the vehicle 140. Control unit 150 may include a core, such as a microcontroller, for example, and memory, such as SRAM, EEPROM and flash memories, for example. Control unit 150 may receive one or more inputs from supply voltage sources. Other inputs to control unit 150 may include digital and analog inputs based on readings within the vehicle, including, but not limited to, sensors 152, 154, 156, 158. Control unit 150 may also include outputs from relay drivers, injector drivers and logic outputs, by way of example only, and from other communication links. Control unit 150 may also include a housing (not shown).

First sensor 152 is shown in the included exploded view. In the case where first sensor 152 is an accelerometer, exploded view may include a damped mass on a spring, such that when the accelerometer experiences an acceleration, the mass is displaced until the spring is able to accelerate the mass at the same rate as the surrounding housing with the displacement being associated with the acceleration. While operating as described, first sensor 152 may be one or more of piezoelectric, piezoresistive and capacitive components that are used to convert the mechanical motion into an electrical signal. These components may include piezoceramics and silicon micro machined sensing elements in order to provide the upper and lower acceleration ranges as needed. The accelerometer may include shock resistant characteristics.

While not shown in an exploded view, second sensor 154 may take the form of a speed sensor. The speed sensor may include a wheel speed sensor, for example. Speed sensor may also take the form of a speedmeter, airspeed indicators, piezo electric sensors, LIDAR, ground speed radar, Doppler radar and/or laser surface velocimeters. In the case where the speed sensor of second sensor 154 is a wheel speed sensor, second sensor 154 may include a tachometer that includes a toothed ring and pickup, for example. Such a sensor may be included within an anti-lock brake system and may be an integrated part of the electronic stability control system. Such a sensor may be magnetic and/or optical in nature.

Also shown in an exploded view of FIG. 1A, is third sensor 156. As shown third sensor 156 may take the form of a pressure sensor. A pressure sensor may measure absolute pressure, differential pressure or gauge pressure. The pressure sensor may include a transducer, or may act like a transducer, by producing a signal as a function of the pressure imposed on the sensor. Pressure sensor may be a force collector such as a strain gauge using for example a Wheatstone bridge. Force sensor may be capacitive, electromagnetic, piezoelectric, and/or optical in nature.

Fourth sensor 158 is shown in the remaining exploded view within FIG. 1A. Fourth sensor 158 may take the form of a location sensor. In the case of a location sensor, the sensor may operate by using the Global Positioning System to provide the sensor with signals indicative of the sensor's location. Such a sensor may be separate from or a part of the vehicle navigation system, for example.

Using the sensors, DCU 110 may activate portions of the vehicle to alter the use of the vehicle. For example, if the speed sensor 154 indicates that the car is traveling too fast, DCU 110 may indicate to the vehicle to take corrective action by applying the brakes, for example. DCU 110 may alert the driver that the vehicle is traveling too fast and allow the operator the opportunity to slow the vehicle down without intervention, for example. The sensors 152, 154, 156, 158 may be part of a feedback loop designed to achieve improved operation of the vehicle. The feedback may be to others about the vehicle including insurance, owner, police, toll collector, and the like.

Figure 1B:
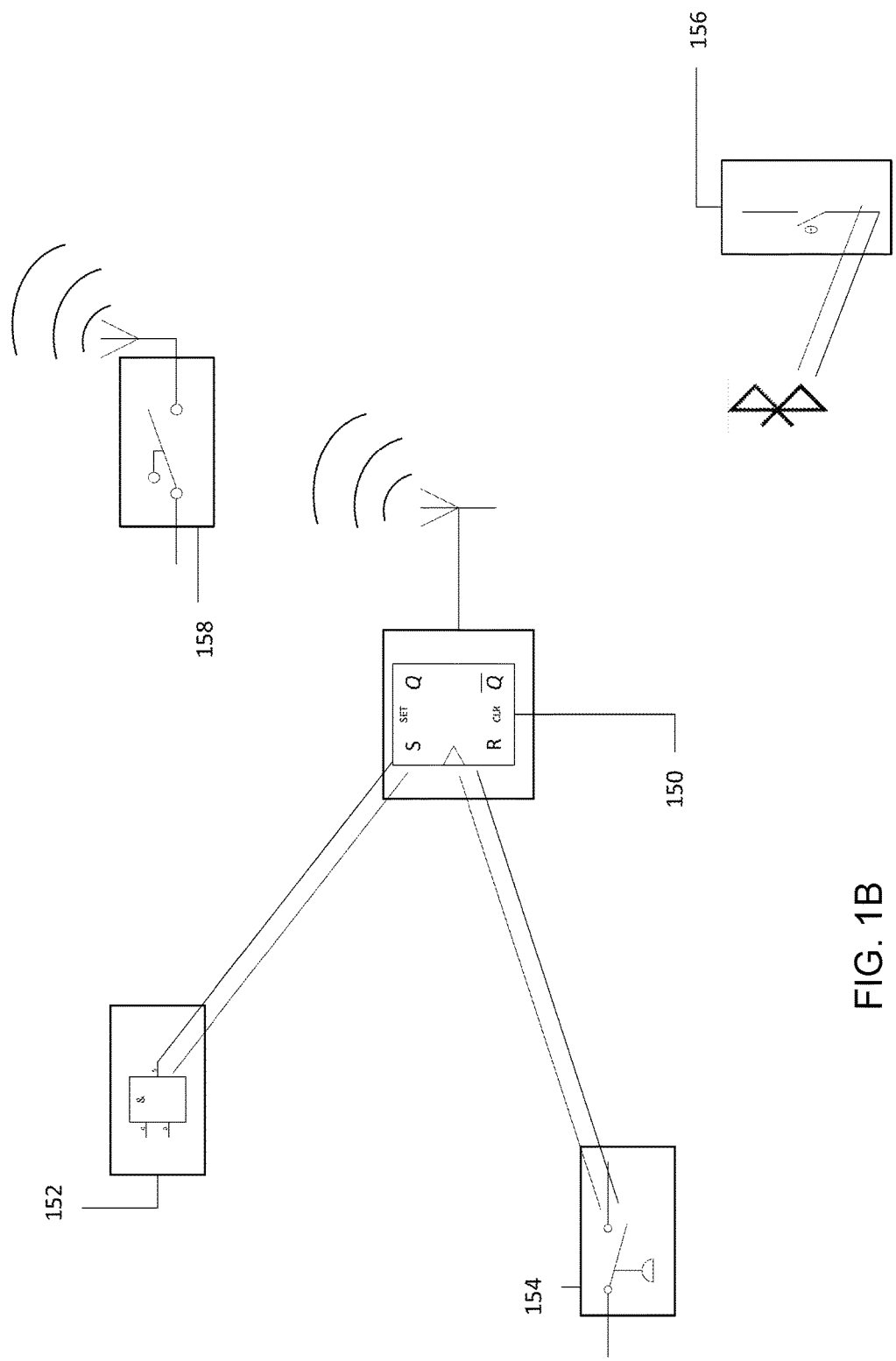
FIG. 1B illustrates a schematic diagram of the interconnections of the sensors with the control unit for use in monitoring the use of a vehicle within the system of FIGS. 1 and 2.

FIG. 1B illustrates a schematic diagram of the interconnections of the sensors 152, 154, 156, 158 with the control unit 150 for use in monitoring the use of a vehicle 140 within the system of FIGS. 1 and 2. In particular, FIG. 1B illustrates that the sensors 152, 154, 156, 158 may be interconnected or otherwise coupled with the control unit 150 via a controller area bus (CAN) as in the case of sensors 152, 154, by Bluetooth as in the case of sensor 156, or may be coupled by other types of radio frequency communication as in the case of sensor 158. Control unit 150 may receive the measurements from sensors 152, 154, 156, 158 and may provide local storage to save the measurements and ultimately transmit the measurements remote from the vehicle.

For example, communication in and amongst the sensors, or from the sensors to DCU 110 or another central location may employ an architecture as follows. The 3rd Generation Partnership Project (3GPP) includes an architecture to operate vehicle to everything (V2X) communications based on Long Term Evolution (LTE) systems. V2X service may be considered to be a type of communication service to exchange V2X messages that involves a transmitting or receiving unit using a V2X application via 3GPP transport. V2X service may be further divided into vehicle to vehicle (V2V) service, vehicle to pedestrian (V2P) service, vehicle to infrastructure (V2I) service and vehicle to network (V2N) service.

V2V service may be considered to be a type of V2X service where both parties of the communication are units equipped on different vehicles. V2P service may be considered to be a type of V2X service where one party is equipped on a vehicle and the other party is carried by an individual (e.g., a handheld terminal carried by a pedestrian, cyclist, driver or passenger). V2I service may be considered to be a type of V2X service where one party is equipped on a vehicle and the other party is a road side unit (RSU). An RSU may be considered to be an entity supporting V2I Service that can transmit to, and receive from, a unit using a V2X application. An RSU may include at least an eNode-B or a stationary device. V2N service may be considered to be a type of V2X service where one party is equipped on a vehicle and the other party is an application server (e.g., a traffic safety server).

Figure 2A:
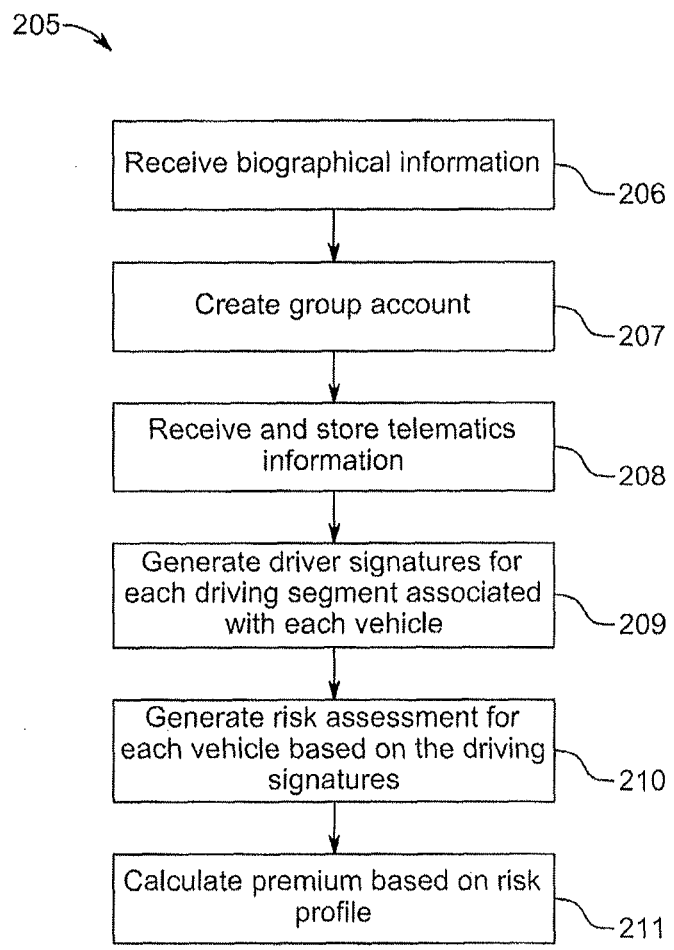
FIG. 2A shows a flow diagram for a method for determining pricing based on driver signatures associated with a vehicle.

FIG. 2A shows an example for a method 205 for determining driver signatures. The system 100 receives biographical information regarding the user (step 206). This information may include information (such as the number of family members, age, marital status, education, address information, number and type of vehicles). Based on this information, the system 100 may create a group account (step 207). The group account may include subaccounts for each vehicle, wherein each vehicle may have multiple drivers. For each vehicle, the system 100 may create a use profile. The use profile is based on the indicated amount of use of each vehicle, by each driver. The system 100 may use correlative data based on stored information (including historic driver data associated with each driver, statistical/demographic information, and biographical data) and other actuarial factors to determine a risk assessment associated with insuring each vehicle. This risk assessment may include expected claims and/or losses associated with the vehicle. The system 100 may use this risk assessment to determine pricing information for the account. This initial risk assessment may be based on correlative data (i.e. using the biographic/demographic data as a proxy for actual driving behavior.) This may include driver risk assessment, vehicle risk assessment, policy risk assessment or any appropriate risk assessment. The risk assessment may be represented as a profile, a score (or set of scores) or similar information stored in a database. Once the system 100 has generated the group account, it may begin to receive and store the vehicles' telematics data (step 208). The system 100 may use software based algorithms to analyze received telematics data. For example, the system 100 may be configured to cluster certain driver characteristics in the telematics data to identify discrete segments of use associated with a particular driver signature. The system 100 may be configured to associate each of these driver signatures with a driver (known or unknown) (step 209). The system 100 may then categorize the usage of each vehicle based on these driver signatures. In one example, the system 100 may determine the amount of time each vehicle is used by driver signatures associated with known and unknown drivers. The system 100 may adjust the risk assessment associated with the vehicle based on the number of driver signatures identified as well as an analysis of the type of driving the driver signature indicates (e.g. aggressive, distracted, cautious, etc.) (step 210). The risk assessment, generated by the system 100, may be a risk profile associated with the vehicle or the driver.

Once the driver signature is determined, the telematics data may be stored as data using attributes of the driver. This database storage of the captured telematics signals may reduce the data and identify the driver based on the attributes of the driver signature. The database storing by identified driver, as an attribute of the driver, improves the efficiency and power usage of the processor in accessing and using the signals from the telematics data.

Alternatively, the system 100 may be configured to generate an aggregate risk profile for the group of vehicles, without individually assessing each driver or vehicle. Based on these driver signatures, the system 100 may be configured to assess the risks associated with coverage based on causal data in addition to or instead of correlative data. The system 100 may use these risks to adjust the pricing information (step 211). The pricing information may be adjusted by adjusting the assessed rate, or providing the customer with a discount, a credit or a penalty. In another example, the pricing information may be adjusted by placing the vehicle or driver in a different rate category.

Figure 2B:
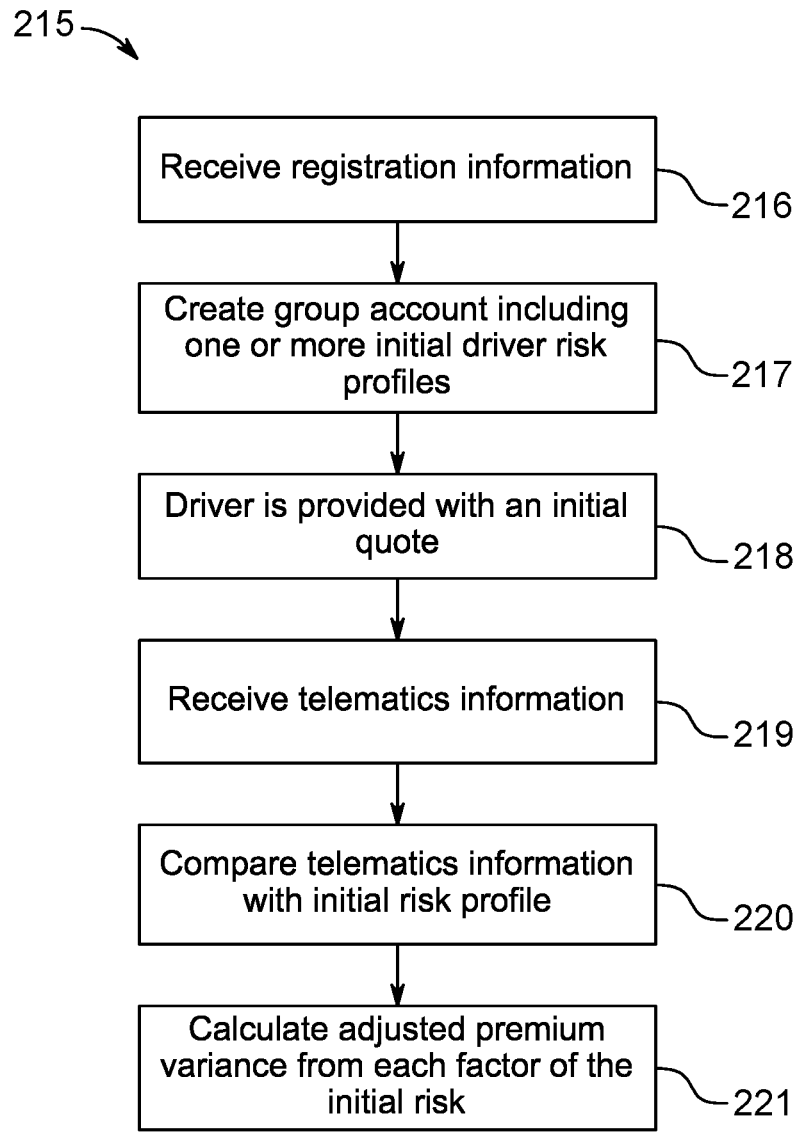
FIG. 2B shows a flow diagram for a method for expectation based processing.

FIG. 2B shows an example for a method 215 for expectation based processing. The system 100 receives registration information regarding the user (step 216). This information may include biographical information (such as the numbers of family members, age, marital status, education, address information, number and type of vehicles). Based on this information, the system 100 creates a group account (step 217). The group account may include subaccounts for each individual driver (in the case of multiple insured). The system 100 uses a software based algorithm to generate initial driver risk profiles, based on stored loss statistics. The system 100 may then generate pricing information based on this initial risk profile (step 218). If the user accepts the pricing, the account is activated and the system 100 begins receiving and stores driver telematics data associated with the account (step 219). At predetermined or requested intervals, the system compares the received telematics data and compares each measured value with the expected value in the initial driver risk profile (step 220). Using software based algorithms, the system 100 may credit or penalize each driver based on variances from the initial driver expectation profile and determine pricing information, including adjusting a rate, providing a credit or penalty, deny coverage, or recommend a different insurance product (step 221). As opposed to previous systems which merely adjusted rates on a whole premium basis. The system 100 is configured to adjust the pricing based on multiple factors determined by the telematics data. The system 100 may be able to adjust the pricing in multiple ways, for example by adjusting the rate, or providing a credit, or a penalty, based on the telematics data. Alternatively, the system 100 may be configured to generate an initial risk profile on a group basis. For example, for a family of four with two cars and four drivers, an aggregate initial risk profile may be generated. Based on this aggregate initial risk profile, the group is assessed a premium based on driver averaging. Accordingly, if the aggregate telematics data varies from the aggregate initial driver risk profile, the pricing may be adjusted by adjusting the rate, crediting or penalizing the account, denying continuing coverage, or recommending a different insurance product for the user. The updated pricing information may be presented to the user of a user device 130. The techniques described herein may be used to compare various methods of determining the pricing of vehicle insurance. For example, some companies may use a blended rate to determine premiums; others may determine this based on attributing the worst driver on a policy to the highest risk vehicle. Using the methods described herein, the insurance company can adjust the pricing information from either scheme.

Figure 2C:
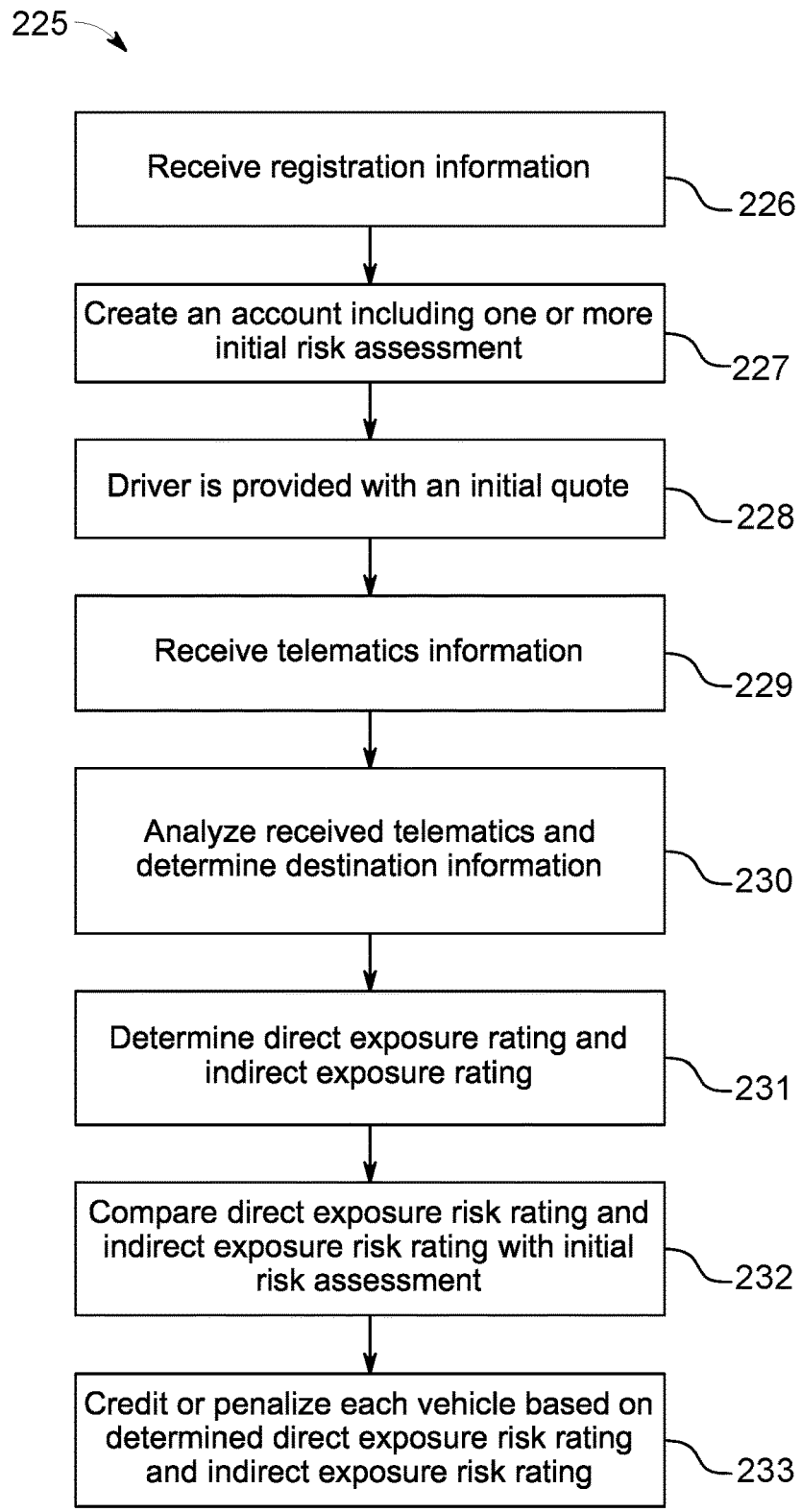
FIG. 2C shows a flow diagram for a method for destination based underwriting.

FIG. 2C shows an example for a method 225 for destination based underwriting. The system 100 receives registration information regarding the user (step 226). This information may include biographical information (such as the numbers of family members, age, marital status, education, address information, number and type of vehicles). In one embodiment, this information may be received via a website. Based on this information, the system 100 creates a group account (step 227). The group account may include subaccounts for each individual driver (in the case of multiple insured). The system 100 uses a software based algorithm to generate initial risk assessments, based on stored statistical data and loss data. For example, if there are two drivers and two vehicles, and each vehicle is driven by only one driver, the system 100 generates a vehicle risk assessment which incorporates the likelihood of a claim being made related to the vehicle 140 and the expected severity of such a claim. The initial risk assessment may be based on the expected locations in which the vehicle 140 is to be stored and the expected risk behavior of the operator of the vehicle 140. The system 100 may then generate pricing information based on this initial risk assessment (step 228). For example, the pricing information may include a quote or a premium for the user. If the user accepts the premium, the account is activated and the system 100 begins receiving and storing telematics data associated with the account (step 229). At predetermined intervals or based on triggering events, the telematics device may push telematics data to the system 100, or the system 100 may pull telematics data from the device and store the information in a database. The system 100 receives the telematics data, and categorizes information as destination information (step 230). For example, the system 100 may receive location updates every 10 seconds. If the vehicle 140 is stopped, for more than a predetermined time period (e.g. 15 minutes) it may register a location as a destination location. The system 100 may further be configured to access external real-time data, such as traffic data to refine its information. For example, if a vehicle 140 is stopped for more than 15 minutes, and the location is determined to be a high traffic location, the system 100 may determine that the stoppage is not a destination, but a traffic related stoppage. The system 100 may then use the determined destination information and perform a software based statistical analysis and determine a direct exposure risk rating and an indirect exposure risk rating for each stoppage. The direct exposure risk rating and an indirect exposure risk rating are inputs to a unified Telematics Destination Score (TDS) that is calculated at some unit of location such as a zip code or a census block (step 231). The TDS, which may be comprised of a direct exposure risk rating and indirect exposure risk rating, may be compared with the initial risk assessment (step 232). Using software based algorithms, the system 100 may credit or penalize each vehicle 140 based on variances from the initial risk assessment and adjust the pricing information, wherein the adjusted pricing information may comprise a premium based on adjusted rates, credits, debits, or changes in a class plan. Additionally, the system 100 may deny coverage, or recommend a different insurance product (step 233).

Figure 2D:
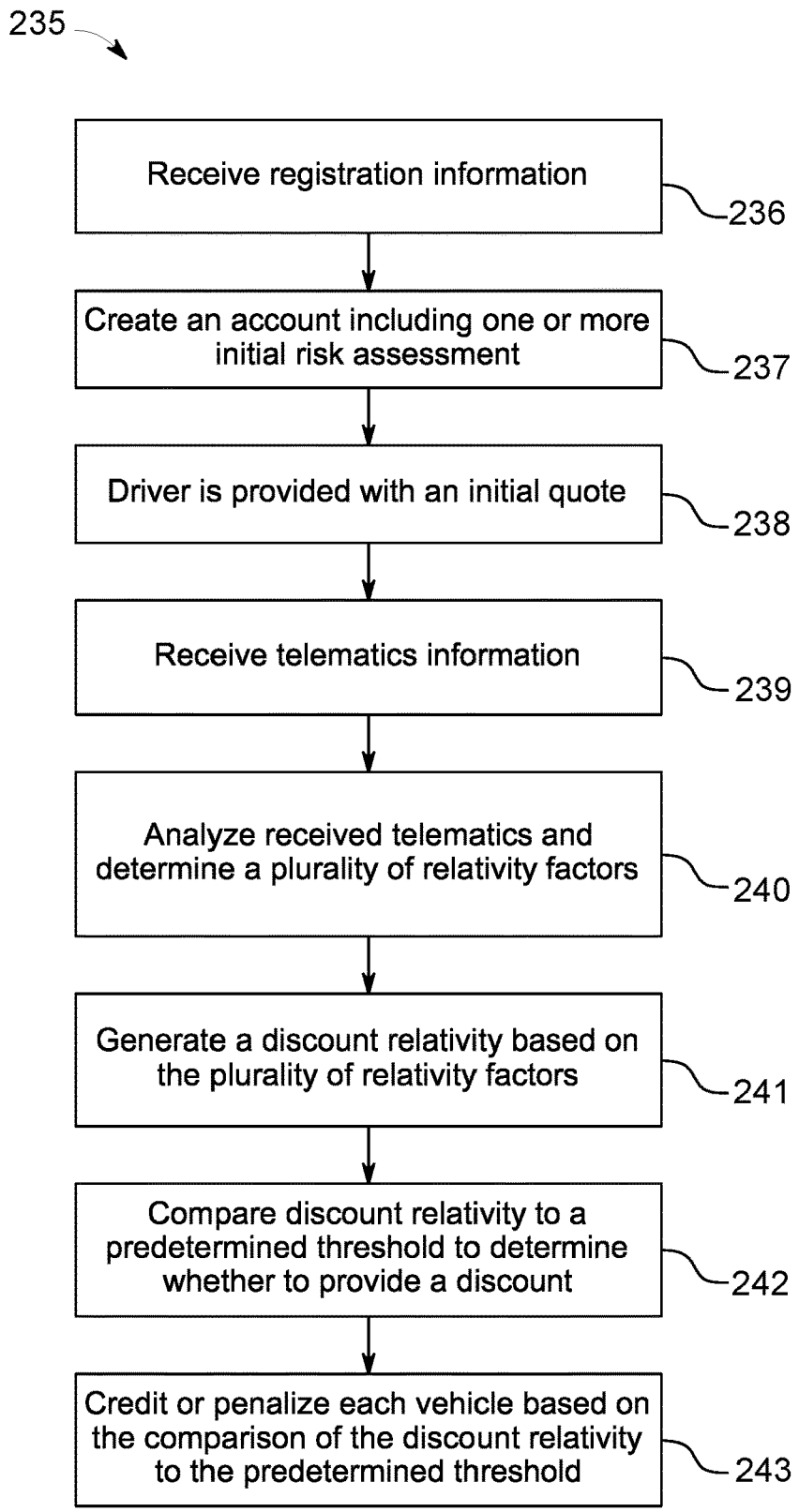
FIG. 2D shows a flow diagram for a method for telematics based underwriting.

FIG. 2D shows an example for a method 235 for telematics based underwriting. The system 100 receives registration information regarding the user (step 236). This information may include biographical information (such as the numbers of family members, age, marital status, education, address information, number and type of vehicles). In one embodiment, this information may be received via a website. Based on this information, the system 100 creates a group account (step 237). The group account may include subaccounts for each individual driver (in the case of multiple insured). The system 100 uses a software based algorithm to generate initial risk assessments, based on stored demographic data and loss data. For example, if there are two drivers and two vehicles, and each vehicle is driven by only one driver, the system 100 generates a vehicle risk assessment which incorporates the likelihood of a claim being made related to the vehicle and the expected severity of such a claim. The initial risk assessment may be based on the expected locations in which the vehicle is to be stored and the expected risk behavior of the operator of the vehicle. The system 100 may then generate pricing information based on this initial risk assessment (step 238). For example, the pricing information may include quote/premium information. If the user accepts the premium, the account is activated and the system 100 begins receiving and stores telematics data associated with the account (step 239). At predetermined intervals or based on triggering events, the telematics device may push telematics data to the system 100 or the system 100 may pull telematics data from the device and store the information in a database. The system 100 receives the telematics data, and determines a plurality of relativity factors (step 240). The system 100 may then use the determined relativity factors to determine a discount relativity (step 241). The system 100 may compare the determined discount relativity to a predetermined threshold to determine whether to provide a discount (step 242). Using software based algorithms, the system 100 may credit or penalize each vehicle based on the comparison of the discount relativity to the predetermined threshold and determine an adjusted rate, an adjusted risk score, provide a credit or surcharge, deny coverage, or recommend a different insurance product (step 243).

FIGS. 3-8 and 12-16 show example web pages that may be displayed by the web browser module 132. As will be described in detail below, the web pages may include display elements which allow the user of the user device 130 to interface with the system 100 and register or receive a quote for vehicle insurance. The web pages may be included in a web browser window 200 that is displayed and managed by the web browser module 132. The web pages may include data received by the web browser module 132 from the web site system 120. The web pages may include vehicle insurance information.

The web browser window 200 may include a control area 265 that includes a back button 260, forward button 262, address field 264, home button 266, and refresh button 268. The control area 265 may also include one or more additional control elements (not depicted). The user of the user device 130 may select the control elements 260, 262, 264, 266, 268 in the control area 265. The selection may be performed, for example, by the user clicking a mouse or providing input via keyboard, touch screen, and/or other type of input device. When one of the control elements 260, 262, 264, 266, 268 is selected, the web browser module 132 may perform an action that corresponds to the selected element. For example, when the refresh button 268 is selected, the web browser module 132 may refresh the page currently viewed in the web browser window 200.

Figure 3:
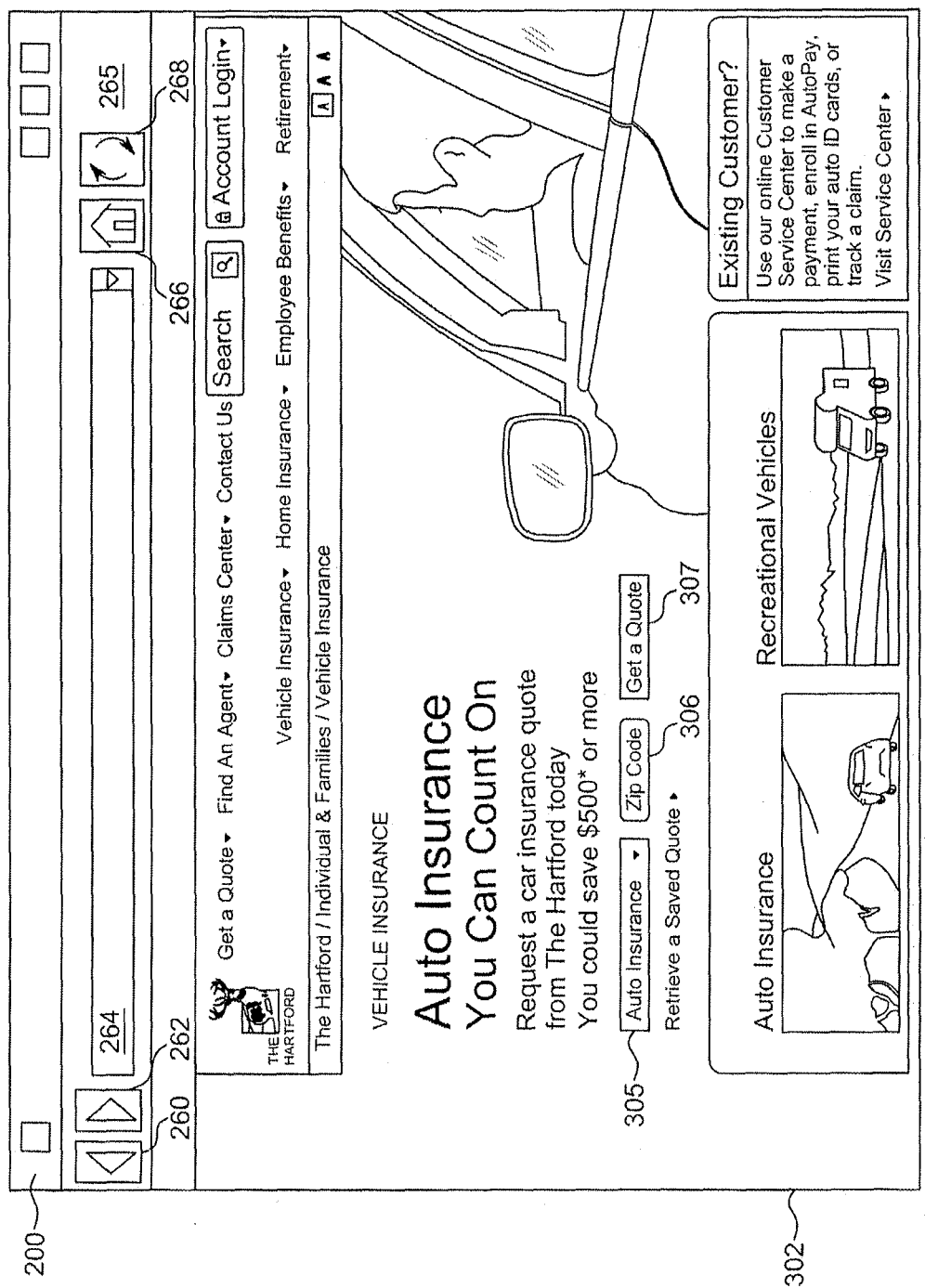
FIG. 3 is an example web page for initiating a request for a vehicle insurance quote.

FIG. 3 is an example web page 302 for initiating a request for a vehicle insurance quote. As shown in FIG. 3, the web page 302 may include questions accompanied by multiple input fields 305-307 in the form of drop down lists, text fields, and radio buttons. As the user provides input into the input fields 305-307, the web browser module 132 may store one or more data structures ("response data") that reflect the selections made in the input fields 305-307. Further, as the selections are updated, the web browser module 132 may update the web page 302 to indicate additional or more specific questions that may be associated with the selections. If there are no errors in the transmission, the web browser module 132 is directed to a subsequent web page. While the example shown is for auto insurance, the methods and apparatus disclosed herein may be applied to any vehicle insurance, e.g. boats, planes, motorcycles etc. Also, while the examples are directed to family auto insurance, the methods and apparatus disclosed herein may be applicable to corporate insurance plans, or any policies covering vehicles.

Figure 4:
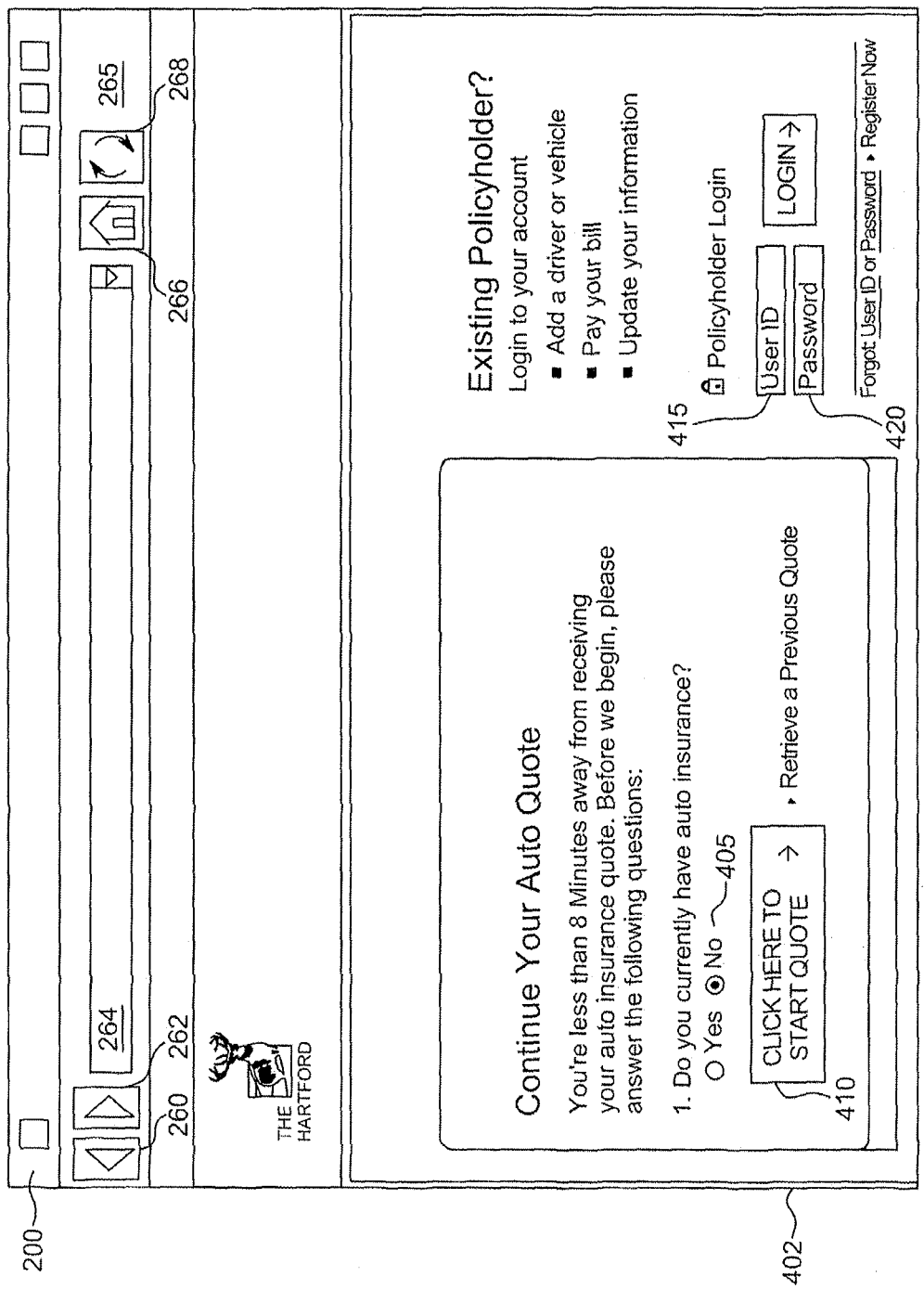
FIG. 4 is an example web page soliciting preliminary information regarding a request for a vehicle insurance quote.

FIG. 4 is an example web page 402 soliciting preliminary information regarding a request for a vehicle insurance quote. As shown in FIG. 4, the web page 402 may include multiple input fields 405, 410, 415, and 420. As the user device 130 receives input for the input fields, the web browser module 132 may store one or more data structures ("response data") that reflect the selections made in the input fields. Further, as the selections are updated, the web browser module 132 may update the web page 402 to indicate additional or more specific questions that may be associated with the selections. At any time, while viewing the web page 402 of FIG. 4, the user may enter user identification information in input fields 415 and 420, which accesses previously stored information associated with the user. If there are no errors in the transmission, the web browser module 132 is directed to a subsequent web page.

FIG. 5 is an example web page 502 soliciting additional preliminary information regarding a request for a vehicle insurance quote. As shown in FIG. 5, the web page 502 may include multiple input fields 505, 510, 515, 520, 525, and 530. As the user device 130 receives input for the input fields, the web browser module 132 may store one or more data structures ("response data") that reflect the selections made in the input fields. Further, as the selections are updated, the web browser module 132 may update the web page 502 to indicate additional or more specific questions that may be associated with the selections. At any time, while viewing the web page 502 of FIG. 5, the user may enter user identification information in input fields 525 and 530, which accesses previously stored information associated with the user. Web page 502 solicits additional questions, for example, whether the user currently has a valid driver's license and whether the user or associated family has had any major driving violations. Such violations alert the system 100 that the user may be directed to a different insurance product. Additionally, while the telematics program is voluntary for some users, in one embodiment, a potential user may be eligible for additional products if they consent to using the telematics program, whereas previously they may have been disqualified. If there are no errors in the transmission, the web browser module 132 is directed to a subsequent web page.

Figure 6:
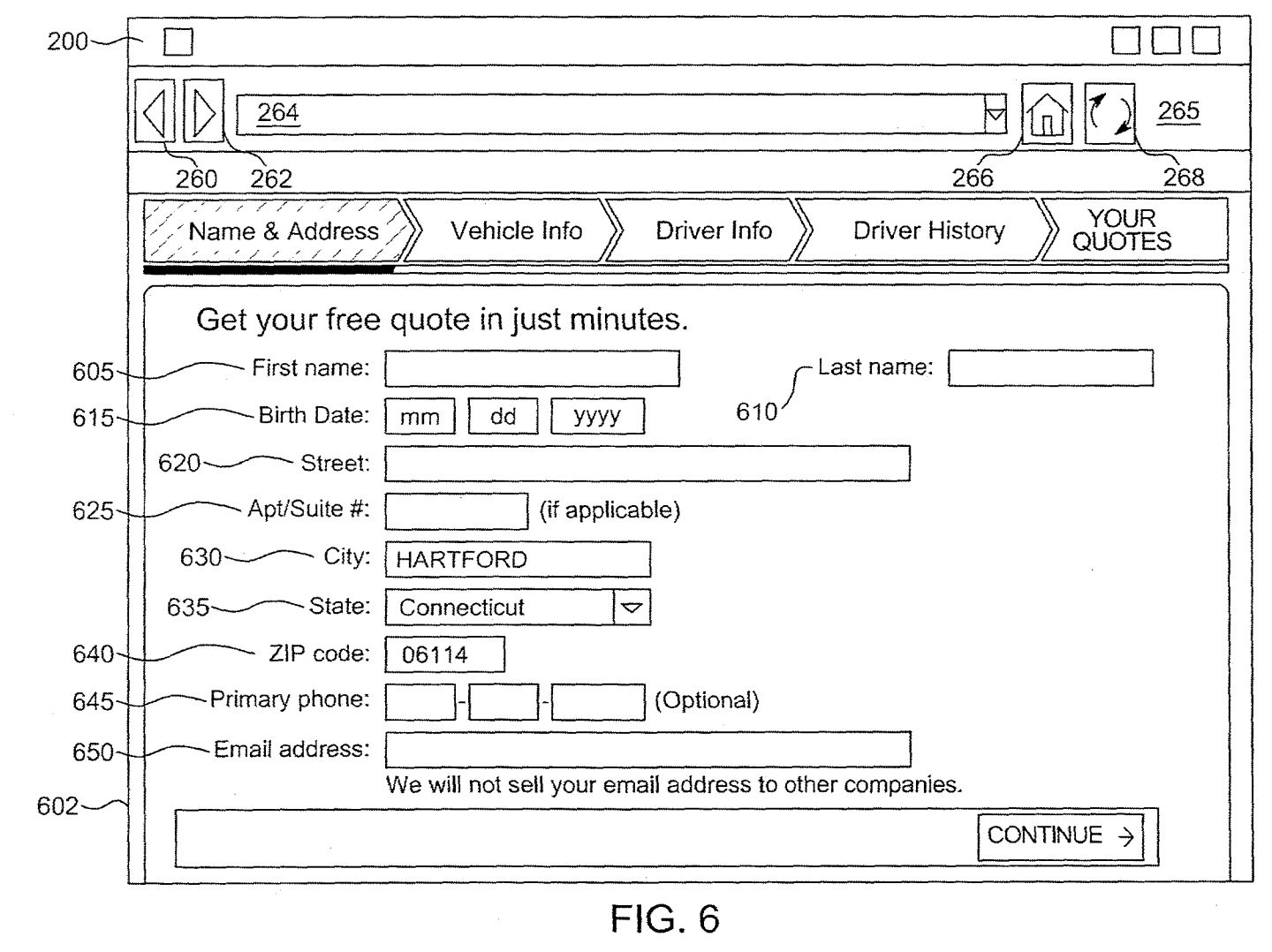

FIG. 6 is an example web page 602 soliciting name and address information of the individual requesting an insurance quote. As shown in FIG. 6, the web page 602 may include multiple input fields 605, 610, 615, 620, 625, 630, 635, 640, 645 and 650. As the user device 130 receives input for the input fields, the web browser module 132 may store one or more data structures ("response data") that reflect the selections made in the input fields. Further, as the selections are updated, the web browser module 132 may update the web page 602 to indicate additional or more specific questions that may be associated with the selections. The questions displayed on web page 602 solicit questions regarding the contact information of the individual applying for insurance. As an example, the questions shown in FIG. 6 include: name, date of birth, address, phone number, and email address. If there are no errors in the transmission, the web browser module 132 is directed to a subsequent web page.

Figure 7:
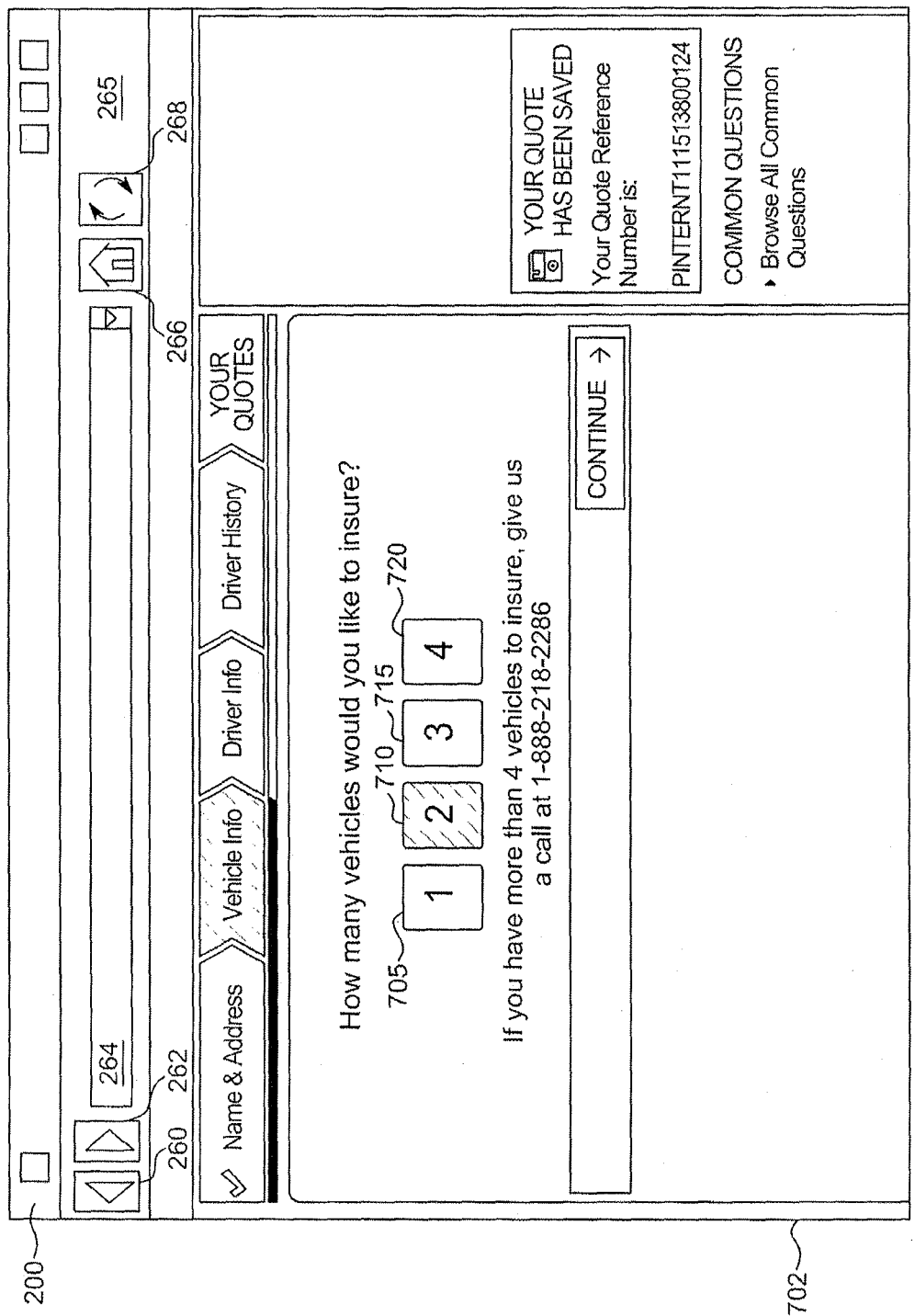
FIG. 7 is an example web page soliciting vehicle information regarding a request for a vehicle insurance quote.

FIG. 7 is an example web page 702 soliciting vehicle information regarding a request for a vehicle insurance quote. As shown in FIG. 7, the web page 702 may include buttons 705, 710, 715, and 720. As the user device 130 receives input selecting a button, the web browser module 132 may store one or more data structures ("response data") that reflect the selections made. Further, as the selections are updated, the web browser module 132 may update the web page 702 to indicate additional or more specific questions that may be associated with the selections. The question displayed on web page 702 solicits information regarding the number of vehicles for which insurance is being requested. While the example shown in FIG. 7 only allows four vehicles, this is as an example only. More or less vehicles may be allowed. If there are no errors in the transmission, the web browser module 132 is directed to a subsequent web page.

Figure 8:
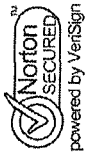
FIG. 8 is an example web page soliciting additional vehicle information regarding a request for a vehicle insurance quote.

FIG. 8 is an example web page 802 soliciting additional vehicle information regarding a request for a vehicle insurance quote. As shown in FIG. 8, the web page 802 may include drop downs 805-855, for example, drop downs Choose Vehicle Type 805, Year 810, Make 815, Model 820, Sub-Model 825, is this vehicle paid for, financed or leased? 830, How Is It used 835, Does your vehicle have an anti-theft device? 840, Yes or No—At a different location 845, Street 850 and Zip code 855. As the user device 130 receives inputs, the web browser module 132 may store one or more data structures ("response data") that reflect the selections made. Further, as the selections are updated, the web browser module 132 may update the web page 802 to indicate additional or more specific questions that may be associated with the input. The question displayed on web page 802 solicits information where the user is requested to enter vehicle type, year, make, model, and other information. The user is also requested to enter information as to how the vehicle is paid for, how the vehicle is used, whether there is anti-theft equipment, and where the vehicle is stored. The web page 802 also includes tabs to add data for additional vehicles and to remove vehicles. If there are no errors in the transmission, the web browser module 132 is directed to a subsequent web page.

This information collected via the webpages as depicted in FIGS. 7 and 8, or otherwise collected, may include information regarding the autonomous or semi-autonomous features of the vehicle. While the term autonomous or semi-autonomous is being used herein, these terms are intended to cover at least any automated controlling or other operation of the vehicle or any vehicle subsystem. Many times these autonomous features may be identified as being installed in a vehicle by using the vehicle identification number (VIN). Other times such autonomous features may be added to the vehicle after-market, and are therefore not identified via the VIN. In such a situation, the information regarding the autonomous feature or features may be needed to be entered manually, or otherwise captured. Other methods of obtaining this information include partnerships with after-market installation companies and tracking companies such as CarFax®, for example.

By way of example, semi-autonomous vehicles may include such features in which the vehicle will take control of itself for either safety or convenience purposes, including cruise control, adaptive cruise control, stability control, pre-crash systems, automatic parking, and lane-keeping system, for example. Autonomous and semi-autonomous vehicles may represent a myriad of different levels of automated operation. For example, in the United States, the National Highway Traffic Safety Administration (NHTSA) has established an official classification system that is included herein to provide a complete picture of the scale of autonomous vehicle control.

Level 0—The driver completely controls the vehicle at all times.

Level 1—Individual vehicle controls are automated, such as electronic stability control or automatic braking.

Level 2—At least two controls can be automated in unison, such as adaptive cruise control in combination with lane keeping systems.

Level 3—The driver can fully cede control of all safety-critical functions in certain conditions. The car senses when conditions require the driver to retake control and provides a "sufficiently comfortable transition time" for the driver to do so.

Level 4—The vehicle performs all safety-critical functions for the entire trip, with the driver not expected to control the vehicle at any time. As this vehicle would control all functions from start to stop, including all parking functions, it could include unoccupied cars.

Figure 9:
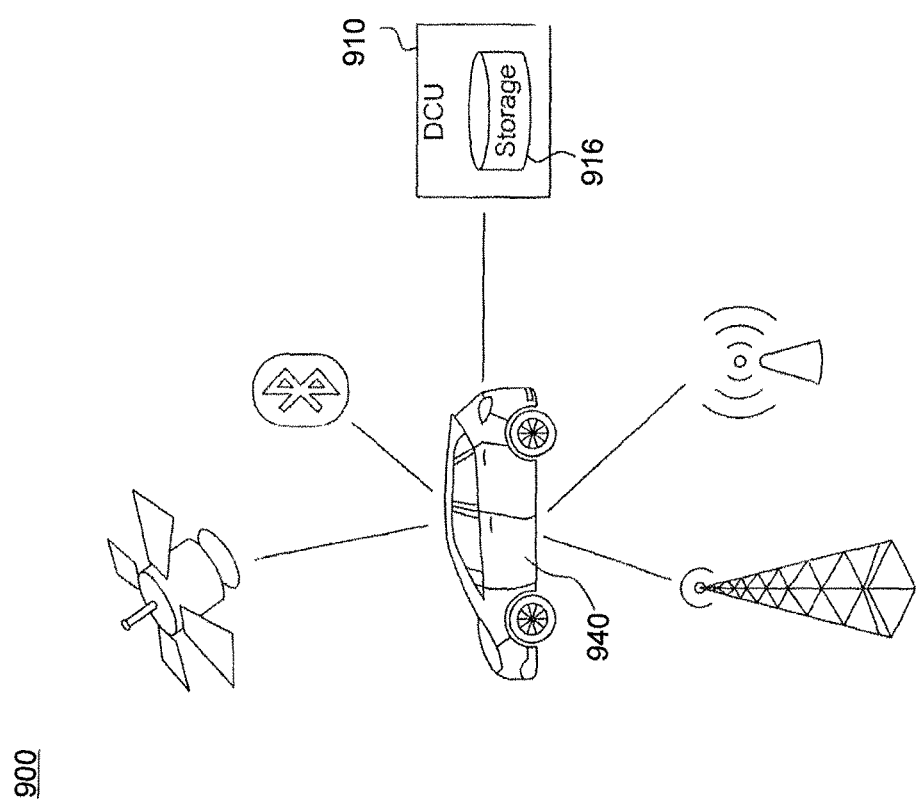
FIG. 9 illustrates a system that may be used as a part of the system of FIG. 1 for identifying autonomous features of a vehicle and to account for the use of those features in determining risk and pricing information.

Referring to FIG. 9, there is illustrated a system 900 that may be used as a part of system 100 for identifying autonomous features of a vehicle and to account for the use of those features in determining risk and pricing information. System 900 is similar to system 100 described herein and incorporates many of the features of system 100. System 900 may be a part of system 100, used separately, or used in conjunction therewith. The example system 900 includes a vehicle 940 equipped with one or more telematics devices (not pictured), for example a TrueLane® device. The vehicle 940 may be in communication with multiple devices over different networks, including a satellite, a cellular station, a WI-FI hotspot, BLUETOOTH devices, and a data collection unit (DCU) 910. The DCU 910 may be operated by a third party vendor that collects telematics data or by the insurance company. The DCU 910 may include storage 916.

As will be described in greater detail hereafter, the DCU 910 may transmit information associated with autonomous features of the vehicle. This information may include autonomous features installed in the vehicle, features that are in use, and the mileage associated with such a use. The DCU 910 may include a black box that snaps data at a given time, such as at the time of an accident for example.

Vehicle 940 may allow for communication with other vehicles. For example, platooning of computer systems of a myriad of vehicles may occur.

Figure 10A:
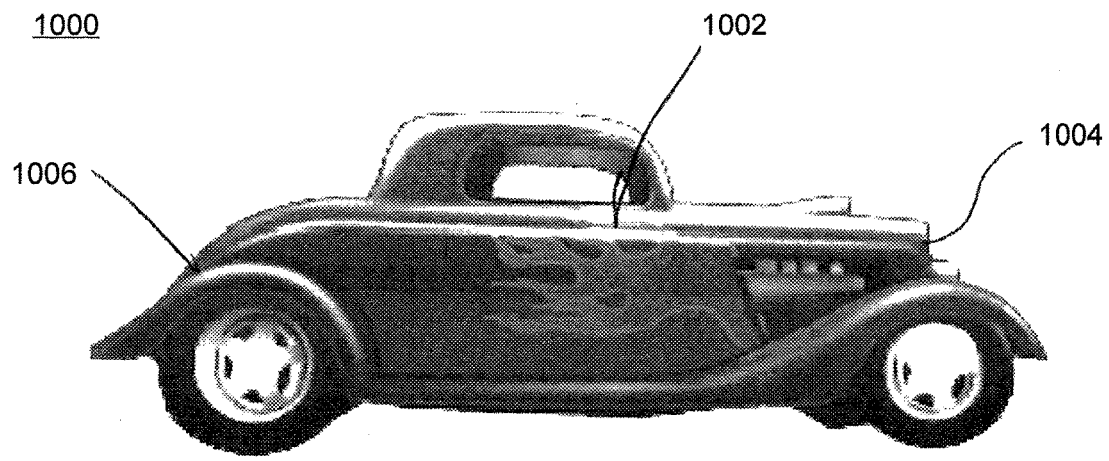
FIGS. 10A and 10B depict a vehicle that includes autonomous technology.
Figure 10B:
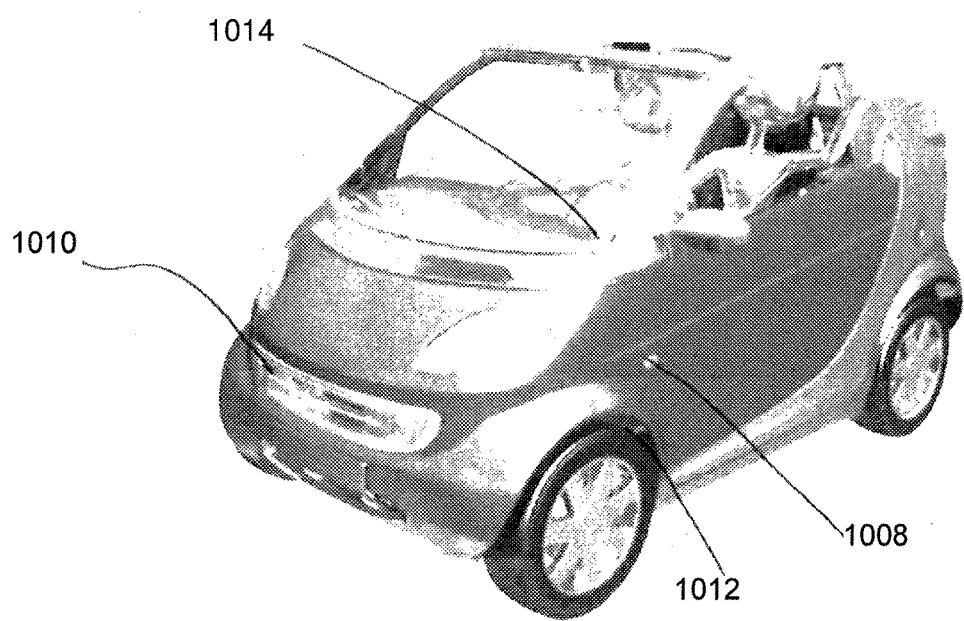

Referring now to FIGS. 10A and 10B, there is depicted a vehicle 1000 that includes autonomous technology. Adaptive cruise control 1002 may be included in the vehicle. Adaptive cruise control 1002 may include technology to automatically adjust the vehicle's 1000 speed to maintain a safe following distance as compared to the car immediately preceding the vehicle. Adaptive cruise control 1002 may use forward-looking radar, installed behind the grill of the vehicle 1000, to detect the speed and distance of the vehicle ahead of the vehicle 1000.

Vehicle 1000 may also include adaptive headlights 1004. Adaptive headlights 1004 may react to the steering, speed and elevation of the vehicle 1000 and automatically adjust to illuminate the road ahead. When the vehicle 1000 turns right, the headlights 1004 angle to the right. Turn the vehicle 1000 left, the headlights 1004 angle to the left. This is important not only for the driver of the vehicle 1000 with adaptive headlights, but for other drivers on the road as well. The glare of oncoming headlights can cause serious visibility problems. Since adaptive headlights 1004 are directed at the road, the incidence of glare is reduced. Adaptive headlights 1004 use electronic sensors to detect the speed of the vehicle 1000, how far the driver has turned the steering wheel, and the yaw of the vehicle 1000. The sensors direct small electric motors built into the headlight casing to turn the headlights 1004. Adaptive headlight 1004 may turn the lights up to 15 degrees from center, giving them a 30-degree range of movement, by way of example only.

Backup warning 1006 may also be equipped in vehicle 1000. Backup warning 1006 may include a camera system for use by the driver and also a warning system 1006 that provides a driver with sound and visual aids to alert the driver of dangers that are being approached while vehicle 1000 backs up.

Vehicle 1000 may also include a lane departure system 1008. Sensors for a lane departure 1008 may also be included in the side mirrors as well (not shown). Lane departure 1008 may prevent high speed accidents on highways and freeways. By warning the driver, or even taking automatic corrective actions, these lane departure systems 1008 are able to prevent many collisions and accidents. Generally, a lane departure system 1008 monitors the lane markings on the roadway, which sounds an alarm whenever vehicle 1000 starts to deviate from its lane. The driver can then take corrective action, which can prevent a run-off-road accident or a collision with another vehicle. Lane departure system 1008 may also include a more proactive version, often referred to as a lane-keeping system. Lane departure system 1008 may take action to keep the vehicle 1000 from drifting, if the driver does not respond to an initial warning.

Vehicle 1000 may also be equipped with forward collision warning systems 1010 and forward collision braking systems 1012. Forward collision warning systems 1010 may include collision warning and mitigation systems that detect potential collisions with slow moving or stationary objects in the vehicle's 1000 path, and either warn the driver or automatically take evasive action. Collision warning 1010 may use radar, laser or optical cameras in the vehicle's 1000 nose to detect objects in the vehicle's 1000 path and determine based on the closing speed (the difference in speed between the vehicle 1000 and the object ahead), and the system 1010 may determine if a collision is likely. Collision warning systems 1010 may alert the driver by either sounding an alarm, flashing a light on the instrument panel, vibrating the seat, or some combination of the three or another alerting technique. Collision systems 1010 may combine warnings with some sort of action, such as applying the brakes using the forward collision braking system 1012, for example. Some systems 1010, 1012 may provide steering assistance or prompts. Collision systems 1010, 1012 may also prepare vehicle 1000 for a collision (or its avoidance) by closing the windows, tightening the seat belts, or moving the seats into a position for optimum airbag protection. System 1010, 1012 may pre-charge the brakes, so that the driver gets maximum braking as soon as the brake-pedal is activated.

Vehicle 1000 may include parking assistance systems 1014. The systems 1014 may use a variety of sensors to determine the approximate size of the space between two parked vehicles, and then a built-in computer calculates the necessary steering angles and velocities to safely navigate vehicle 1000 into the parking spot. System 1014 may control the vehicle 1000 with little or no input from the driver.

Other autonomous vehicles 1000 may include technologies such as those described above. Autonomous vehicles may cover technologies from those technologies described herein all the way to steering wheel-less vehicles that operate in a completely autonomous fashion including vehicles such as level 4 vehicles described above.

Figure 11:
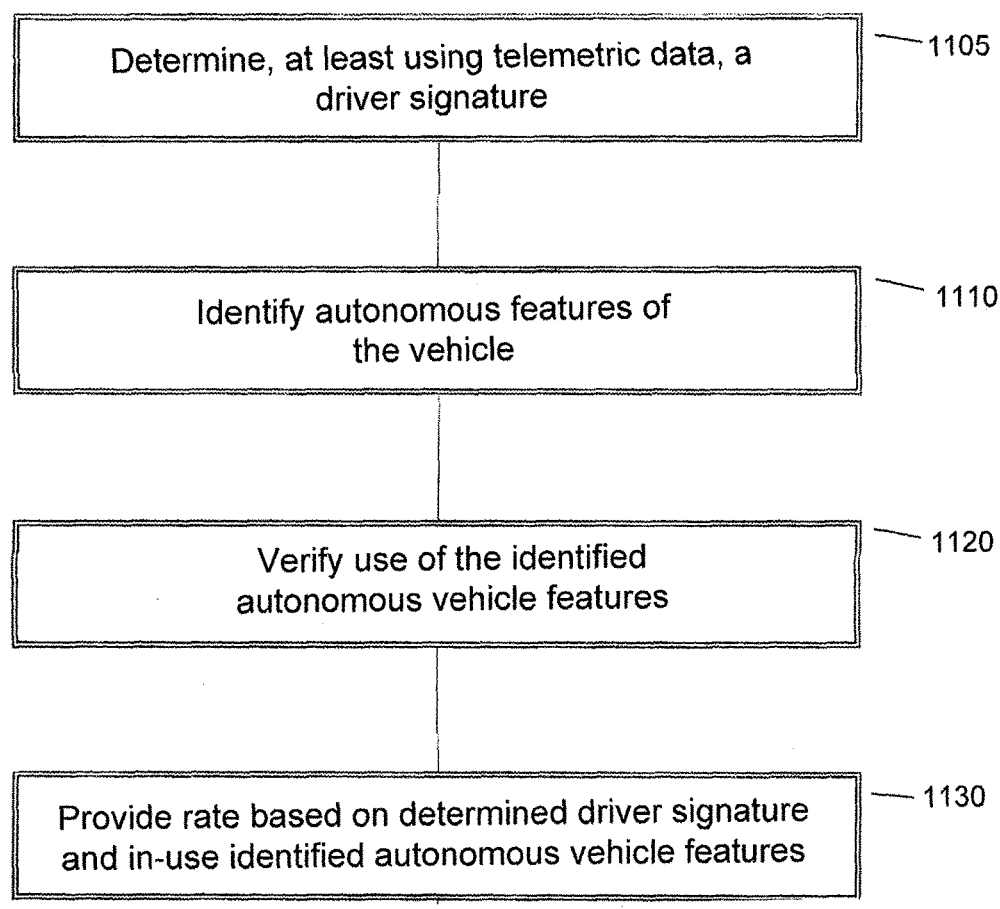
FIG. 11 illustrates a method to account for the various autonomous vehicle systems that may be included within a vehicle in pricing an insurance policy.

In order to account for the various autonomous vehicle systems that may be included within a vehicle in pricing an insurance policy for the vehicle, the method 1100 illustrated in FIG. 11 may be used. In step 1105, a determination may be made, as described herein, of a driver signature.

In step 1110, the autonomous features or systems of the vehicle may be identified. As described herein, this information may be collected via the webpages as depicted in FIGS. 7 and 8, or otherwise collected, such as manually entered or received via a third party like an after-market installation company or a tracking company such as CarFax®. Importantly, in step 1110, a determination is made regarding the features of the vehicle. That is, if the vehicle has autonomous features and if so which ones. If the features are present, where the features installed as stock features or added features installed by the dealer, or where the features added after market by an after-market retailer or the owner of the vehicle.

Method 1100 may include a verification that the identified autonomous vehicle features are being used 1120. In step 1120, a determination is made regarding the use of the feature, i.e., was the feature on/off during use of the vehicle. A feature may be configured to be always "on." Alternatively, a features use value may be determined from the telematics information as described herein. A proxy may be used for representing how much a feature may be "on." For example, if an anti-locking breaking is installed on the car, verification of the fact that the anti-lock braking system is operational (turned on) may be the initiator of the reduced insurance premium. For example, if the system is installed in the vehicle, but the driver (or other operator such as an owner) of the vehicle disables the system or otherwise turns the system off, the vehicle may not qualify for that respective discount while configured in this way. However, the fact that the autonomous features are included on the vehicle may still provide some discount, because for example owners of vehicles with autonomous features may be known to be safer, for example.

Method 1100 may provide a rate based on the driver signature (as discussed herein) and the in-use (including discount for having a vehicle with certain safety features even if the feature(s) are off) identified autonomous vehicle features 1130. This rate may be based on which types of autonomous features are used, how frequently the features are used, which driver the features displace, the combinations of features being used, and the like.

By way of example, a certain combination of autonomous features that are in use, such as forward collision breaking and backup braking, may be known to reduce accidents and may be combined to provide a larger rate reduction for the vehicle than potential other combinations of autonomous features. Each autonomous feature may have its use weighted in the ultimate calculation of premiums. The weight provided for a feature may be based on the amount of safety that the feature provides relative to the risk associated with the driving that is being performed. Some, or all, of the features may have the same weight when performing rate reduction calculations.

Further, autonomous features that take the place of drivers who are known to be particularly prone to accidents provide a further rate reduction with respect to those features that are replacing relatively safer drivers, for example. The statistics show that 92% of accidents are a result of driver error, and the use of autonomous features to replace as great a percentage of the human driver (particularly those where there is driver error) the greater the reduction in accidents.

Use of autonomous features during certain times of the day, and/or during certain types of driving may also increase the rate reduction. For example, use of features during lazy Sunday drives may provide one reduction level, while the use of the same features during rush hour on main roads may provide a higher rate reduction.

In modeling the use of autonomous features in a vehicle for providing insurance premiums, a multi-variate algorithm may be used. This algorithm may provide an exposure base and or a separate base rate, such as one base rate with the autonomous features and another base rate without the features. Liability may be credited as between the two rates based on use of the autonomous features. The autonomous algorithm may account for the environments that the vehicle is used in, as described herein, and the various configurations of the vehicle. Snapshots of claims based on accidents may be used to hone the algorithm, including those claims for a single crash.

In either of the two base rate scenarios or the algorithm, a weighted mileage may be deducted from the metric to arrive at the appropriate premium. By way of non-limiting example only, a vehicle having two autonomous features may be used. A first feature of the two is activated 66% of the time the vehicle is in use and provides a reduction of premium of 10%. The second of the two features is always on and is activated when the vehicle is being operated at less than 20 miles per hour. The second feature provides a 25% rate reduction for any miles meeting the speed criteria. For this particular example, the vehicle is operated at less than 20 miles per hour for 10% of the miles driven. In this case, the two features may operate cumulatively. The first feature provides a 6.6% rate reduction (66% of the time for a premium of 10%) and the second feature provides a 2.5% reduction (25% reduction 10% of the time). This vehicle may be eligible for a 9.1% discount on the premium of the vehicle.

While the present discussion has generally focused on vehicles, such as cars, for example, the concepts may be equally applicable to automobiles, boats, motorcycles, ships, commercial fleets, truck vehicles, and other insured items that may include autonomous features and other signatures associated with the insured items.

Additionally, the present system may be configured to cover a driver in a ride-share network. This may occur when a user of a vehicle drives the car of another person and/or may occur when there is a central car service, such as a Zipcar, for example. This may affect the pricing of premiums and coverage, and may be assessed using the tracking described herein. For example, the vehicle may be tracked to determine whether the vehicle owner is driving, the borrower driver is driving, and the amount of autonomous driving that is occurring. Specifically, during a given day, say the vehicle owner drives 75% of the miles and a borrower driver drives the other 25%. Of those miles, there is a calculated 20% autonomous driving ratio distributed equally between the two drivers. In this situation, the rating for the vehicle is the perfect autonomous driving score of 1 times the 20% that the autonomous driving occurs plus the owner's driving score times 60% (75% driving for 80% of the time) plus the borrower's score times 20 (25% driving for 80% of the time).

Further, the vehicle may provide autonomous features where the vehicle is connected to weather data and based on the weather data moves into the garage, for example. Alternatively, the vehicle may move to a safer location based on the weather data, for example. In either situation, the vehicle may monitor the weather information, and upon receipt of information that requires movement, may turn itself on and move as appropriate to aid in protecting the vehicle. Such a feature may reduce premiums on comprehensive by avoiding hail damage and other types of damage that occur as a result of weather accidents.

Figure 12:
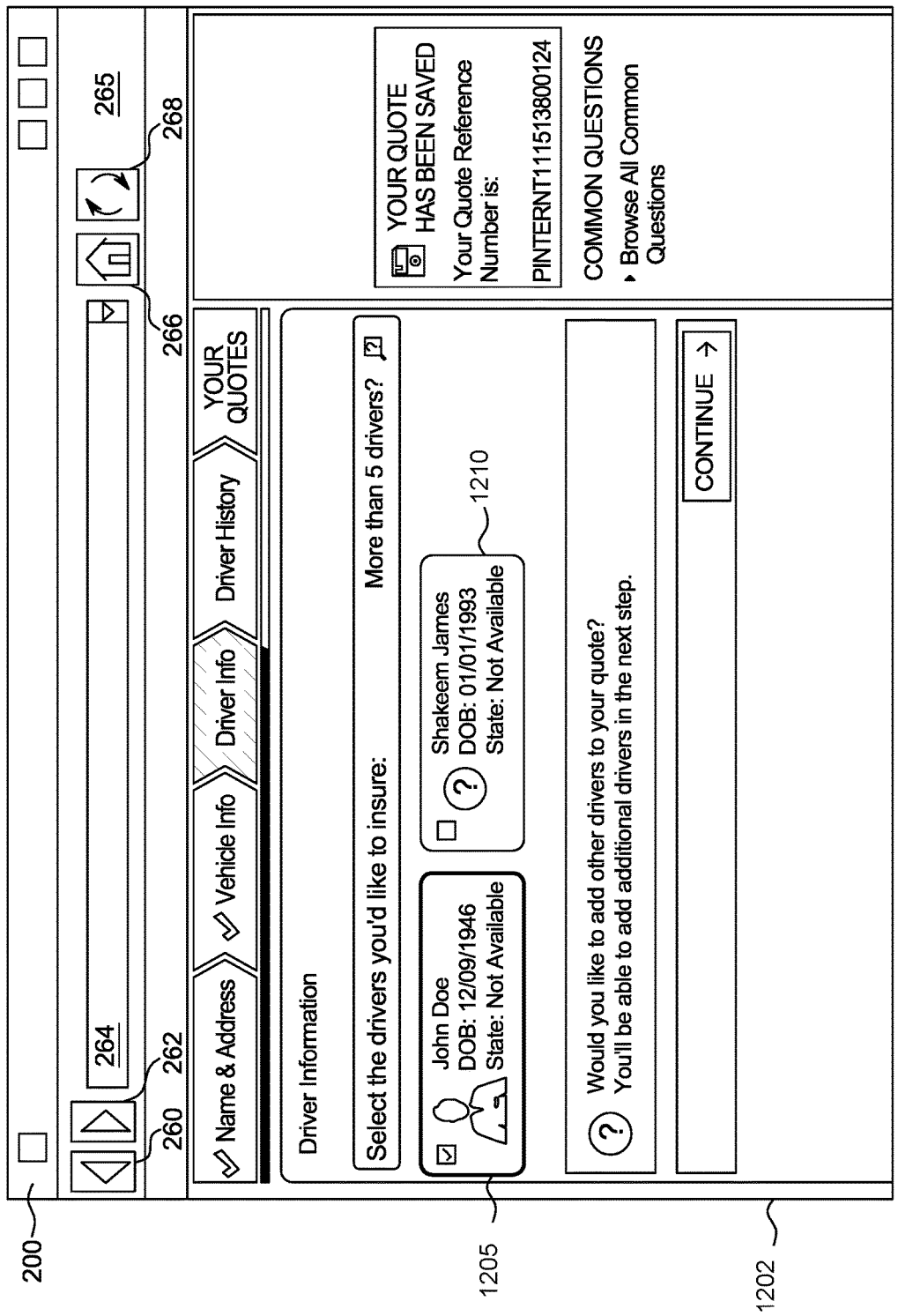
FIG. 12 is an example web page soliciting driver information regarding a request for a vehicle insurance quote.

FIG. 12 is an example web page 1202 soliciting driver information regarding a request for a vehicle insurance quote. As shown in FIG. 12, the web page 1202 may include buttons 1205 and 1210. As the user device 130 receives inputs, the web browser module 132 may store one or more data structures ("response data") that reflect the selections made. Further, as the selections are updated, the web browser module 132 may update the web page 1202 to indicate additional or more specific questions that may be associated with the input. The question displayed on web page 1202 solicits information regarding the identity of vehicle(s) for which insurance is being requested. Button 1205, for example, contains information that is generated based on the user information entered via web page 1202. Additionally, the system 100 may be configured to access data associated with the address information and determined suggested drivers, as shown in button 1210. If there are no errors in the transmission, the web browser module 132 is directed to a subsequent web page.

Figure 13:
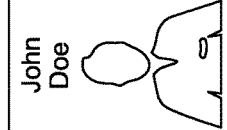
FIG. 13 is an example web page soliciting additional driver information regarding a request for a vehicle insurance quote.

FIG. 13 is an example web page 1302 soliciting additional driver information regarding a request for a vehicle insurance quote. As shown in FIG. 13, the web page 1302 may include input fields 1305-1345, for example, input fields Gender 1305, Marital Status 1310, Birth Date 1315, Age First Licensed 1320, Social Security Number 1325, Which best describes your primary residence 1330, Have you lived in your current residence for 5 years or more 1335, Do you currently have a homeowner policy from the Hartford? 1340, and Defensive Driver course in the past 3 years? 1345. As the user device 130 receives inputs, the web browser module 132 button may store one or more data structures ("response data") that reflect the selections made. Further, as the selections are updated, the web browser module 132 may update the web page 1302 to indicate additional or more specific questions that may be associated with the input. The question displayed on web page 1302 solicits information regarding the identity of vehicle(s) for which insurance is being requested. The system 100 may have access to additional database information to confirm or auto-fill information in the web page 1302. For example, based on the user's social security number, the system 100 may determine background information or confirm the identity. Web page 1302 allows the user to enter all of the additional drivers to be insured, along with their corresponding information. Additional information may also be requested, for example, height, weight, cell phone number, employment information. The system 100 may further be configured to access information, for example from the local department of motor vehicles. This may enable the insurance company to access height and weight information, which may be used for driver signature identification as described in greater detail below. If there are no errors in the transmission, the web browser module 132 is directed to a subsequent web page.

Figure 14:
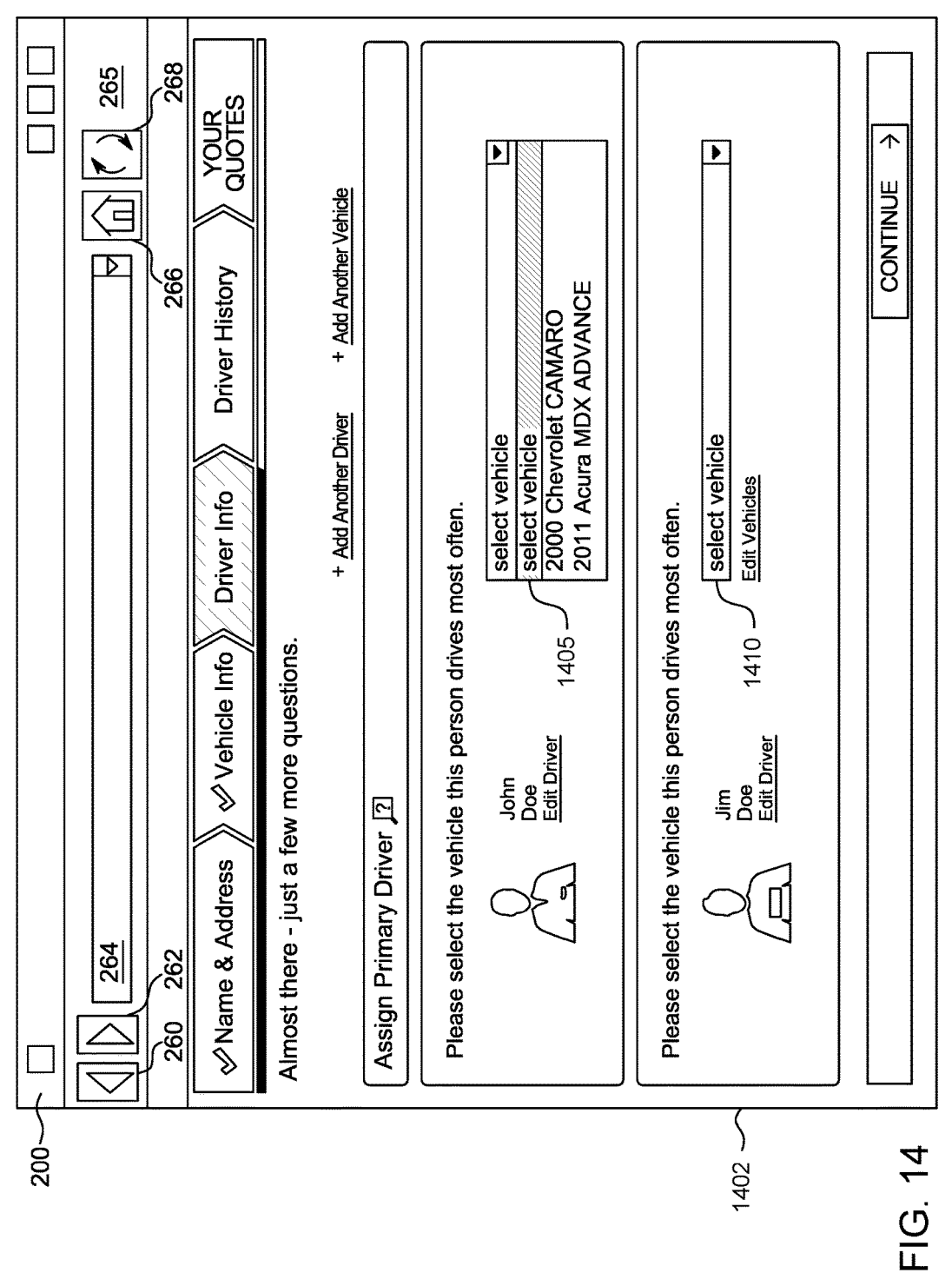

FIG. 14 is another example web page 1402 soliciting additional information regarding a request for a vehicle insurance quote. As shown in FIG. 14, the web page 1402 may include dropdown menus 1405 and 1410. As the user device 130 receives inputs, the web browser module 132 may store one or more data structures ("response data") that reflect the selections made. Further, as the selections are updated, the web browser module 132 may update the web page 1402 to indicate additional or more specific questions that may be associated with the input. The question displayed on web page 1402 solicits information regarding the primary vehicles being driven by each driver. If there are no errors in the transmission, the web browser module 132 is directed to a subsequent web page.

Figure 15:
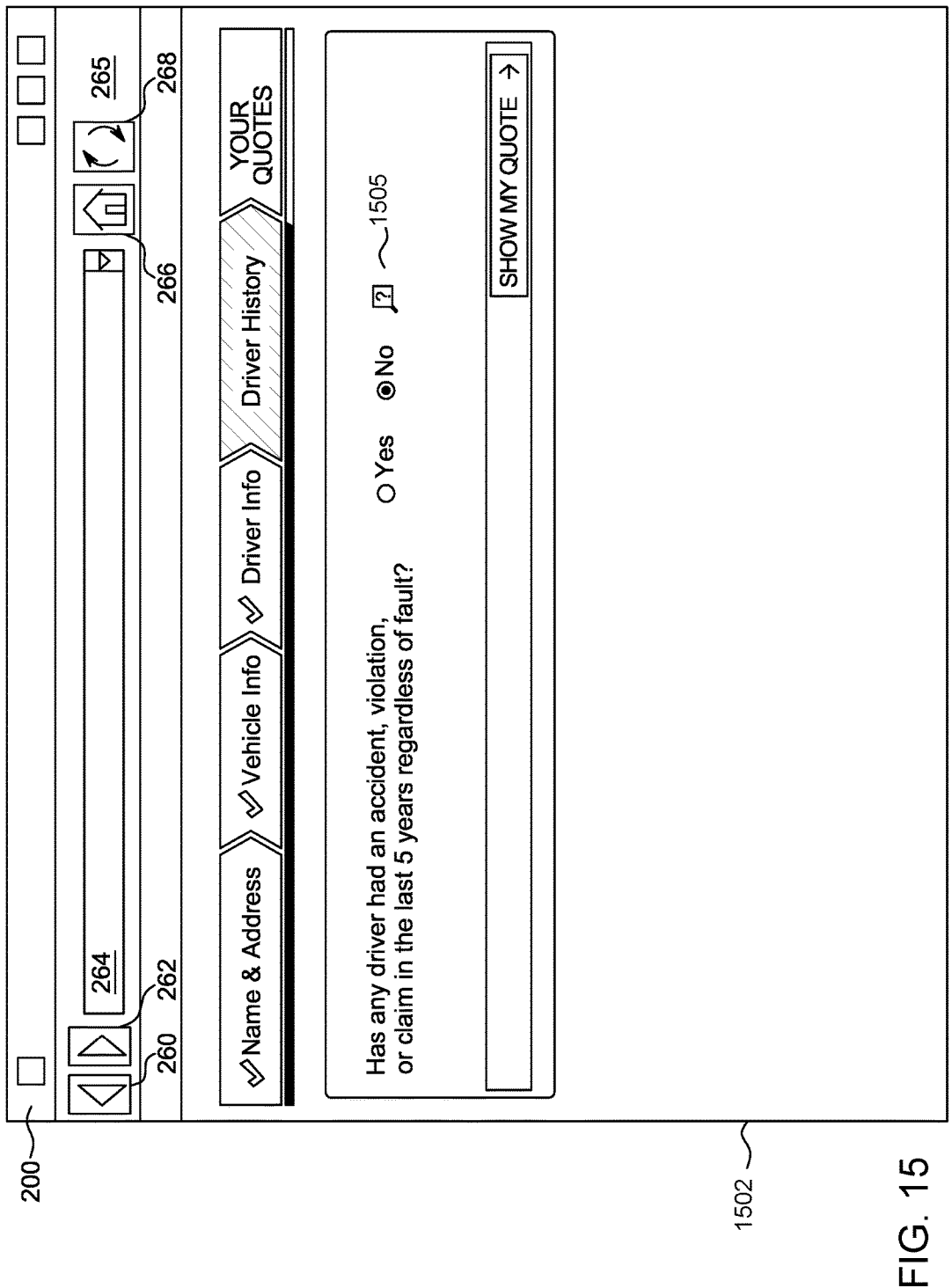
FIG. 15 is an example web page soliciting driver history information regarding a request for a vehicle insurance quote.

FIG. 15 is an example web page 1502 soliciting driver history information regarding a request for a vehicle insurance quote. As shown in FIG. 15, the web page 1502 may include radio button 1505. As the user device 130 receives inputs, the web browser module 132 may store one or more data structures ("response data") that reflect the selections made. Further, as the selections are updated, the web browser module 132 may update the web page 1502 to indicate additional or more specific questions that may be associated with the input. The question displayed on web page 1502 solicits information regarding the driver history for each of the drivers. If there are no errors in the transmission, the web browser module 132 is directed to a subsequent web page.

Figure 16:
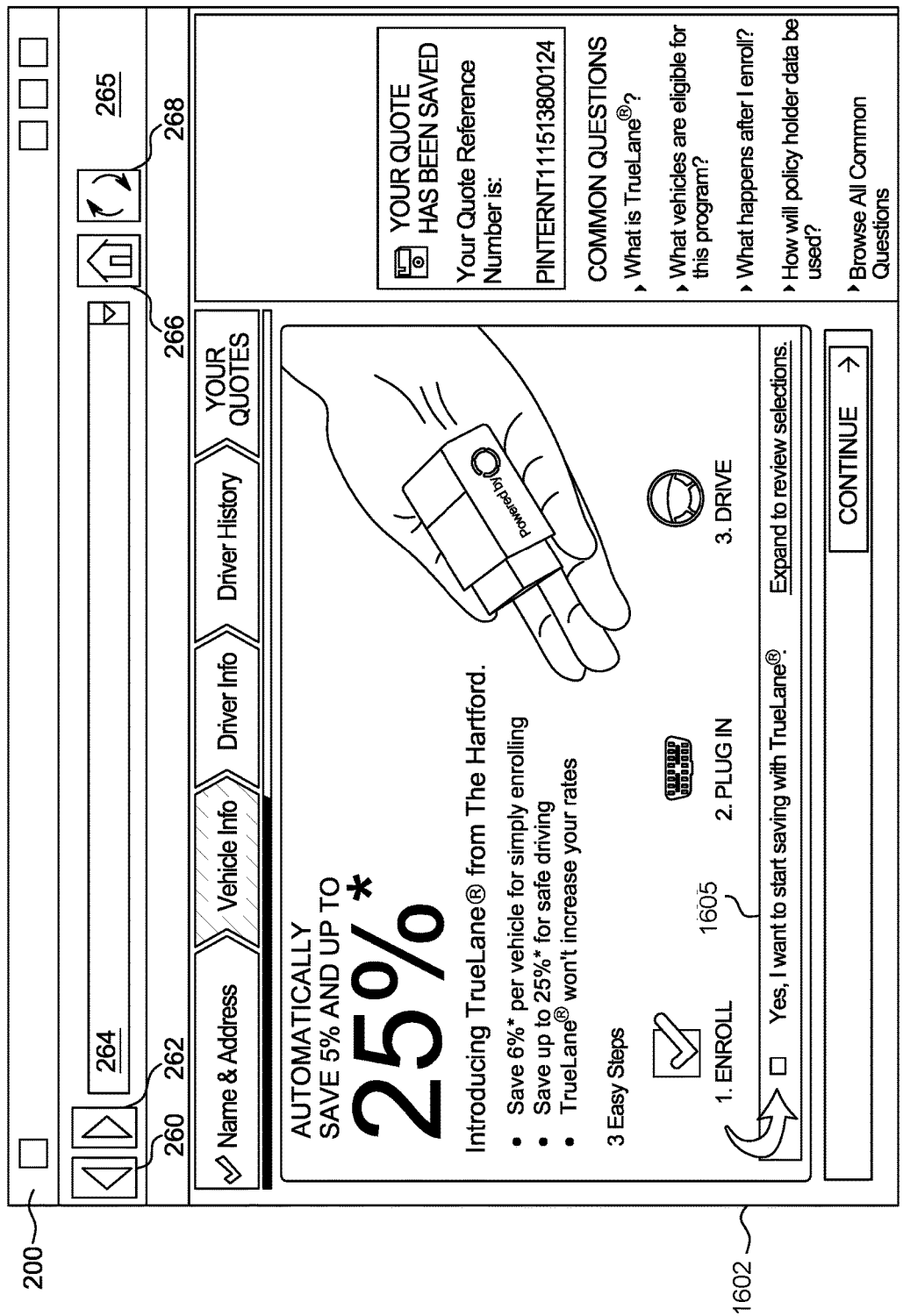
FIG. 16 is an example web page soliciting a response from the user for registration to TrueLane® telematics program.

FIG. 16 is an example web page 1602 soliciting a response from the user for registration to TrueLane® telematics program. As shown in FIG. 16, the web page 1602 may include a checkbox 1605. As the user device 130 receives inputs, the web browser module 132 may store one or more data structures ("response data") that reflect the selections made. Further, as the selections are updated, the web browser module 132 may update the web page 1602 to indicate additional or more specific questions that may be associated with the input. Based on the previous answers supplied by the user, the system 100 determines whether the user is eligible for the TrueLane® discount. Alternatively, if the driver or vehicle is in a higher risk category, TrueLane® may be required in order to receive or maintain insurance coverage. The question displayed on web page 1602 confirms enrollment in the TrueLane® telematics program. If there are no errors in the transmission, the web browser module 132 issues a quote.

While the below examples describe a scenario wherein a new customer registers for insurance and then the system 100 adjusts the pricing information based on telematics data. The systems and methods described herein may be applied to current and former customers who are looking to renew their coverage. In this scenario, the biographical information and historical driver information may already be stored on the insurance server 180, and the DPU 170 may access this information directly.

In addition to the example information above, additional information may be determined during or after the registration phase. For example, Table 1 shows biographical information that may be used in generating driver risk profiles.

TABLE 1

| Additional Driver Information |
|---|
| Primary Metric |
| Household Composition |
| Presence of Married or Domestic Partners/Total Number of Drivers |
| Youthful Policy Composition |
| Driver Age/Gender-Marital Status |
| Driver Age/Annual Mileage |

TABLE 1-continued

| Additional Driver Information |
|---|
| Limited Driving |
| Driver Age/Driver Training |
| Driver Age/Good Student |
| Driver Age/Principal/Occasional Operator |
| Driver Age/Years Licensed |
| Vehicle Age*/Driver Age |
| Driver Age/Prior BI Limit |
| Driver Age/Number of Drivers |
| Driver Age/Number of Vehicles |
| Driver Age - Household Composition |
| Primary Insured Age |
| Primary Insured Gender |
| Secondary Insured Age |
| Primary and Secondary Driver Age Difference |
| Secondary Metric |
| Vehicle Age*/Number of Vehicles |
| Annual Mileage |
| Vehicle Use |
| Number of Renewal Years |
| Safe Driver Insurance Plan |
| Chargeable at-fault accidents - First Year/Subsequent Years |
| Safe Driver Insurance Plan |
| Minor violations excluding speeding - First Year/Subsequent Years |
| Safe Driver Insurance Plan |
| Major violations excluding DWI - First Year/Subsequent Years |
| Safe Driver Insurance Plan |
| Minor violations - speeding only - First Year/Subsequent Years |
| Safe Driver Insurance Plan |
| Major violations - DWI only - First Year/Subsequent Years |
| Usage Based Insurance Score |

The system 100 may be configured to weight each factor based on actuarial date. For example, in the example above, there are two categories, primary and secondary wherein each factor within a particular category may be weighted equally. However, each factor may be assigned a unique weight.

The registration phase is used to generate an initial risk profile, as shown in Table 1, above. During the registration phase, the system 100 receives biographical information about each of the drivers that may be associated with the user's account as well information about the vehicles for which coverage is requested. With millions of accidents each year, a large amount of data is available on factors that may affect the likelihood of an accident as well as the severity of the accident. The database 176 associated with the DPU 170 contains information regarding accident information. The DPU 170, using a multivariate analysis, generates the initial driver profile based on the provided biographic information verses the factors stored in the database 176. Where allowable by law, one factor that may be used in generating the initial risk assessment is based on the zip code of the insured's home/garaging address. For example, initial risk assessment may be based on a territory risk score assigned using the home/garaging zip code. The territory risk score is based on data such crime data, accident data, weather data etc. that might be considered as direct exposure variables. An example, low resolution, risk assessment is shown below in Table 2.

TABLE 2

Initial Risk Assessment

| Location | Percentage Time Stored in Location | Location Risk |
|---|---|---|
| Home | 25 | 1 |
| Office | 40 | 1.5 |
| Low Risk Locations | 7.5 | 0-3.3 |
| Medium Risk Locations | 20 | 3.4-6.6 |
| High Risk Locations | 7.5 | 6.7-10 |

As shown in Table 2, based on the entered biographical information, the initial risk assessment is generated predicting the amount of time the vehicle 140 may be stored in various locations. The DPU 170 may be configured to determine the specific risk associated with the home and office locations entered by the user. Additionally, if a student is listed as a driver, the school may be added as an expected location. The list above is by no means exhaustive. Based on the entered biographical information, the DPU 170 may also be configured to generate an expectation on time spent in low risk, medium risk, and high risk locations (other than the specific expected locations.) This information may be used to generate rate pricing information.

During the registration phase, the system 100 receives biographical information about each of the vehicles and the expected drivers for each vehicle and the percentage each driver is expected to use each vehicle. This may be used as a baseline to create vehicle profiles.

The inside of vehicle 140, may include a plurality of electronics devices and sensors that may communicate information to the telematics device. The vehicle 140 may include a microprocessor and memory that may operatively connect to each individual electronic device. For example, there may be electronic devices associated with the seats, A/C units, global positioning satellite (GPS)/stereo system, DVD unit, and BLUETOOTH equipment. The microprocessor may also be in communication with the headlights, engine, traffic signals, rear view mirror, rearview cameras, cruise control, braking system and inner workings of a vehicle. There may also be additional devices such as multiple user devices 130 brought by passengers into a vehicle. The telematics device is configured to receive information from the electronics in the vehicle 140. For example, the telematics device is configured to receive data concerning, speed, braking, location, seat settings, lane changes, radio volume, window controls, vehicle servicing, number of cellular devices in a vehicle, proximity to other vehicle's and their devices, etc. The telematics device may be configured to transmit the telematics data directly to the DCU 110. The DCU 110 may then format the telematics data and transmit it to the DPU 170. The DPU 170 may use a software based algorithm to analyze the telematics data to identify driving segments wherein each driving segment is associated with a driver signature. The DPU 170 may then categorize each signature as a known or unknown driver. Wherein the DPU 170, a signature with drivers listed on the insurance, may associate. The DPU 170 may further be configured to categorize unknown driver signatures as potentially impaired/distracted driving. The DPU 170 may compare the driver signatures with the expected drivers to determine the driver of a vehicle for each determined driving segment.

The DCU 110 may be configured to format the telematics data (e.g. provide a summary) to the DPU 170. Once the account has been activated, the DPU 170 may be configured to use this information to determine the destination information associated with each vehicle.

The telematics device may be configured to provide telematics data periodically as well as based on a trigger. In one embodiment, if the vehicle 140 is stopped for a predetermined period of time, or the vehicle 140 is turned off, idled, or otherwise stationary, the telematics device may be configured to transmit a signal identifying the location as a stopping point. The telematics device may transmit the recorded information to the DCU 110 which is then transmitted to the DPU 170.

As shown below in Table 3, the DPU 170 may be configured to receive and store location information associated with the vehicle 140 and determines destination information. Based on the reported locations, the system 100 may generate a database with information including stoppage times, the duration of the stoppage, the location of the stoppage, and other factors (e.g. phone in use.) The DPU 170 may be configured to store map information, including nearby businesses and points of interest for each location. Alternatively, the DPU 170 may be configured to communicate with third party applications, such as GOOGLE® Maps, which contain location information about nearby businesses etc. The DPU 170 may determine nearby locations (which may be possible destinations for the driver). The DPU 170 may also be configured to account for other factors, such as stopping for a phone call.

TABLE 3

Measured Destination Information

| Time Stopped | Duration | Phone in Use | Location | Nearby Locations | Location Risk | Behavior Risk |
|---|---|---|---|---|---|---|
| 1:05am | 1:00 | N | 32606 | Moe's Tavern | 104 | 183 |
| 2:35am | 5:02 | N | 32605 | Home | 100 | 100 |
| 9:07am | 10:13 | N | 32611 | Office | 107 | 154 |
| 8:50pm | 0:14 | Y | 32951 | Highway | 155 | 75 |
| 1:09am | 75:12 | N | 32605 | Home | 100 | 121 |
| 4:43pm | 142:19 | N | 32601 | Airport | 179 | 103 |

The DPU 170 may be configured to analyze the data using a multivariate analysis. Based on the received destination information, the DPU 170 may calculate a direct exposure risk rating and indirect exposure risk rating, where the direct exposure risk rating may comprise physical risks to the vehicle 140 based on the location and indirect exposure risk rating may incorporate behavioral risks.

As an example above, the direct risk exposure may comprise information based on the location risk, which may be affected by vehicle density, lighting, outdoor/indoor parking, storing a vehicle in a neighborhood with a high number of break-ins or thefts, storing a vehicle in areas with high numbers of uninsured drivers. The DPU 170 may be configured to communicate with external servers 190 that may provide detailed crime information for predetermined areas (e.g. 1 meter). Additionally, the DPU 170 may communicate with external servers to determine weather information and real time traffic density and pedestrian density.

The DPU 170 may be configured, using a multivariate analysis to compare the destination information with the initial risk assessment.

The RPU 160 may access the database 176 associated with the DPU 170 to determine adjusted pricing information based on the destination information.

The direct exposure rating may be determined based on loss data associated with a location. The DPU 170 may generate a risk location map, wherein each location is assigned a score. At a macro level, this score may be assigned based on a zip code; however, the risk location map may be generated with more or less granularity. The duration and time of day during which a vehicle is parked at a destination may be accounted for in determining the direct exposure rating. Additional factors may also be accounted for, for example, whether the vehicle is in a garage or the weather associated with each location.

The system may use a multivariate analysis to generate the value of the risk. For example, parking a vehicle 140 in a location known for hail storms may present a high risk of damage; however, if the vehicle 140 is inside a garage, the risk might be mitigated.

Based on the home or garaging location, cited by the user, the risk location map is weighted to set the home location as a value of 100. An example of a risk location map is shown in Table 4, below:

TABLE 4

Risk Location Map

| Zip | Score | % of time parked |
|---|---|---|
| 32605 | 100 | 0.3 |
| 32606 | 104 | 0.1 |
| 32611 | 107 | 0.1 |
| 32951 | 155 | 0.1 |
| 32601 | 179 | 0.5 |

Each location in the risk location map is then compared with the home/garaging location. During the registration phase, the system 100 may only have received information regarding the home or garaging address; accordingly, the initial rate may have been based on that single variable analysis. The DPU 170 may use the telematics data to determine the time spent at each location, as shown in Table 4.

The DPU 170 may then calculate a direct exposure relativity according to Eq. 1:

Direct exposure relativity=rates weighted by time spent in the location/rate of home location (Eq. 1)

The direct exposure relativity, calculated by the DPU 170, may also account for the time of day in which the vehicle is stored at a location. For example, parking in a high traffic parking lot may be safe with respect to thefts during the day but more likely to be involved in an accident. But at night, the location may be a high theft area. Accordingly, the direct exposure relativity may further comprise weighting factors for the time of day and duration for which a vehicle is stopped at a destination.

The system 100 may further access additional data to assess the risk of a location for the vehicle 140; for example, the number of accidents or thefts in an area. As the amount of data increases, the system may identify a gradient of vehicle values in an area. Accordingly, a high value vehicle commuting to an area with predominantly low value vehicles may be considered an additional risk.

The indirect exposure rating accounts for behavioral patterns that may be correlated with destinations. Studies have shown correlations between risk appraisal and risky behaviors and the numbers of traffic offenses. Personality traits have been associated with the type of sensation seeking behavior that may result in accidents and therefore the filing of a claim.

Currently, speeding tickets are used to identify a propensity for driver speeding. And propensity for speeding is used to calculate the expectation of an accident or some event for which a claim is filed. However, the number of speeding tickets may not be indicative of the amount of risky behavior exhibited by a driver. For example, one driver may travel at speeds a few mph over the limit on a heavily monitored road, whereas a second driver may speed 30 mph over the speed limit on an unmonitored road. In this scenario, the first driver may receive more tickets, while representing a lower insurance risk. The indirect exposure rating provides the insurance company with additional risk assessment data to further refine insurance rates.

The DPU 170 may be configured to compile information, regarding high risk behaviors, based on the location to which a vehicle is driven. For example, a vehicle that is stopped at a sports stadium, during a big game, the vehicle is more likely to be surrounded with a high number of vehicles that are expected to start moving at approximately the same time. The DPU 170 may contain statistical information that a person at a sporting event is less likely to speed but more susceptible to a low speed fender bender. The DPU 170 may further contain statistical information regarding whether a person attending sporting events is more or less likely to be involved in reckless driving, or more or less likely to be involved in an incident in which a claim is filed.

The indirect exposure rating may further provide granularity and detail to the direct exposure rating. For example, a police impound lot may be determined to be a very safe location, based on the direct exposure rating. There may be a low chance of theft or other damage. However, the indirect exposure rating may account for this as being a risky behavior, since an impounded vehicle may be an indicator that the vehicle is not being properly monitored by the owner.

Accordingly, in addition to the risk location map, the DPU 170 may be configured with a behavior risk map that similarly charts out potential behavior risks associated with each location. An example of a behavior risk map is shown below in Table 5:

TABLE 5

Behavior Risk Map

| Location | Nearby Locations | Behavior Risk |
|---|---|---|
| 32606 | Moe's Tavern | 183 |
| 32605 | Home | 100 |
| 32611 | Office | 154 |
| 32951 | Highway | 75 |
| 32601 | Airport | 103 |

Using the behavior risk information and the time and duration a vehicle 140 is stopped at a location, the DPU 170 may generate an indirect exposure score. For example, if the DPU 170 detects that a vehicle is parked near a Fenway Park 81 times a year, DPU 170 may indicate this pattern as an increased risk for dangerous behaviors.

The DPU 170 may further be configured to correlate this information with other bibliographical information. For example, biographical information indicates that one of the insured individuals on the account works at said Fenway Park, and then the DPU 170 may determine that the behavior is not a high risk behavior.

To avoid "false positives" that indicate risky behavior, additional measures may be put into place. For example, in the case someone frequently visits a sporting venue, the system may contain measures that avoid the chance of penalizing good Samaritans who may serve as designated drivers for their friends. Accordingly, if the risk factor associated with the location is associated with poor driving afterwards, the system may be configured to monitor driving immediately after leaving the class of location to determine impairment or noticeable changes in driving signature.

The system 100 may further be configured to determine whether the vehicle 140 is a self-driving vehicle, in which an on-board computer operates the vehicle. In this case, the effect of the indirect exposure may be reduced when determining the pricing information.

The system 100 uses the biographical information provided in web pages 302-1302 as a baseline for generating the initial pricing information. However, the telematics data, provided by the telematics device may be used to refine this information. The RPU 160 may access the information stored in the DPU 170, and use a software based algorithm to determine whether to adjust the rate or to assess a credit or penalty/surcharge.

In a first example, the system 100 may offer the user a predetermined discount to sign up for the telematics device. The system 100 may be configured to generate a discount factor, for example according to the Eq. 2:

$$\text{Discount relativity} = \text{starting discount} * \beta_1 \rho_1 * \beta_2 \rho_2 * \beta_3 \rho_3 * \ldots \beta_n \rho_n, \quad \text{(Eq. 2)}$$

where $\beta$=weighting factor and $\rho$=direct and indirect exposure ratings.

For example, the starting discount may be 10%, and if the product of the direct and indirect exposure ratings with the weighting factors>1, the system 100 may determine the driver is not eligible for a discount.

The system 100 may identify the driver based on the seat, mirror settings of the vehicle. The DPU 170 may identify the driver based on the route or destination in which the vehicle 140 is travelling (for example, based on the employment information, if the vehicle drives and parks for an extended time at an office, it may identify the driver.) Alternatively or additionally, if a user device 130 is connected with the vehicle 140 via BLUETOOTH, it may identify a phone number associated with the user device 130 and identify the driver based on that information. To further enhance this data, if the user device 130 is used for a phone call over the speaker phone, based on the location of the microphone that picks up the speech, the identification of the driver may be determined more accurately using voice recognition techniques.

Some vehicles 140 may automatically adjust the driving position based on an electronic key that is used for entry into the vehicle or to start the vehicle. The telematics device may be configured to identify the key used to activate the vehicle 140. Then, if the seat/vehicle setting remains the same, for example, the telematics device may transmit this information to the DCU 110, which then transmits the telematics data to the DPU 170 which is able to determine that the driver is the same as the registered or expected key owner. If the seat/vehicle settings are adjusted, then a DPU 170 may determine that a different driver is driving the vehicle 140.

In one embodiment, the DPU 170 may use the implicit driver identification, based on telematics data, to identify the number of unique driver signatures operating each vehicle and the amount of time each of the unique driving signatures are operating each vehicle including the vehicle driving or partially driving itself. The DPU 170 may use this information to determine the number and identity of drivers for each vehicle on the policy. The DPU 170 may communicate this information to the RPU 160, which may be configured to adjust the pricing information associated with the account. The pricing information may be adjusted, for example, by modifying the rate or rate category associated with the account or by providing a discount or penalty to the previous rate.

In another embodiment, the DPU 170 may be configured to access social media information associated with the drivers, and this information may be stored, for example on storage 192 associated with external servers 190. For example, the DPU 170 may receive data from an external server 190 associated with GOOGLE or FOURSQUARE or other similar application, which tracks an individual's location. The DPU 170 may be configured to compare the checked in location with the location of the vehicle 140 indicated by the telematics device and thereby identify the driver.

In another example of implicit driver identification, the DPU 170 may be configured to determine the driver based on the location of the vehicle 140. For example, if the vehicle 140 is driving to or parked at one of the insured's offices, the DPU 170 may identify the driver as a particular person.

The telematics device may be configured to transmit explicit driver identification information to the DCU 110. The vehicle 140 may be equipped, for example, with biometric readers that explicitly identify the driver. For example, to activate the vehicle 140, the driver may submit a fingerprint, retina sample, a voice sample or other similar biometric data. The telematics device may be configured to transmit this explicit identification information to the DCU 110.

The DCU 110 is configured to receive telematics data which is then formatted and sent to the DPU 170. The DPU 170 analyzes the information and clusters the time into segments. The segments may include time during which the vehicle 140 is being driven and time the vehicle 140 is parked. The DPU 170 may use telematics data and associate a driver or a driver signature with each driving segment. The RPU 160 may use the driver signature information in a number of ways to adjust the pricing information. The RPU 160 may be configured to assess risk associated with coverage without identifying the driver, and only the driving behavior. In this embodiment, the RPU 160 generates a risk assessment or profile, which may be based on the risk associated with insuring the vehicle based on the vehicle and the driver signatures.

An example of the telematics data, stored and transmitted by a telematics device is shown in Table 6, below. The telematics device may be configured to include an event/status monitor of the vehicle's 140 activities. An example of the event/status log, which may be stored in a database operatively coupled to the telematics device.

TABLE 6

Telematics Information Recorded

| Time | Speed | Accel | Radio Volume | Phone | Location | Brakes | Turning | Turn Signal |
|---|---|---|---|---|---|---|---|---|
| 1:05am | 76 | 4 | 8 | | 32605 | | | |
| 1:06am | 86 | −6 | 8 | Y | 32605 | Y | | |
| 1:07am | 54 | 30 | 8 | | 32606 | | | |
| 1:08am | 86 | −2 | 9 | N | 32606 | Y | Y | N |
| 1:09am | 52 | −30 | 9 | | 32606 | | | |

The telematics device may be configured to take periodic measurements regarding the vehicle, as well as event triggered measurements. For example, the telematics device may be configured to take readings every 1 second. The telematics device may be configured with different intervals for each measurement, for example, while speed may be reported every second, the radio volume may be reported each minute. The DCU 110 may be configured to receive this information and format the information to the specifications required by the DPU 170. Additionally, the telematics device may be configured to take readings based on event triggers, such as a detected turn, brake event, and phone activation, etc. The example above is not exhaustive; the metrics are shown as example only.

In another embodiment, the DPU 170 may be configured to determine when a braking event occurs. In this example, the DPU 170 may be configured to analyze speed and acceleration information to determine whether a braking event occurred. For example, if the acceleration telematics data is below a threshold, a braking event may be declared.

Similarly, if the positioning of the vehicle 140, relative to a determined center line of a road veers, the DPU 170 may determine a turn event, a lane change event, or impaired driving.

This information is received, by the DPU 170, which may then perform analysis to determine driver signatures.

Based on the type of plan, the RPU 160 may access the database 176 associated with the DPU 170 to determine risk and pricing information.

The RPU 160 may determine the pricing based on the percentage of time each vehicle is driven by a particular driver. The DPU 170 may associate each driving segment, based on the driver signature of that segment, with a driver. After associating each driving segment for a vehicle 140 with a driver, the DPU 170 then calculates percentages of vehicle driving time to apportion to each driver.

The system 100 uses the information provided in web page 1402 to generate an initial vehicle usage profile for each of the listed drivers including the vehicle itself. However, the telematics data, provided by the telematics device may be used to refine, replace, or adjust this information including replacing a proxy for autonomous feature usage with actual feature usage. The DPU 170 may use the information received from the DCU 110, to estimate the total use time for a vehicle 140. The system 100 categorizes each segment as being driven by a known driver (i.e. listed on the insurance) or an unknown driver (i.e. third party or impaired driver). Table 7, below shows an example of a usage chart generated by the system 100.

TABLE 7

| | Vehicle 1 | Vehicle 2 |
|---|---|---|
| John Doe | 80% | 10% |
| Jim Doe | 19% | 40% |
| Unknown Driver 1 | .5% | 50% |
| Unknown Driver 2 | .5% | 0% |

As shown in Table 7, above, the system 100 may be able to identify individual drivers. The unknown drivers may indicate that the vehicle 140 is being operated by an impaired driver, a distracted driver or unregistered driver. Additionally, it may indicate that the vehicle is being moved via a tow truck. Based on the received information, the DPU 170 may identify unique driver signatures and categorize the use of each vehicle. The DPU 170 may identify these driver signatures by clustering driving characteristics into segments using a multivariate analysis. The DPU 170 is configured to weight the information, based on the source (e.g. implicit driver identification, explicit driver identification). For example, if biometric readings provide explicit driver identification information, the likelihood of accurate driver identification is higher; it may therefore be weighted higher in the algorithm that determines the likely driver at each time. Implicit identification of a driver may be less accurate; accordingly each implicit identification may be weighted lower. For example, if Jim Doe is 6'8 and John Doe is 5'5, and the DPU 170 has access to seat adjustment information, it may compare the seat placement versus the height of the drivers. In this case the driver settings may provide a reliable indicator of the driver. However, braking, driver speed may be less likely an indicator in certain circumstances.

The RPU 160 may determine pricing information for the account, for example, based on an adjusted rate or a credit or penalty based on this information. For example, if the amount of driving segments that are identified as impaired, distracted or unregistered are above a predetermined threshold, the RPU 160 may determine that the pricing information should be adjusted.

The system 100 may further be configured to proactively adjust pricing information based on dropped high risk behavior. For example, if the DPU 170 determines that the amount of impaired, distracted or unregistered driving is below a predetermined threshold, or if the signature associated with a high risk driver improves or is reduced relative to one or more vehicles.

In another embodiment, the RPU 160 may assign risk, agnostic of the driver, based on the driving signatures. In this example, the RPU 160 requests data from the DPU 170 regarding the driving characteristics. Each use of the vehicle is categorized. For example, see Table 8 below:

TABLE 8

Categorization of Use

|  | Vehicle 1 | Vehicle 2 |
|---|---|---|
| High Risk Use | 25% | 55% |
| Medium Risk Use | 25% | 35% |
| Low Risk Use | 50% | 10% |

Based on the amount of time the vehicle is driven in each risk category, the RPU 160 may determine pricing information without needing to identify the number of drivers or the identity of those drivers.

The registration phase is used to generate an initial risk assessment. During the registration phase, the system 100 receives biographical information about each of the drivers that may be associated with the user's account as well as information about the vehicles for which coverage is requested. With millions of accidents each year, a large amount of data is available on factors that may affect the likelihood of an accident as well as the severity of the accident. The database 176 associated with the DPU 170 contains information regarding accident information. The DPU 170, using a multivariate analysis, generates the initial driver assessment based on the provided biographic information verses the factors stored in the database 176.

The DPU 170 may perform a correlative analysis on the entered biographical information to develop the initial risk assessment which may be based in part on the expected speeding, the expected acceleration, the expected turns, the expected braking, the expected mileage driven, the times of day driven, etc. The list above is by no means exhaustive. Based on the entered biographical information, the DPU 170 may also be configured to generate an expectation on time spent in low risk, medium risk, and high risk locations (other than the specific expected locations.) The RPU 160 may use this information to generate pricing information. For example, the RPU 160 may adjust the rate associated with an account, it may credit or debit a rate and/or to determine adjusted pricing information.

The inside of vehicle 140 may comprise a plurality of electronics devices that may communicate information to the telematics device. Most vehicles include at least one microprocessor and memory that connects to each individual electronic device. For example, there may be electronic devices associated with the seats, A/C units, global positioning satellite (GPS)/stereo system, DVD unit, and BLUETOOTH equipment. The microprocessor may also be in communication with the headlights, engine, traffic signals, rear view mirror, rearview cameras, cruise control, braking system and inner workings of the vehicle 140. There may also be additional devices such as multiple mobile phones brought by passengers into a vehicle. The telematics device is configured to receive information from the electronics in the vehicle 140. For example, the telematics device is configured to receive data concerning, speed, acceleration, turns, braking, location, seat settings, lane changes, radio volume, window controls, vehicle servicing, number of cellular devices in a vehicle, proximity to other vehicle's, etc. The telematics device may be configured to transmit this information directly to the DCU 110.

The DCU 110 may format this information and transmit it to the DPU 170. Once the account has been activated, the DPU 170 may be configured to use this information to determine the relativity factors associated with each vehicle.

The telematics device may be configured to record telematics data periodically as well as based on a trigger. Based on this information, the DPU 170 may be configured to determine a plurality of relativity factors for the measured data categories. In one embodiment, the relativity factors may be based on predetermined road segments.

For example, the DPU 170 may also be configured to categorize portions of road as road segments, wherein road segments may be predetermined lengths of road. As a preliminary basis, the DPU 170 may label a first category of roads "highways," including: interstates, U.S. highways, limited-access highways as "highways" or "primary roads". The DPU 170 may label a second category of roads as "urban," including: secondary roads, and local roads of high importance. The DPU 170 may label a third category of roads as "other," including: local roads of minor importance, alleys, other unpaved roads or footpath.

Alternatively or additionally, the DPU 170 may be configured to determine the relativity factors in relation to nearby drivers or drivers on similar roads under similar conditions.

In a first example, the DPU 170 may be configured to determine a driving location relativity factor. For example, the driving location relativity factor may credit or penalize a driver for driving in locations more or less risky than their home address. The database 176 of the DPU 170 may generate a driving location risk index (DLRI), wherein the DLRI comprises rankings of each driving location, a vehicle may encounter. The DLRI may be based on a predetermined area. This granularity may be adjusted based on the available telematics and loss data. As one example, where allowable by law, the DLRI may be categorized by zip code. After receiving telematics data from the telematics device of vehicle 140, the DPU 170 may be configured to compare the driving location, with the DLRI to determine the relative risk of the locations.

For example, the DPU 170 may calculate the relative risk of the reported locations actually driven compared to the expected home location according to the procedure described below. The DPU 170 may determine the total number of miles driven by zip code. Next, the DPU 170 may calculate a state adjustment factor. The state adjustment factor may be calculated, e.g. according to the Eq. 3:

$$\text{State adjustment factor=State Avg. Premium/State Avg. Base Rate.} \quad \text{(Eq. 3)}$$

wherein the state adjustment factor is based on bodily injury, property damage, comprehensive and collision coverage factors. The DPU 170 may use the state adjustment factor to calculate adjusted base rates by zip code, based on Eq. 4 below:

$$\text{Adjusted Base Rates by Zip Code=State Adjustment Factor} \times \text{Base Rate} \quad \text{(Eq. 4)}$$

The DPU 170 may use this information to generate adjusted base rates for each of the locations. An example of weighted average rates, based on the driving location, is shown in Table 9, below.

TABLE 9

Weighted Average Rates

| ZIP | Miles | Rate |
|---|---|---|
| 10001 | 30% | 100 |
| 10002 | 10% | 130 |
| 10003 | 5% | 150 |
| 10004 (home) | 25% | 125 |
| 10005 | 30% | 240 |

Based on the percentage of miles driven in each zip code, a rate is determined. The driving location relativity is determined according to the Eq. 5.

Driving location relativity=Sqrt(wtd avg of rates/rate of home zip) (Eq. 5)

wherein a DLRI>1 indicates that the vehicle is driven in riskier areas than the home location. And a DLRI<1 indicates that the vehicle is driven in less risky areas than the home location.

The DPU 170 may further be configured to generate a braking relativity factor. To generate a braking relativity factor, the DPU 170 must determine if a predetermined condition is satisfied such that a braking event is declared. For example, the DPU 170 may declare a braking event based on a rate deceleration or the amount of pressure applied to a brake. The database 176 of the DPU 170 may further be configured to store braking benchmarks for each type of road segment. An example of the braking benchmarks is shown below in Table 10.

TABLE 10

Benchmark Braking Threshold

| Road Segment | Benchmark Braking Threshold (*Based on Median **Based on 75$^{th}$ Percentile) |
|---|---|
| Highway | 0.01 brakes/mile* |
| Urban | 0.07 brakes/mile** |
| Other | 0.03 brakes/mile** |

Based on received telematics data, the DPU 170 determines the frequency and location of each braking event. This information is compiled in the database 176, and the DPU 170, then determines the amount of braking events per mile for each type of road segment and the overall proportion of braking for each road segment. Table 11 shows an example of compiled braking data.

TABLE 11

Compiled Braking Data

| Road Segment | Braking Events | Miles | Proportion |
|---|---|---|---|
| Highway | 0.12 brakes/mile | 2640 | 0.46 |
| Urban | 0.29 brakes/mile | 1650 | 0.29 |
| Other | 0.32 brakes/mile | 1430 | 0.25 |

For each type of road segment, an index is determined, wherein the index=measured/benchmark. For the example above, HW_Index=0.12/0.01, UR_Index=0.29/0.07=4.1, and OT_Index=0.32/0.03.

The DPU 170 may be configured to calculate an overall breaking index by averaging each of the braking indices weighted by the proportion of miles driven on each road. In the example above, the overall braking index may be calculated as follows:

Overall_Braking_Index=$HW$_Index*prop_miles_driven_$HW$+$UR$_index*prop_miles_driven_$UR$+$OT$_Index*prop_miles_driven_Other. (Eq. 6)

The DPU 170 may be configured to rescale the overall braking index and center it on 1. This overall braking index may be scaled according to the following equation:

Scaled Braking Index=(Overall_Braking Index−mean of the distribution)/(standard deviation of the distribution)+1 (Eq. 7)

wherein the mean and standard deviation of the distribution come from a lookup table.

The system 100 may be able to adjust pricing data with or without loss data. For example, in absence of enough credible loss data from telematics devices, (enough losses in the data to have desired statistical power), the system 100 may determine an expected loss value, also known as Expected Pure Premium (EPP) to calculate a braking relativity factor, wherein the EPP is calculated based on conventional class plan variables. The EPP may then be regressed on the telematics variables like braking, speeding etc. in a multivariate scenario to derive coefficients for these telematics variables. In another embodiment, the system 100 may use a univariate analysis and the EPP may be used to calculate the slope for the telematics variable. Using a look up table, stored in database 176, the DPU 170 may map the scaled braking index to a braking relativity factor. An example of mapping a scaled braking index to a braking relativity factor is shown in Table 12 below. According to the Table 12, an expected pure premium may be used.

TABLE 12

Braking Relativity

| Scaled_Braking_Index | EPP Based Braking Relativity (Square root of Raw EPP Relativity) **From EPP Relativity Look Up Table |
|---|---|
| .9 | .97 |
| 1 | 1 |
| 2 | 1.3 |

The DPU 170 may further be configured to determine a speeding relativity factor. The database 176 of the DPU 170 may be preconfigured to store a speed benchmark for each road segment. Table 13, below shows an example of a speed benchmark, using the same segments determined for the braking benchmark. This is used as an illustrative example only. In another embodiment, the road segments for speed may be determined based on posted speed limits, or measured clustered driving patterns.

TABLE 13

Benchmark Speeding Threshold

| Road Segment | Benchmark |
|---|---|
| Highway | 75 mph |
| Urban | 25 mph |
| Other | 45 mph |

After receiving the telematics data, the DPU 170 may be configured to calculate the proportion of miles driven 20 mph over the speed benchmark, 10 to 20 mph over the speed benchmark, 1 to 10 mph over the speed benchmark and 0 mph over the speed benchmark for each of the types of road segment. Further, the DPU 170 may be configured to assign weights based on the variance from the speed benchmark. An example for highway segments is shown in Table 14, below. While the table below only shows weights for speed above the speed benchmark, it may also include weights for speeds below the speed benchmark.

TABLE 14

Compiled Speed Data for Highway Segments

| Segment | Miles | Proportion | Risk Weight |
|---|---|---|---|
| HW_20mphover | 39 | 0.01 | 100 |
| HW10to20mphover | 280 | .11 | 85 |
| HW0to10mph_over | 768 | .29 | 65 |
| HW0over | 1552 | .59 | 35 |

The DPU 170 calculates a speeding index for each road segment by multiplying the risk weight of each speed grouping (e.g. HW_20mphover) by the proportion of miles within that bucket. For example, based on the three equations given below:

$$HW\_Index = Highway\_20\_mph\_over\_prop*wt + \\ Highway\_10to20\_mph\_over\_prop*wt + \\ Highway\_0to10\_mph\_over\_prop*wt + \\ Highway\_0\_over*wt \quad (Eq.\ 8)$$

$$UR\_Index = UR\_20\_mph\_over\_prop*wt + \\ UR\_10to20\_mph\_over\_prop*wt + \\ UR\_0to10\_mph\_over\_prop*wt + UR\_0\_over*wt \quad (Eq.\ 9)$$

$$OT\_Index = OT\_20\_mph\_over\_prop*wt + \\ OT\_10to20\_mph\_over\_prop*wt + \\ OT\_0to10\_mph\_over\_prop*wt + OT\_0\_over*wt \quad (Eq.\ 10)$$

The DPU 170 may further generate an average of the speeding indices weighted by proportion of miles driven on each road segment to determine an overall speeding index, wherein:

$$Overall\_Speeding\_Index = HW\_Index*prop\_miles\_driven\_HW + UR\_Index*prop\_miles\_driven\_Urban + OT\_Index*prop\_miles\_driven\_Other \quad (Eq.\ 11)$$

The DPU 170 may further be configured to determine an overall speeding index that is used to determine the speeding relativity factor. Table 15 shows an overall speeding index mapped to a speeding relativity factor.

TABLE 15

Speeding Relativity Factor Mapping

| Overall Speeding Index | EPP Based Speeding Relativity (Square root of Raw EPP Relativity) *From EPP Relativity Look Up Table |
|---|---|
| 80 | 56 |
| 100 | 106 |
| 115 | 113 |

The DPU 170 may further be configured to determine a mileage relativity factor. The mileage relativity factor may be based on an expected mileage value entered by the user during the registration phase. The expected mileage is compared with the measured mileage. The DPU 170 may mitigate the effect of the relativity factor, for example by operating on the result with a function. As an example, the mileage relativity may be calculated as follows, using a square root function to mitigate the effect:

$$Mileage\ relativity = SQRT(mileage\ factor\ based\ on\ actual\ miles\ driven/mileage\ factor\ based\ on\ reported\ miles) \quad (Eq.\ 12)$$

The DPU 170 may further be configured to determine a time of day relativity factor. Based on loss data, the DPU 170 may categorize time segments as high risk, low risk and moderate risk. The DPU 170 may measure the relative risk of driving at certain times of day. The DPU 170 may weight each of the times of day, wherein the weighting rewards low risk miles while incrementally penalizing moderate and high risk miles. Based on the received telematics data, the DPU 170 may further calculate the proportion of miles driven within each time of day segment. Table 16, below, shows an example of time of day weighting.

TABLE 16

Showing Risks and Weights used for TOD Relativity

| Time of Day | Proportion of Miles | Risk Weight |
|---|---|---|
| High Risk | .1 | 130 |
| Moderate Risk | .6 | 100 |
| Low Risk | .3 | 75 |

The DPU 170 may then calculate a time of day (TOD) risk index based on the mileage weighted average of TOD risk. The TOD risk index is mapped to a TOD relativity factor, using a lookup table. Table 17 shows a (TOD) risk index and TOD relativity factor based on the example above.

TABLE 17

Time of Day Relativity Factors

| TOD_Risk_Index | EPP Based TOD Relativity (Square root of Raw EPP Relativity) * From EPP Relativity Look Up Table |
|---|---|
| 80 | .90 |
| 110 | 1.1 |
| 140 | 1.3 |

The DPU 170 may transmit the relativity factors to the RPU 160. The RPU 160 may be configured to adjust the rate, or provide a discount or surcharge based on the relativity factors according, for example, to the equation below:

$$Discount\ relativity = starting\ discount*driving\ location\ relativity*braking\ relativity*speeding\ relativity*mileage\ relativity*time\ of\ day\ relativity \quad (Eq.\ 13)$$

The system 100 may further be configured to determine whether the vehicle 140 is a self-driving vehicle, in which an on-board computer operates the vehicle 140. In this case, the effect of the driving time of day or any other factor may be mitigated when determining the pricing information.

The system 100 uses the biographical information provided in web pages 302-1302 as a baseline for generating the initial pricing information. However, using the methods described above and the received telematics data, provided by the telematics device, the system 100 may refine the pricing information by adjusting the rate, providing a credit or surcharge, or rejecting a renewal. In one embodiment, the RPU 160 may access the information stored in the DPU 170 and the determined discount relativity, and use a software based algorithm to determine a discount.

For example, the starting discount may be 10%, and if the product of the direct and indirect exposure ratings with the weighting factors>1, the system 100 may determine the driver is not eligible for a discount.

In one scenario, the system 100 may receive telematics data for a fixed time period. In this scenario, the RPU 160 may be configured to compensate for the limited duration of the telematics data using a seasonality factor. For example, if the telematics data is received from September-December, and the biographical information indicates one of the insured drivers attends college away from home, RPU 160 may be configured to use the seasonality factor to adjust the pricing information to account for the lack of information transmitted regarding that driver. Conversely, under the same scenario, if the readings were taken during the summer, when the student was home, the telematics data may be skewed the other way. Accordingly, the RPU 160 may use the seasonality factor to account for those differences.

The system 100 may further be configured to provide discounts outside typical renewal periods. For example, if an account includes a student driver and that student driver is associated with a high risk driver signature. If that student goes away to college, and the absence of high risk driver signature is measured for a predetermined period of time, then the system 100 may be configured to confirm that a driver has moved out and may offer an immediate discount.

In another embodiment, the system 100 may be configured to transmit the driver signature information to the customer. This may allow a customer to identify high risk driving behaviors and adjust the behaviors to lower their premium. This information may be accessible, for example, through web site system 120, or through an app loaded onto a user device 130.

Figure 17A:
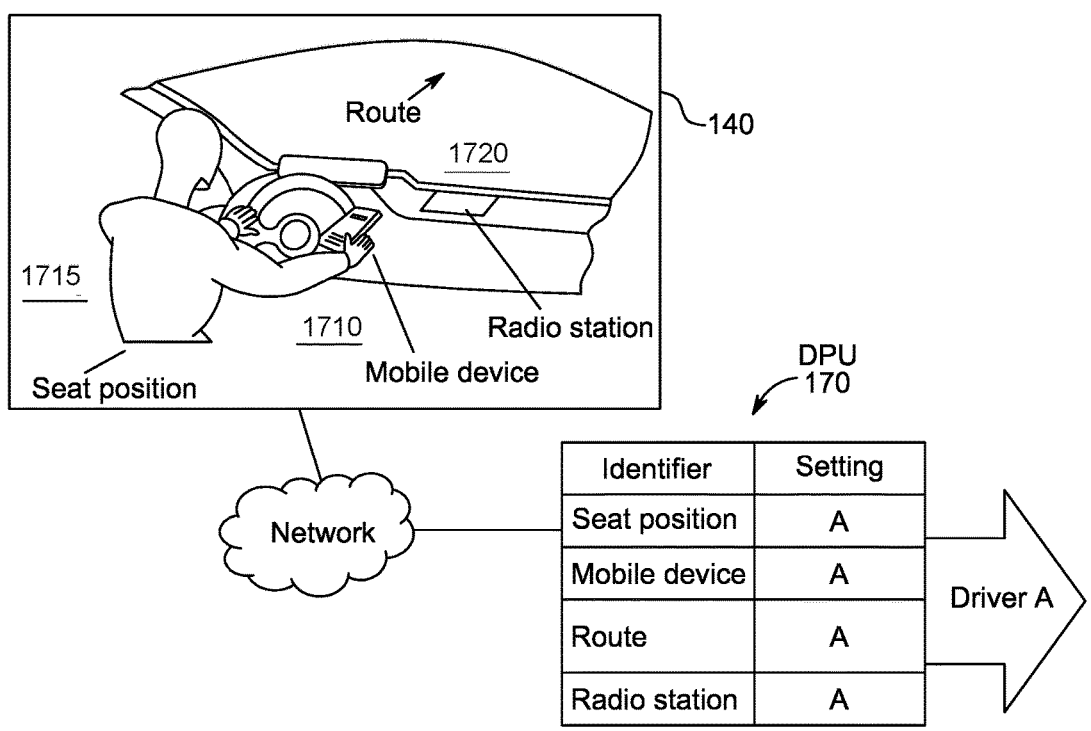
FIG. 17A shows an example configuration for determining a driver signature based on telematics data.

FIG. 17A shows an example configuration for determining a driver signature based on telematics data. As shown in FIG. 17, a driver is situated in the vehicle 140. The vehicle 140 includes an electronic seat adjustment unit 1715 and a radio 1720. The driver of the vehicle 140 also has a mobile device 1710. In this embodiment, the mobile device 1710 includes an app that enables it to operate as the telematics device. The mobile device 1710 may be connected to the vehicle 140 using a BLUETOOTH communications link. The mobile device 1710 receives seat position information, route information, radio station information, and other telematics data from the vehicle 140. The mobile device 1710 may communicate this information to a telematics collection server, such as the DCU 110. This information may be communicated continuously during the vehicle's 140 operation, or in another embodiment the mobile device 1710 may be configured to transmit the information at scheduled times, for example, when the mobile device 1710 is connected to a Wi-Fi network. The telematics collection server receives this information and may format the telematics data and send it to the DPU 170. The DPU 170 compares the received telematics data with preconfigured expected telematics values. As shown in FIG. 17A, the seat position information is compared with the expected seat position and it is determined that this is indicative of Driver A. The mobile device 1710 recording the information is determined to be indicative of Driver A. The route driven by vehicle 140 is indicative of Driver A. The use of radio 1720 is determined to be indicative of driver A. While in this example, each factor is indicative of driver A, in other examples, the seat position may be indicative of a Driver C and radio station may be indicative of a Driver B, by way of example. The DPU 170 may use a multivariate analysis to identify the driver of the vehicle 140 for a particular trip based on this received telematics information. Additionally, if all of the insured drivers are registered with the system 100, and if vehicle usage shows extended driving periods, not accounted for by the data transmitted by the mobile devices (e.g. 1710), the system 100 may determine the use is by an unregistered driver. In the example shown in FIG. 17A, the DPU 170 determines the driver to be driver A.

If the user is a potential customer, the user may provide or upload information from past experiences to the system 100. Or they may enroll to receive a trial telematics device prior to receiving an initial quote.

Figure 17B:
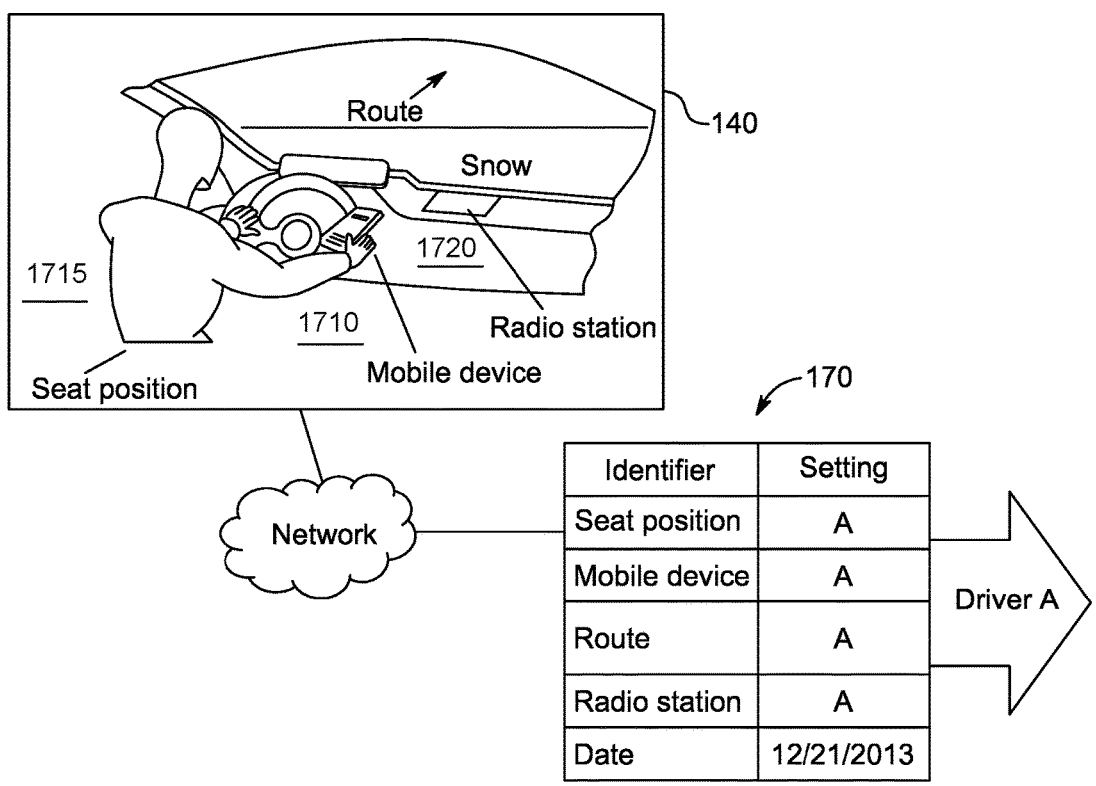
FIG. 17B shows an example configuration for determining a driver signature based on telematics data that accounts for a seasonality factor.

FIG. 17B shows an example configuration for determining a driver signature based on telematics data that accounts for a seasonality factor. As shown in FIG. 17B, the mobile device 1710 may be configured to communicate the telematics data as discussed in reference to FIG. 17A. In this example, telematics collection server may further be configured to communicate the date during which the vehicle was driven. This may be important, for example, if a student driver only drives 5% of the time, but that 5% of the time is during a snowy season. Additionally, as discussed above, the RPU 160 may incorporate a seasonality factor to compensate for expected changes in driving patterns during different times of year (e.g. different schedules during the school year.) The system 100 may be configured to use additional telematics data, for example, received from third party systems that may include weather data, traffic data, and other relevant data in compensating for seasonality.

Illustrative examples of the system 100 implementing driver signatures are shown below.

In a first scenario, the number of vehicles covered by the policy may include the number of listed drivers. Table 18 shows a driver proxy score below:

TABLE 18

Driver Proxy Score

| Assigned by Insurance rating | Assignment | Driver Proxy Score (1-50) |
|---|---|---|
| Vehicle 1 | Driver 1 | 30 |
| Vehicle 2 | Driver 2 | 45 |

In the example shown in Table 18, based on the information received from the customer, the assigned score is based on the expectation that vehicle 1 will be driven 100% by driver 1 and vehicle 2 will be driven 100% by driver 2.

However, the DPU 170 may receive telematics data to determine the actual miles driven by each driver. Table 19 below shows the determined actual miles driven.

TABLE 19

Actual Miles Driven, as determined by telematics data

| | Driver 1 | Driver 2 | |
|---|---|---|---|
| Vehicle 1 | 80% | 20% | 100% |
| Vehicle 2 | 20 | 80% | 100% |

The DPU 170 may be configured to generate a weighted average of driver score for vehicle 1 using driver signature=(percentage of time driven by driver 1)(driver proxy score)+(percentage of time driven by driver 2)(driver proxy score).

The DPU may further generate a weighted average of driver score for vehicle 2, for example, using as driver signature=driver signature=(percentage of time driven by driver 1)(driver proxy score)+(percentage of time driven by driver 2)(driver proxy score).

Based on this information, the DPU 170 determines a driver signature relativity for each vehicle=actual/expected.

The RPU 160 may use the driver signature relativity to determine pricing information. In one embodiment, the RPU 160 may generate a blended rate, based on the driver signature relativity. Additionally or alternatively, the RPU 160 may be configured to adjust the rate or provide a credit or penalty to the account.

In another scenario, the number of vehicles may be greater than the number of drivers.

Based on the customer provided biographical information, the DPU 170 may determine a driver proxy score for each vehicle. Table 20 shows an example of driver proxy scores in the scenario where there are more vehicles than drivers.

TABLE 20

Driver Proxy Scores when Vehicles > Drivers

| Assigned by conventional rating | Assignment | Driver Proxy Score (1-50) |
| --- | --- | --- |
| Vehicle 1 | Driver 1 | 30 |
| Vehicle 2 | Driver 2 | 40 |
| Vehicle 3 | Driver 2 | 40 |

Based on the information received during the registration phase (or alternatively on past experience), in the more cars than drivers (MCTD) scenario DPU 170 assigns a score based on an assumption that vehicle 3 will be driven 100% by driver 2, the worse of the two drivers. Table 21 shows the determined actual miles for each vehicle by each driver.

TABLE 21

Actual Miles Driven when Vehicles > Drivers

| | Driver 1 Miles Driven | Driver 2 Miles Driven | |
| --- | --- | --- | --- |
| Vehicle 1 | 80% | 20% | 100% |
| Vehicle 2 | 30% | 70% | 100% |
| Vehicle 3 | 50% | 50% | 100% |

Based on this information, the DPU 170 may determine the weighted average of driver score for vehicle 1 using driver signature=0.80*30+0.20*40.

The DPU 170 may determine the weighted average of driver score for Vehicle 2 using driver signature=0.30*30+0.70*40.

The DPU 170 may determine the weighted average of driver score for Vehicle 3 using driver signature=0.50*30+0.50*40.

The DPU 170 uses this information to determine a driver signature relativity adjustment for each vehicle=actual/expected.

The RPU 160 may use the driver signature relativity to determine pricing information. In one embodiment, the RPU 160 may generate a blended rate, based on the driver signature relativity. Additionally or alternatively, the RPU 160 may be configured to adjust the rate or provide a credit or penalty to the account.

The system 100 may further be configured to account for technologies such as "driverless car technology," which may allow for autonomous operation of a vehicle, or aspects of a vehicle. The autonomous driver may be controlled by the vehicle's 140 control system. In one embodiment, the system 100 may be configured with a predetermined score for a driverless system. This may include scoring route selection patterns, braking patterns, accelerating patterns, and the speed, proportionality and accuracy of the vehicle's response to the environment, such as obstacles and changing conditions. The automated system would be treated as a unique driver with a particular signature attached. The system 100 may then be configured to account for the time a vehicle 140 is driven by a driverless vehicle system.

TABLE 22

Autonomous Vehicles

| Assigned by conventional rating | Assignment | Driver Proxy Score (1-30) |
| --- | --- | --- |
| Vehicle 1 | Autonomous | 1 (Perfect Driver Score) |
| Vehicle 1 | Driver 1 | 5 (Good Driver Score) |
| Vehicle 1 | Driver 2 | 20 (Bad Driver Score) |

An assigned score in the example of Table 22 assumes a vehicle 1 will autonomously operate itself, thereby earning a perfect driver proxy score (no accidents). However, driver 1 and driver 2 can assume operation of the vehicle. This would override autonomous capability and therefore the pricing calculation could be modified by a relativity factor. This factor would be calculated as follows for 80% autonomous driving, driver 1 15% driving, and driver 2 5% driving. Weighted average driver score for vehicle 1 using driver signature=0.80*1+0.15*5+0.05*20=2.55. Therefore, the driver signature relativity for vehicle 1 equals the actual/expected which is 2.55/1=2.55. This relativity factor can then be used in the calculation of the premium for vehicle 1.

Figure 18:
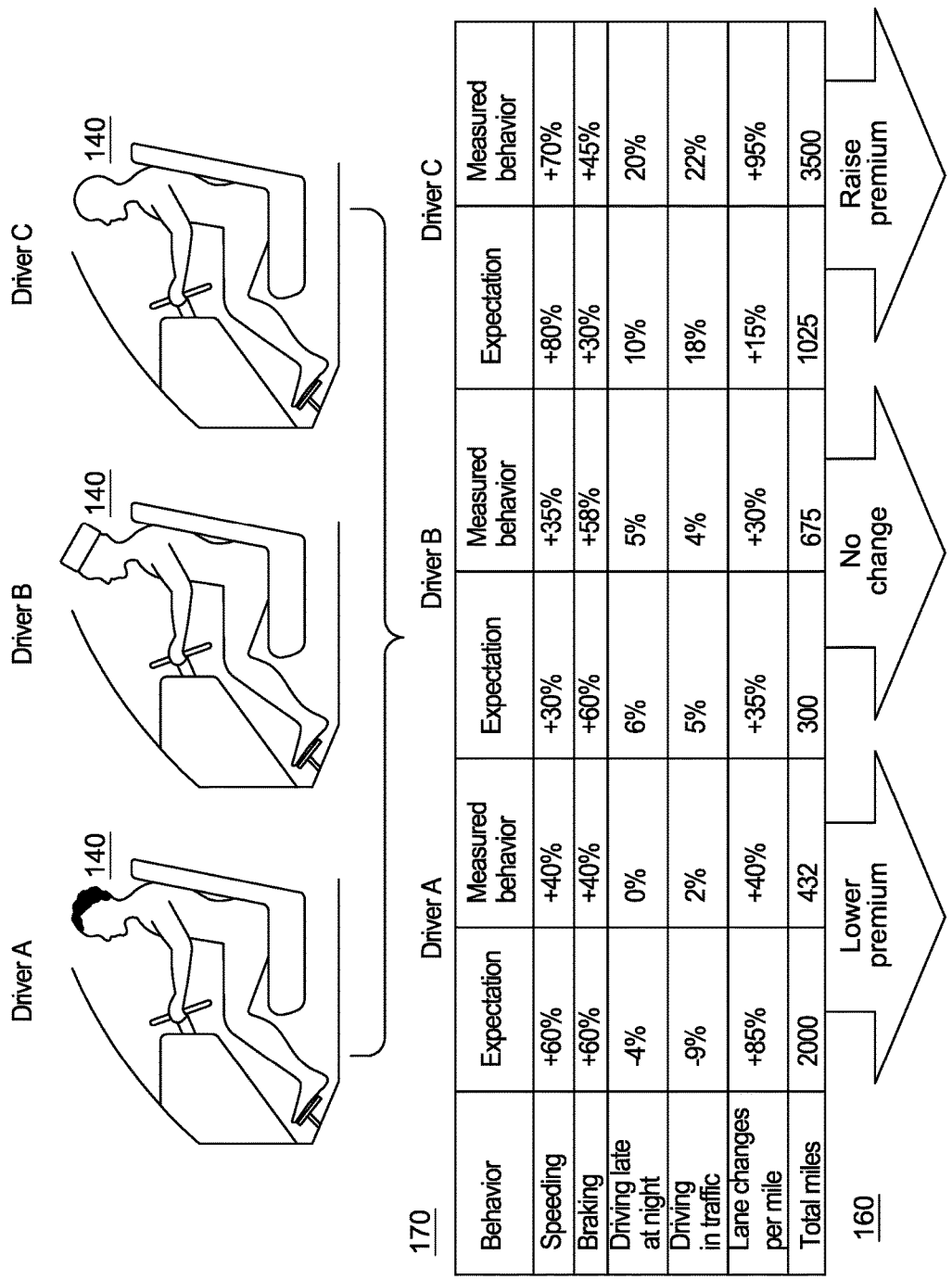
FIG. 18 shows three examples of assessing a driver's risk based on telematics data collected on actual driving behavior relative to the expected driving behavior.

FIG. 18 shows three examples of expectation based processing. As shown in FIG. 18, the three drivers may all be drivers of the same vehicle 140. The drivers include different genders, ages, credit rating, etc. Based on the initial biographic information, the DPU 170 determined an expectation of driver behavior. In the example shown, the DPU 170 determined expected values for speeding, braking, driving late at night, driving in traffic, lane changes and total mileage. The speeding, braking, driving late at night, driving in traffic and lane changes per mile are all represented in relative terms. The driver is evaluated against a hypothetical baseline driver. The expected values are determined based on the differences of a driver in a risk class versus that baseline driver. The DPU 170 receives telematics information, either directly from a telematics device, or indirectly through a third party operated system. In the examples shown in FIG. 18, the received telematics data is summary data for the factors shown in the table. The DPU 170 compares the measured behavior to the expectation. As shown in FIG. 18, Driver A is expected to brake, speed and change lanes far more often than the hypothetical baseline driver. The actual values show that while Driver A is in fact worse than the hypothetical baseline driver, the difference is not nearly as much as expected. The RPU 160 receives the comparison information related to Driver A, and determines that Driver A is in line for a lower premium. The RPU 160 may be configured to determine a new rate for the driver or it may keep the same rate, but provide the driver with a credit. Driver B is expected to be a better driver than Driver A. Driver B's measured behavior is similar to Driver A, but Driver B does not get a discount. This is because Driver B was expected to be better than Driver A. As shown in FIG. 18, the measured behavior of Driver B is very close to the expectation. The RPU 160 may be configured with a threshold wherein if the measured driving behavior is within a predetermined value of the expectation, it may not change the premium. In the example shown in FIG. 18, the variance of Driver B from the expectation for Driver B, that the pricing information is not changed. The measured behavior associated with Driver C is worse than the expectation; accordingly, the RPU 160 determines a new premium that is higher, which reflects the higher risk associated with that driver's driving behavior.

In another example of expectation based rating, a driver proxy score (DPS) may be derived from a combination of rating variables in a conventional class plan. Table 23, below, shows an example of a driver proxy score.

TABLE 23

Driver Proxy Score

|  | Age | Sex | Marital | Credit | Driver Proxy Score (DPS) |
|---|---|---|---|---|---|
| Driver 1 | 16 | M | U | Good | 25 |
| Driver 2 | 45 | F | M | Excellent | 10 |

The DPU 170 may receive the telematics data and generate a driver telematics score (DTS). Table 24, below shows an example of a driver telematics score.

TABLE 24

Driver Telematics Score

|  | Speeding | Braking | Miles Driven | Driver Telematics Score (DTS) |
|---|---|---|---|---|
| Driver 1 | Average | Average | Low | 12 |
| Driver 2 | Average | Average | Low | 12 |

The DPU 170 may standardize the risk scores in Tables 23 and 24 using multivariate statistical techniques, to make them comparable on the same risk scale. An expectation based rating (EBR_ may be calculated as follows:

Expectation Based Rating (EBR) for Driver 1=actual/expected=12/25=0.48 (Eq. 14)

Expectation Based Rating (EBR) for Driver2=actual/ expected=12/10=1.2 (Eq. 15)

As shown, by the scores above, two drivers with the same DTS may receive different EBRs based on their expected behavior from a conventional class plan. Driver 1 may receive a discount as the actual driving behavior is better than expected whereas Driver 2 may receive a surcharge as the actual driving behavior is worse than expectation.

Figure 19:
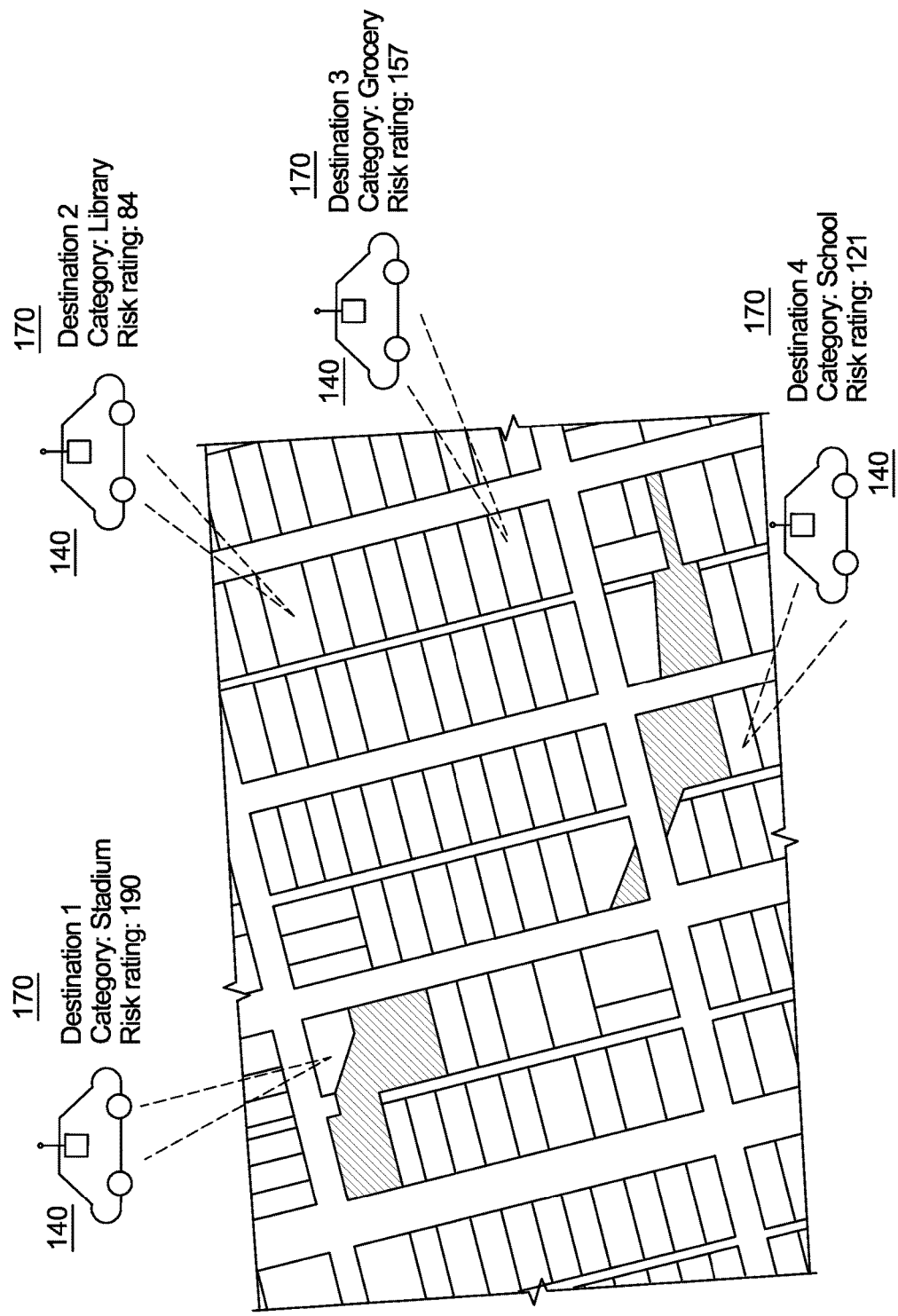
FIG. 19 shows an example of a location risk map used in accordance with one embodiment.

FIG. 19 shows an example of a location risk map used for destination based underwriting. As shown in FIG. 19, the vehicle 140 is monitored as it visits multiple destinations. In FIG. 19, the vehicle 140 is shown stopped at four destinations. When the DPU 170 determines that a vehicle is stopped for a predetermined duration, the DPU 170 identifies a location as a destination. As shown in FIG. 19, the DPU 170 may include a category for each destination. Each destination may further be assigned a location risk rating. As shown in FIG. 19, the stadium has the highest risk rating (190) and the library has the lowest risk rating (84). The DPU 170 determines a risk score based on the risk rating of destination, the duration of stay at each destination, as well as the time of day during which the vehicle is stopped at each destination. The DPU 170 may then compare this versus the home/garaging location, to determine a risk assessment. This risk assessment is used by the RPU 160 to determine updated pricing information.

In another example of destination based underwriting, the DPU 170 may be configured to determine a proxy destination score (PDS) based on a territory rating based on the reported home/garaging address reported at the time of sale of the policy. An example of a PDS is shown below in Table 25 below.

TABLE 25

Proxy Destination Score

| Home/Garaging Zip | Proxy Destination Score (PDS) |
|---|---|
| 32951 | 42 |

The DPU 170 may use the received telematics data to generate a telematics destination score (TDS), for example, based on the techniques explained above. The DPU 170 may further calculate the amount of time spent at the destination, in the aggregate, over the total time of a predetermined period (e.g. a month, six months). An example of a TDS is shown below in Table 26.

TABLE 26

Telematics destination score (TDS)

| Zip | Telematics Destination Score (TDS) | % of time at a destination within the location |
|---|---|---|
| 32605 | 11 | 0.3 |
| 32606 | 12 | 0.1 |
| 32611 | 19 | 0.1 |
| 32951 | 42 | 0.4 |
| 32601 | 13 | 0.1 |

The DPU 170 may be configured to standardize the risk scores in both Tables 25 and 26 using multivariate statistical techniques to make them comparable on the same risk scale. The DPU 170 may then determine a destination relativity score, as follows:

$$\text{Destination relativity} = \quad \text{(Eq. 16)}$$

Weighted *avg.* of rates by time spent in the location unit/home location rate.

$$= 11*0.3 + 12*0.1 + 19*0.1 + 42*0.4 + 13*0.1/42 =$$

Destination Relativity

The destination relativity may be compared with the expected value to determine whether to adjust the pricing information or continue coverage. For example, based on the determination relativity, the RPU 160 may increase or decrease the rate and/or provide the account with a credit or penalty.

Figure 20:
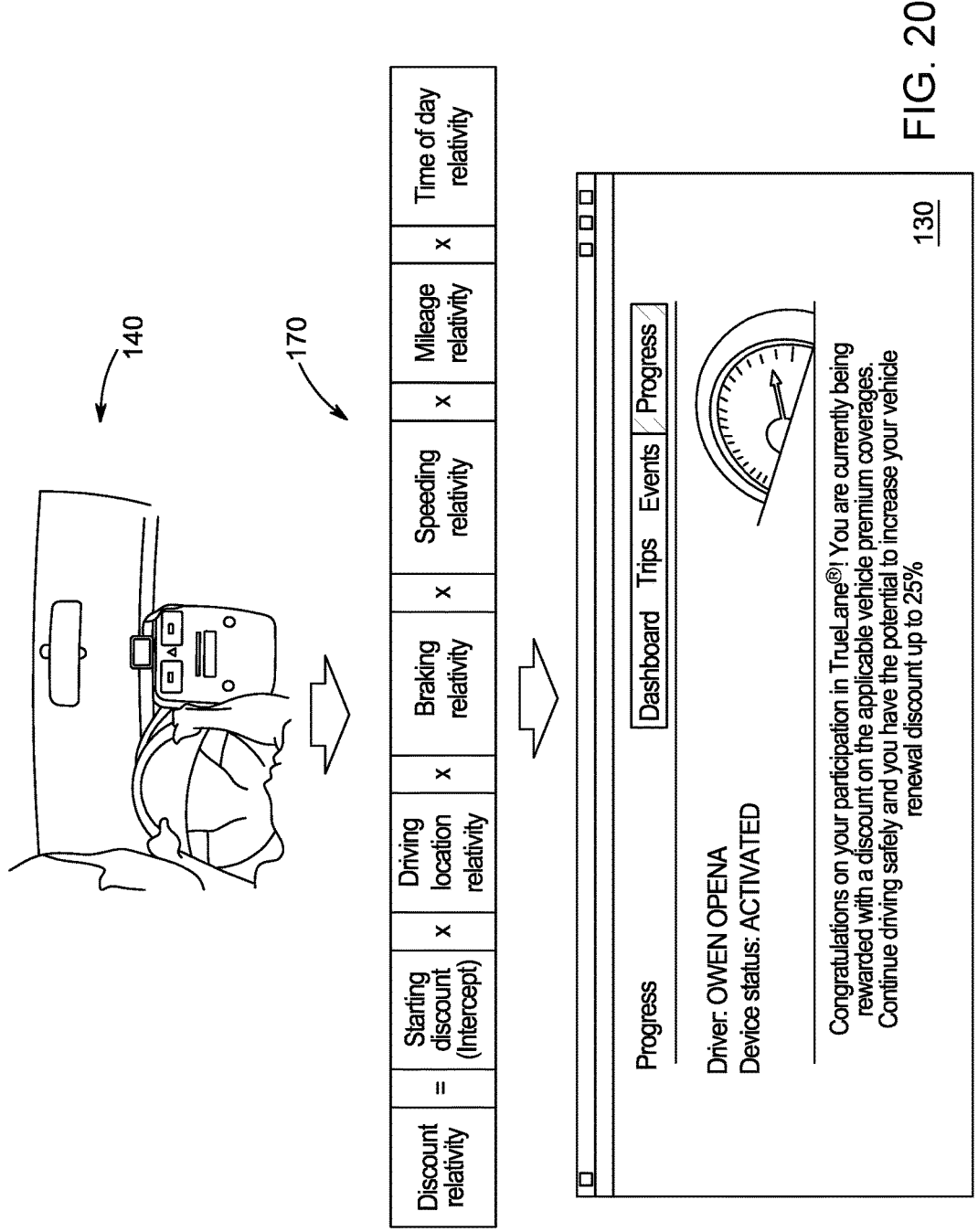
FIG. 20 shows an example diagram of an embodiment of a system for telematics based underwriting.

FIG. 20 shows an example visual flow diagram of an embodiment of a system for telematics based underwriting. As shown in FIG. 20, a driver is driving vehicle 140. The vehicle may include multiple electronics devices configured to communicate with a telematics device located in the vehicle. As one example, the driver of the vehicle may load a software application onto his cellular phone and use the phone as a telematics device. The telematics device may receive telematics data including location, acceleration, speeding, and time, etc. The telematics device communicates this information to a third party operated DCU 110. The DCU 110 may be configured to receive raw telematics data and convert it into a different format, e.g. summary telematics data. The DCU 110 may communicate this telematics data in a predetermined format to the DPU 170. FIG. 20 shows an algorithm, implemented in the DPU 170 calculating a plurality of relativity factors. The RPU 160 may use these relativity factors to determine pricing information. The website system 120 may be used to communicate this pricing information to a user device 130, in the form of a web page. As seen in FIG. 20, the user device 130 includes a display that is presenting the user with a discount. In another example, the display may include information that compares the vehicle usage on the policy to other similar vehicles and/or drivers of a similar background. The display may further include suggestion regarding how to improve driving to receive a discount or lower rate.

Figure 21:
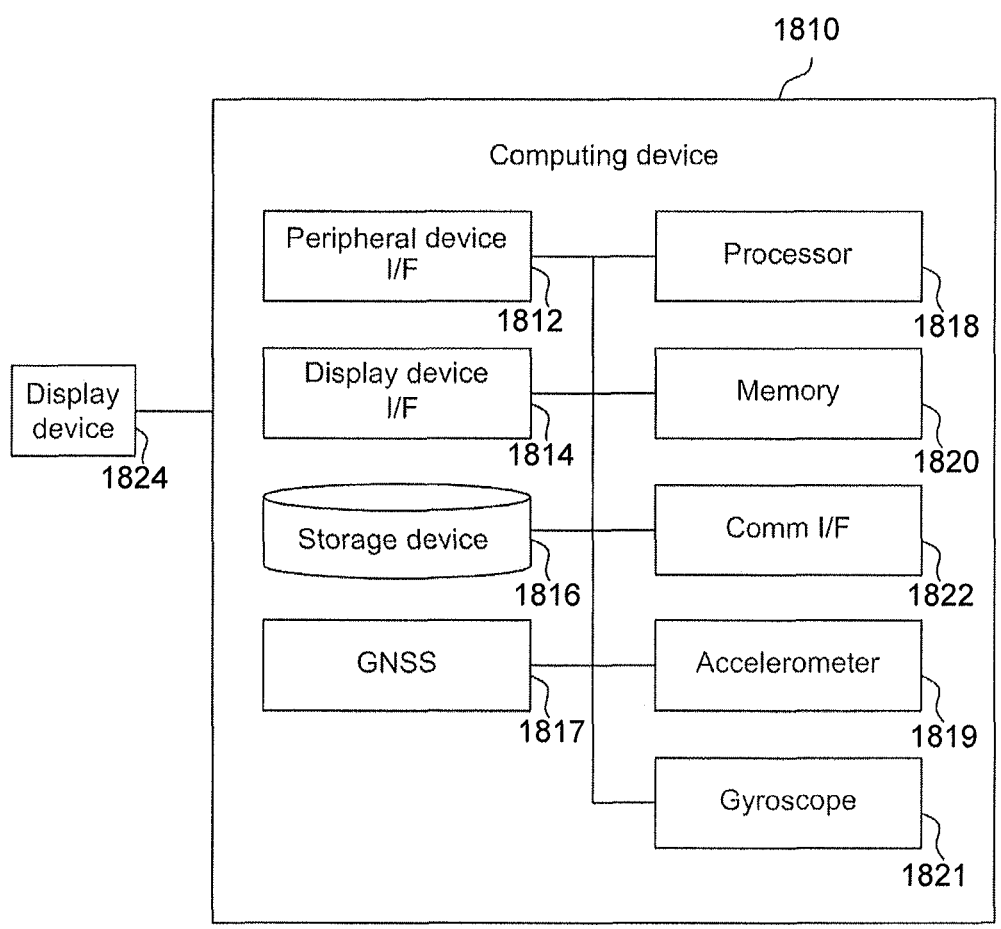
FIG. 21 shows an example electronic device that may be used to implement features described herein with reference to FIGS. 1-25.

FIG. 21 shows an example computing device 1810 that may be used to implement features described above with reference to the figure herein. The computing device 1810 includes a global navigation satellite system (GNSS) receiver 1817, an accelerometer 1819, a gyroscope 1821, a processor 1818, memory device 1820, communication interface 1822, peripheral device interface 1812, display device interface 1814, and a storage device 1816. FIG. 21 also shows a display device 1824, which may be coupled to or included within the computing device 1810.

The system 100 may further include a user transmission device (not pictured) wherein the user transmission device may communicate insurance information, including pricing information, contractual information, information related to the telematics program, and other notifications. A user transmission device may include one or more modes of communication to reach a potential customer, current customer, or past customer or other similar user. For example, the user transmission device may be coupled with a printing device that is automatically mailed to the user. In another embodiment, the user transmission device may be coupled to a device to generate automatic telephone calls, or "robocalls," or other similar communication mediums to communicate with the user. The user transmission device may further be configured to send e-mails to a user. The user device may further be configured to communicate via social media.

The memory device 1820 may be or include a device such as a Dynamic Random Access Memory (D-RAM), Static RAM (S-RAM), or other RAM or a flash memory. The storage device 1816 may be or include a hard disk, a magneto-optical medium, an optical medium such as a CD-ROM, a digital versatile disk (DVDs), or BLU-RAY disc (BD), or other type of device for electronic data storage.

The communication interface 1822 may be, for example, a communications port, a wired transceiver, a wireless transceiver, and/or a network card. The communication interface 1822 may be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The peripheral device interface 1812 may be an interface configured to communicate with one or more peripheral devices. As an example, the peripheral device may communicate with an on-board diagnostics (OBD) unit that is associated with a vehicle. The peripheral device interface 1812 may operate using a technology such as Universal Serial Bus (USB), PS/2, BLUETOOTH, infrared, serial port, parallel port, and/or other appropriate technology. The peripheral device interface 1812 may, for example, receive input data from an input device such as a keyboard, a mouse, a trackball, a touch screen, a touch pad, a stylus pad, and/or other device. Alternatively or additionally, the peripheral device interface 1812 may communicate output data to a printer that is attached to the computing device 1810 via the peripheral device interface 1812.

The display device interface 1814 may be an interface configured to communicate data to display device 1824. The display device 1824 may be, for example, an in-dash display, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1814 may operate using technology such as Video Graphics Array (VGA), Super VGA (S-VGA), Digital Visual Interface (DVI), High-Definition Multimedia Interface (HDMI), or other appropriate technology. The display device interface 1814 may communicate display data from the processor 1818 to the display device 1824 for display by the display device 1824. As shown in FIG. 21, the display device 1824 may be external to the computing device 1810, and coupled to the computing device 1810 via the display device interface 1814. Alternatively, the display device 1824 may be included in the computing device 1810.

An instance of the computing device 1810 of FIG. 21 may be configured to perform any feature or any combination of features described above as performed by the user device 130. In such an instance, the memory device 1820 and/or the storage device 1816 may store instructions which, when executed by the processor 1818, cause the processor 1818 to perform any feature or any combination of features described above as performed by the web browser module 132. Alternatively or additionally, in such an instance, each or any of the features described above as performed by the web browser module 132 may be performed by the processor 1818 in conjunction with the memory device 1820, communication interface 1822, peripheral device interface 1812, display device interface 1814, and/or storage device 1816.

Although FIG. 21 shows that the computing device 1810 includes a single processor 1818, single memory device 1820, single communication interface 1822, single peripheral device interface 1812, single display device interface 1814, and single storage device 1816, the computing device may include multiples of each or any combination of these components, and may be configured to perform, mutatis mutantis, analogous functionality to that described above.

Figure 22A:
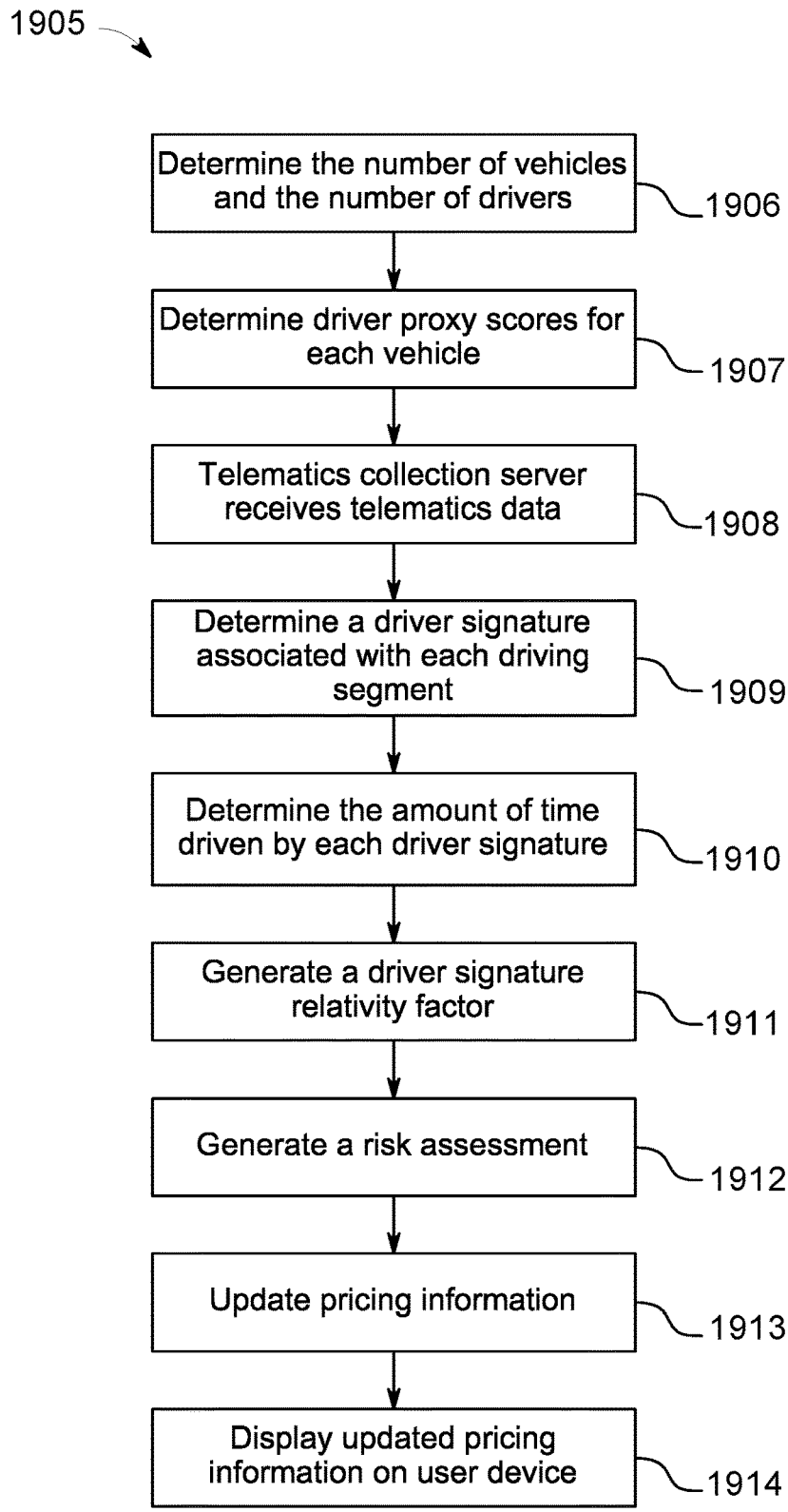
FIG. 22A shows a flow diagram for a method for determining pricing based on driver signatures associated with a vehicle.

FIG. 22A shows a flow diagram for a method 1905 for determining driver signatures associated with vehicle use and updating pricing information based on the determined driver signatures. This application incorporates the entire contents of U.S. patent application Ser. No. 14/518,750, filed Oct. 20, 2014, and U.S. patent application Ser. No. 14/145,142, filed Dec. 31, 2013 by reference as if fully set forth. Because the insurance company may employ a different analysis based on the number of cars relative to the number of drivers, the system 100 may determine the number of vehicles and the number of drivers (step 1906). Based on the number of vehicles and the number of drivers and the expected use of each vehicle, the DPU 170 may determine a driver proxy score for each vehicle (step 1907). A telematics collection server may then receive telematics data associated with each vehicle (step 1908). The telematics collection server may be operated by the insurance company or it may be operated by a third party service. An example of a telematics collection server is the DCU 110. For each segment during which a vehicle is driven, the DPU 170 may analyze the telematics data to determine a driver signature associated with each segment (step 1909). The DPU 170 may determine the amount of time each vehicle was driven by each driver signature (step 1910). Based on this information, the DPU 170 may generate a driver signature relativity factor for each vehicle (step 1911). The driver signature relativity factor may account for the driver proxy score for each vehicle verses the values determined based on driver signatures. The RPU 160 generates a risk assessment based on the driver signature relativity factor (step 1912). In one embodiment, the risk assessment may include vehicle profiles which comprise the total number of drivers and the behavior of each of those drivers. The RPU 160 may then generate updated pricing information based on the risk assessment (step 1913). The website system 120 may communicate the updated pricing information to a user device 130 (step 1914). The website system 120 may further communicate suggested changes in driving behavior that may be used to receive a discount.

Figure 22B:
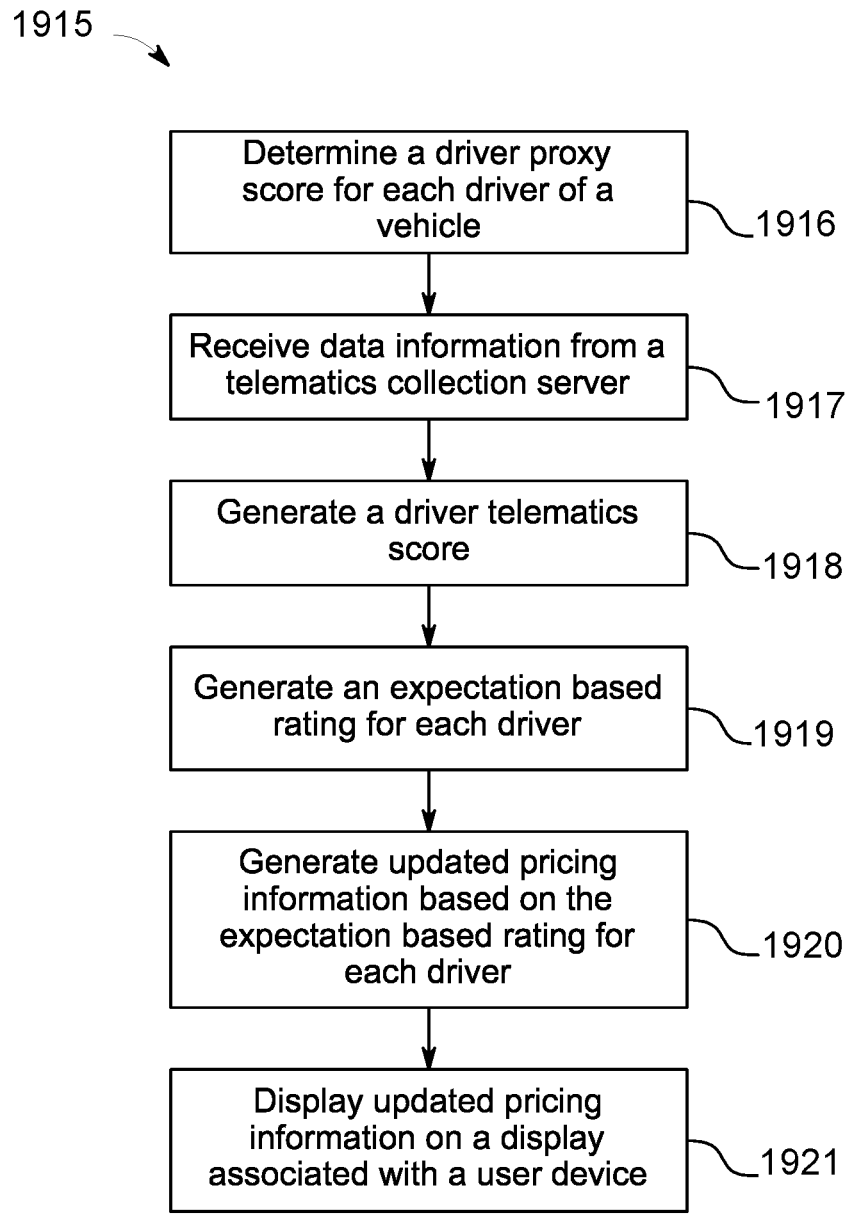
FIG. 22B shows another flow diagram for a method for expectation based processing.

FIG. 22B shows another flow diagram for a method 1915 for expectation based processing. This application incorporates the entire contents of U.S. patent application Ser. No. 14/145,165, filed Dec. 31, 2013 by reference as if fully set forth. In the method 1915 shown in FIG. 22B, the system 100 determines a driver proxy score for each driver associated with a vehicle 140 step 1916). The driver proxy score may be based on demographic information provided by the driver or it may be based on previous data regarding the driver (for example, from recorded data the previous year). The system 100 may then receive telematics data from a telematics collection server (step 1917). For example, the telematics collection server may be the DCU 110. This telematics collection server may be operated by a third party vendor or by the insurance company or any suitable party. This information may be formatted and electronically transmitted to the DPU 170. The DPU 170 may use a software based algorithm to determine a driver telematics score for each driver (step 1918). The DPU 170 may then determine an expectation based rating for each driver (step 1919). The RPU 160 may be configured to use a multivariate analysis to generate updated pricing information (step 1920). This information may be determined on an individual telematics factor basis. The system 100 may format this information and then display it to the display of a user device 130 (step 1921). The display may indicate specific factors on which a credit or penalty was assessed and an overall presentation of driving behavior. The display may further provide the user with a graph showing the driver's behavior versus the expectation as well as the hypothetical baseline driver. The system 100 may further be configured to provide the display with information regarding suggested changes to driving behavior which may save the driver money.

The system 100 may provide this information at a predetermined renewal period or based on a triggering event. A triggering event may occur, for example based on the variance of the telematics data to an expected value or any event or observed data that may adjust expected losses.

Figure 22C:
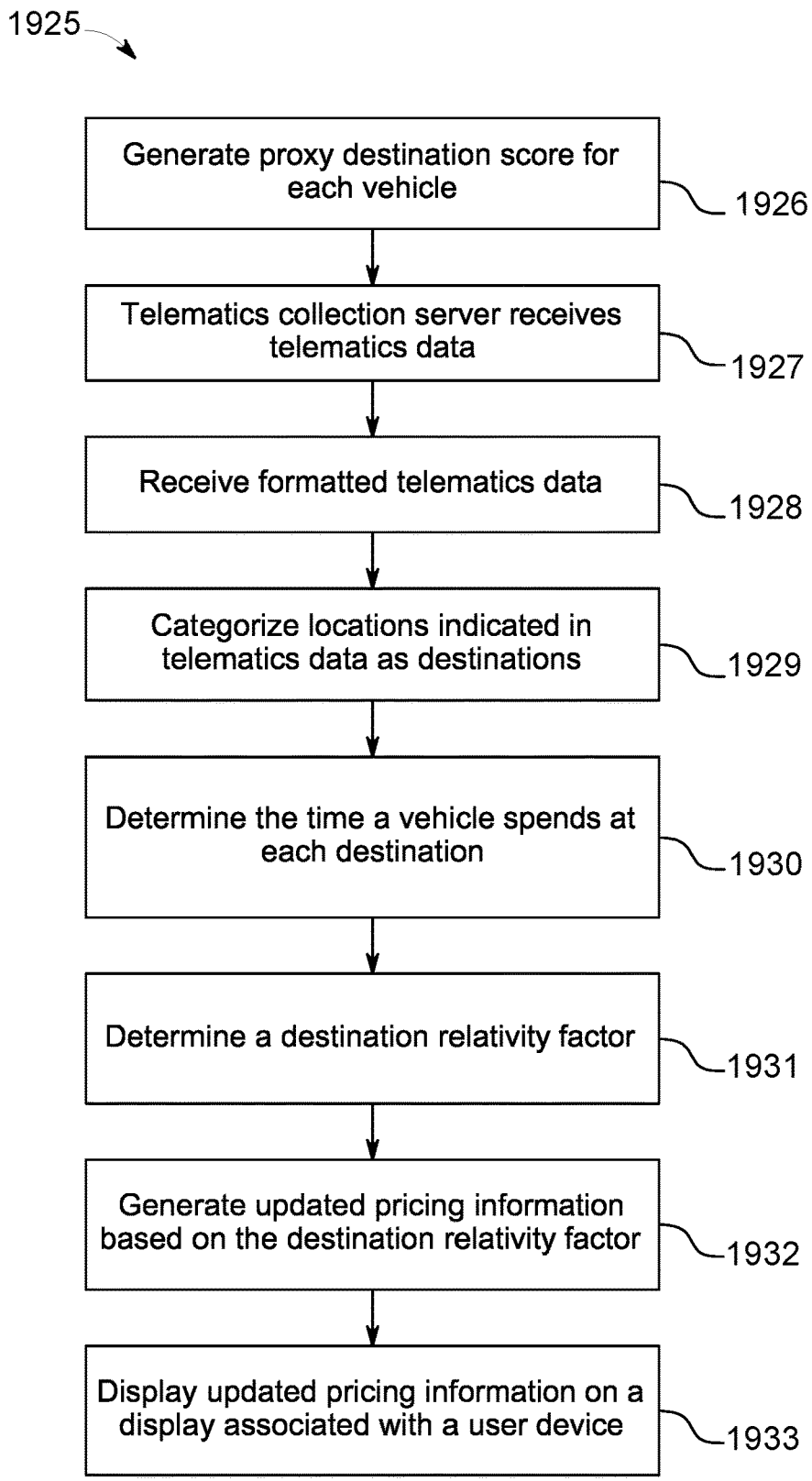
FIG. 22C shows a flow diagram for a method for destination based underwriting.

FIG. 22C shows a flow diagram for a method 1925 for destination based underwriting. This application incorporates the entire contents of U.S. patent application Ser. No. 14/145,181, filed Dec. 31, 2013 by reference as if fully set forth. Based on the received biographical information, the DPU 170 may determine a proxy destination score for each vehicle (step 1926). In one example, the proxy destination score may be based on the home/garaging zip code. As another example, the proxy destination score may be based on previously measured data associated with the vehicle 140 or vehicle owner. A telematics collection server, such as DCU 110 may receive telematics data from one or more telematics devices associated with the vehicle 140 (step 1927). The telematics collection server may format and forward the telematics data to the DPU 170 (step 1928). The DPU 170 may then analyze the received telematics data and categorize locations indicated in the telematics data as destinations (step 1929). Wherein a destination may be determined based on a minimum duration at a location. Based on the evaluation period (e.g. one month, 2 months, year, or time between renewals), the DPU 170 determines the relative percentage of time the vehicle 140 spends at each destination (step 1930). The DPU 170 determines a destination relativity factor based on the percentage of time the vehicle spends at each location, the rating of each location, the home/garaging zip, and the rating of the home/garaging zip (step 1931). The RPU 160 generates updated pricing information based on the destination relativity factor (step 1932). The website 120 may provide the updated pricing information to a user device 130 (step 1933). The updated pricing information may include an adjusted rate, or debits or credits determined by the RPU 160. The web site system 120 may also provide the user device 130 with additional information, such as recommendations on where to store the vehicle to receive a discount.

Figure 23:
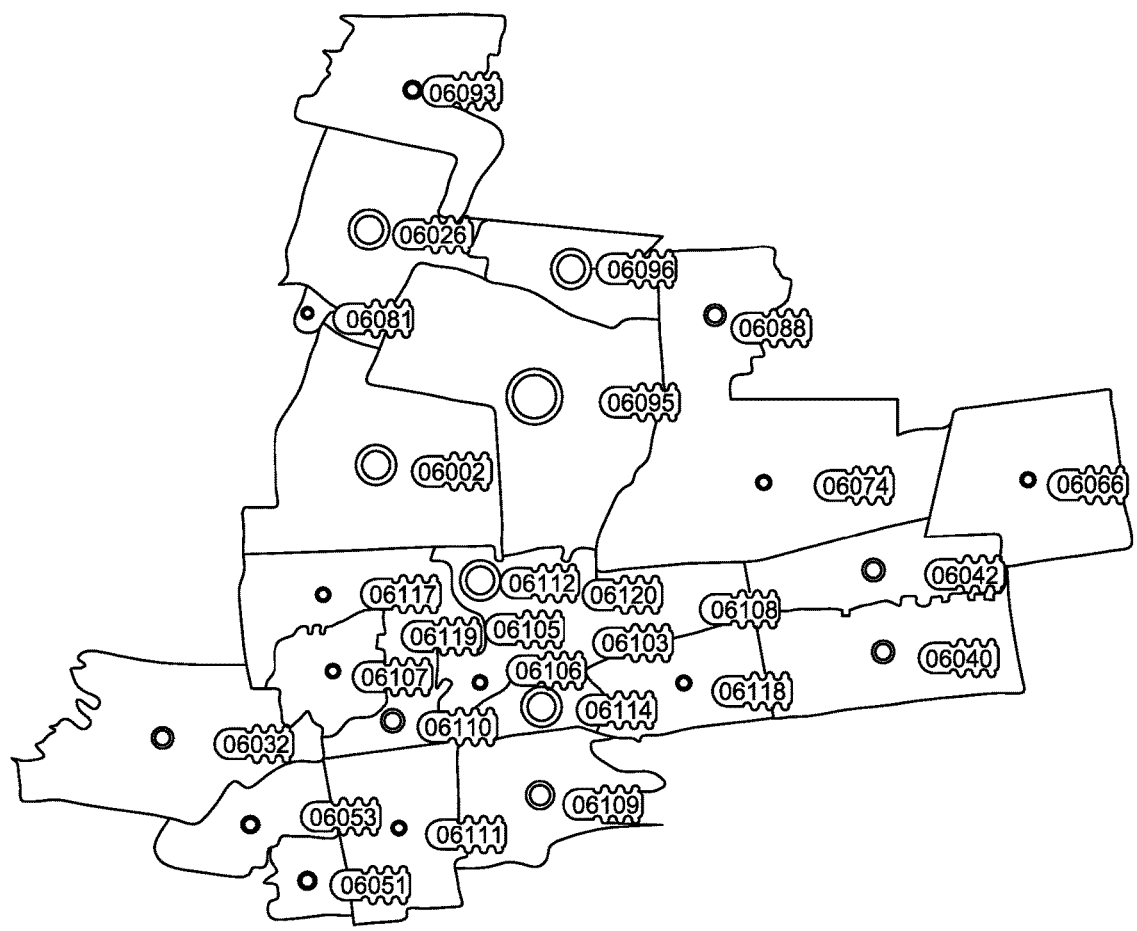
FIG. 23 shows an example graph for a DLRI for a location based calculation, wherein the location size is based on the zip code.

FIG. 23 shows an example graph for a DLRI for a zip code based calculation. This application incorporates the entire contents of U.S. patent application Ser. No. 14/145,205, filed Dec. 31, 2013 by reference as if fully set forth. As shown in FIG. 23, a map is comprised with circles of different color/size to indicate the categorization for an area based on zip code. In the example shown, light gray indicates a low risk area, dark gray indicates a medium risk area, and black indicates high risk area. The DLRI may be determined by the DPU 170 based on loss data received by the DPU 170. This loss data may be directly measured by the DPU 170, or it may be received from an external server 180. The DPU 170 may determine multiple DLRI maps for each type of coverage. The DPU 170 receives telematics data regarding the location of the vehicle 140. The DPU 170 determines the amount of time spent in each risk category. A driving location relativity factor is determined based on this information. The RPU 160 may use this driving location relativity factor in determining an adjustment to the pricing information. While the example shown in FIG. 23 shows only three categories that are assigned for each zip code, the system 100 may use more or less categories and use different standard units of area. Additionally, while the example shown in FIG. 23 shows the unit area of the DLRI calculation as the area represented by a zip code, the actual unit of area may be different.

Figure 24:
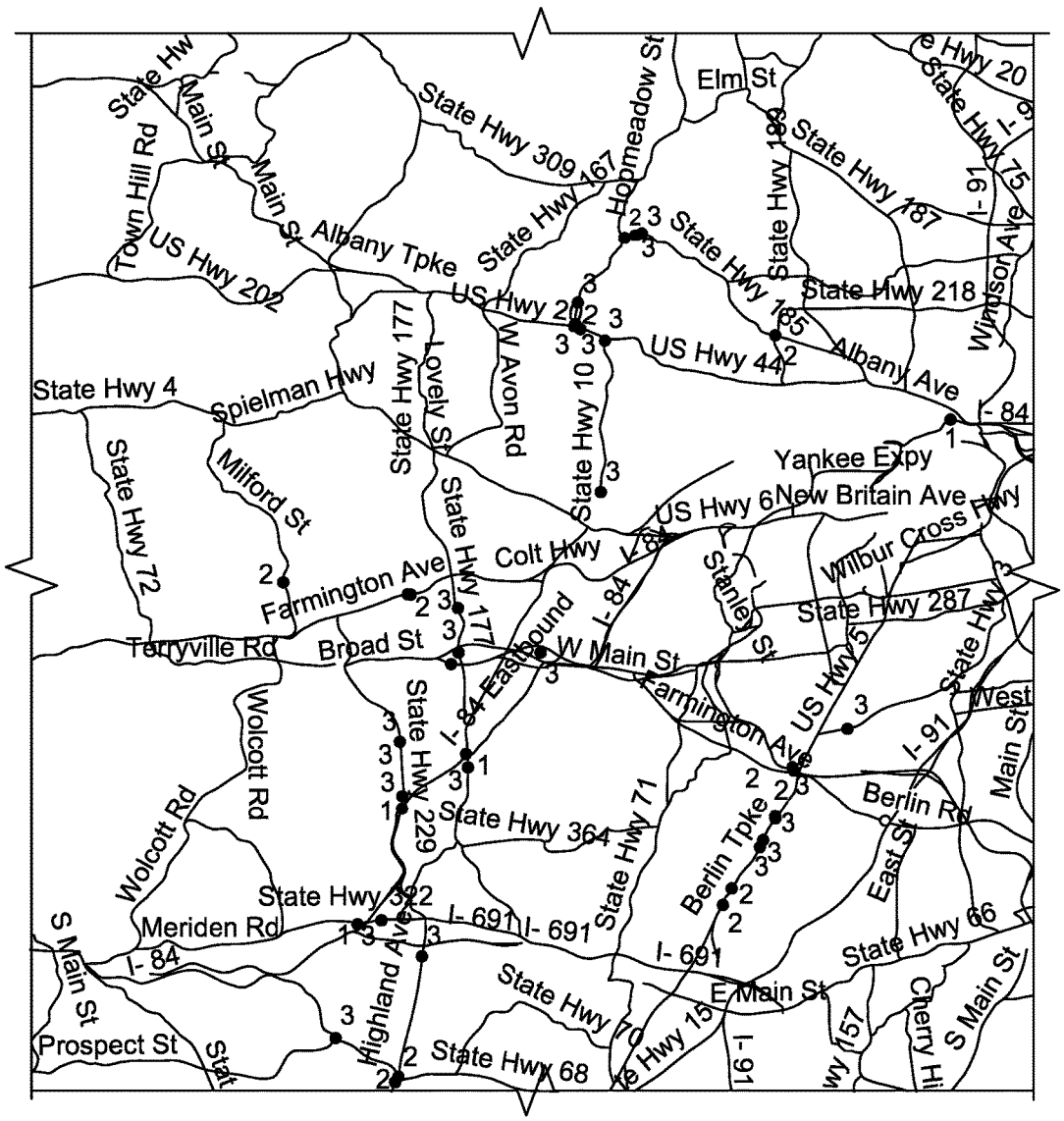
FIG. 24 shows an example graph for defining road segments that may be used for a road segment based calculation.

As described above, the relativity factors may be based on different units of area. In another example, the relativity factors may be determined relative to road segments traveled (e.g. braking per road segment). FIG. 24 shows an example graph for defining road segments that may be used for road segment based calculations. FIG. 24 shows a map with all of the listed roads in an area. As shown in FIG. 24, there may be highways, state roads, local roads, etc. The DPU 170 may be configured to categorize portions of each of these roads as a "segment." Alternatively, this information may be predetermined and sent to the DPU 170. The DPU 170 may assign values to each segment, wherein the value indicates whether a road segment is highway, urban or other. In the example given in FIG. 24, 1 represents other, 2 represents urban and 3 represents highway. The portions identified on FIG. 24 are shown as an example, however, road segment identification may be identified with more granularity and based on other factors. For example, the road segments may be categorized based on posted speed limits etc. For each category of road segment, the DPU 170 may include predetermined expected driving behaviors, such as acceleration, speed, braking, lane changes, etc. The DPU 170 receives telematics data concerning the location of the vehicle 140. The DPU 170 may use these designations to compare raw numbers, such as speed, braking etc. The segment lengths may be determined based on preselected highway segments.

Figure 25A:
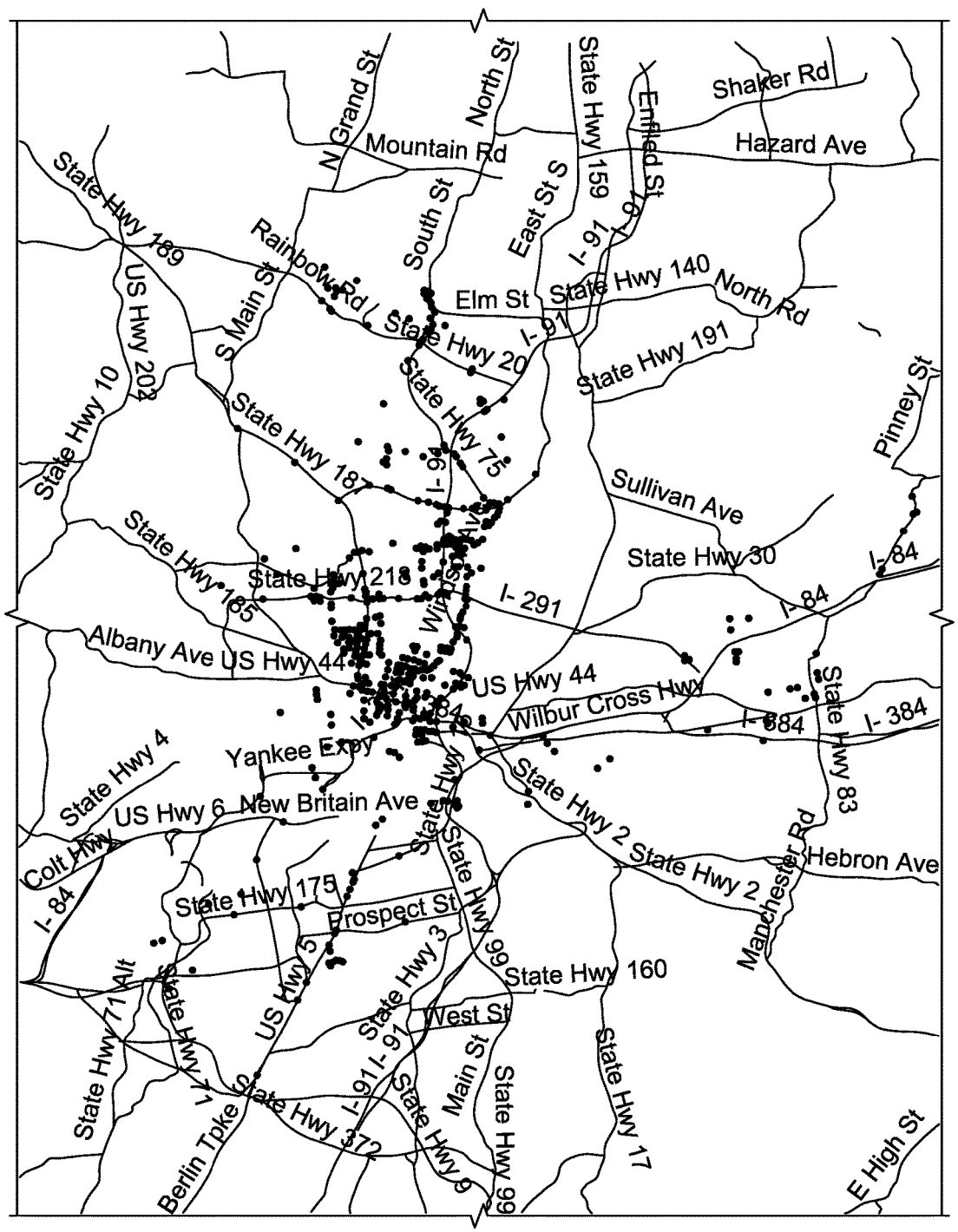
FIGS. 25A and 25B show example graphs showing high braking relativity per road segment and low braking relativity per road segment.
Figure 25B:
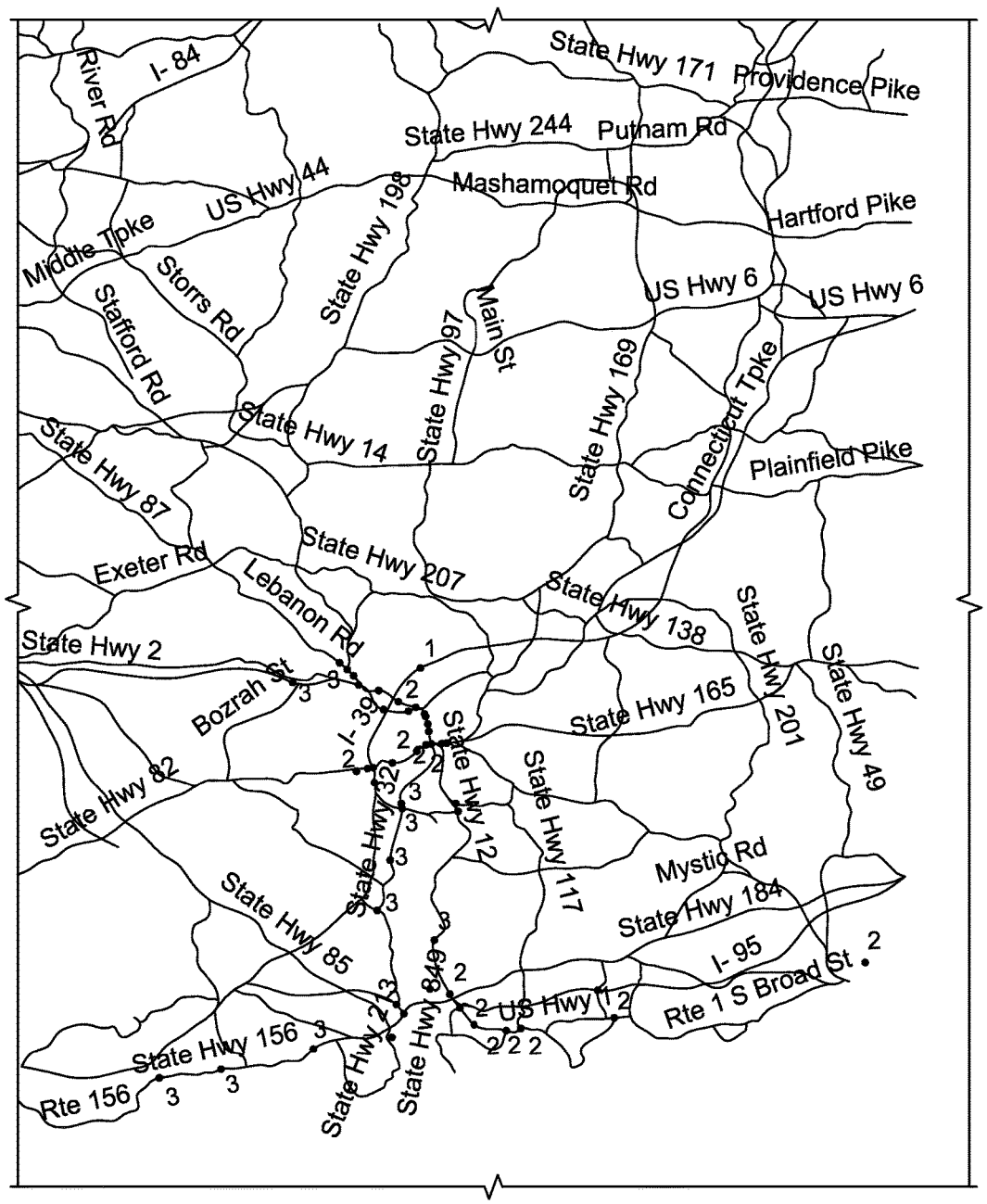

FIGS. 25A and 25B show example maps showing high braking relativity per road segment and low braking relativity per road segment, respectively. In general, the expectation for a driver is to break more in urban settings and less in highway settings. As noted above, the system 100 may be configured to use the telematics data to identify braking events. This may be determined by receiving information when the braking system is activated (e.g. by stepping on the brake) or by measuring the acceleration/deceleration of a vehicle, or the system may detect a change in speed greater than a predetermined threshold. Once a braking event is identified, the system 100 may also store the location of the braking event. This system 100 may correlate this information with the stored road segment information to determine the category of the road segment on which the braking event occurred. The DPU 170 may compare the number of observed braking events per each category of road segment with the expected braking events for this category of road segment. This may be measured in braking events/mile. The DPU 170 may then use this information to determine a breaking relativity factor. The DPU 170 may further be configured to determine breaking relativity relative to nearby drivers, or established rules of the road.

As shown in FIG. 25A, each of the square dots in the figure represents a detected braking event. The vehicle 140 is shown to have a concentration/frequency of braking events in a small area. The relativity factor is calculated relative to the expected braking for each category of road segment. A higher number of braking events is to be expected in an urban setting, which may have higher traffic and a higher number of obstacles. Accordingly, the relativity factor accounts for the category of road segment on which the braking has occurred. In the example shown, a high number of braking events have occurred on highways, which is likely to yield a higher braking relativity.

Regarding FIG. 25B, each of the numbered points in the figure represents a detected braking event. FIG. 25B shows a lower concentration/frequency of braking events. As discussed in reference to FIG. 25B, the concentration/frequency of braking events per road segment may be dependent on the category of the road segment. The DPU 170 calculates the breaking relativity, relative to the category of each of these road segments; accordingly, the total number of braking events in each category is weighted verses the expected number of braking events per mile in each category. The DPU 170 then determines a braking relativity factor that may be used to adjust the pricing information.

The system 100 may further include a user transmission device (not pictured) wherein the user transmission device may communicate insurance information, including pricing information, contractual information, information related to the telematics program, and other notifications. A user transmission device may include one or more modes of communication to reach a potential customer, current customer, or past customer or other similar user. For example, the user transmission device may be coupled with a printing device that is automatically mailed to the user. In another embodiment, the user transmission device may be coupled to a device to generate automatic telephone calls, or "robo-calls," or other similar communication mediums to communicate with the user. The user transmission device may further be configured to send e-mails to a user. The user device may further be configured to communicate via social media.

The system 100 may communicate this information during a renewal period. Additionally, the system 100 may be configured to proactively communicate this information and/or adjust the pricing information based on exposure changes determined by the system 100 that may occur within or outside of the renewal period.

The multivariate predictive model(s) may include one or more of neural networks, Bayesian networks (such as Hidden Markov models), expert systems, decision trees, collections of decision trees, support vector machines, or other systems known in the art for addressing problems with large numbers of variables. In embodiments, the predictive models are trained on prior data and outcomes using a historical database of insurance related data and resulting correlations relating to a same user, different users, or a combination of a same and different users. In embodiments of the present invention, the predictive model may be implemented as part of the DPU 170 or RPU 160 described with respect to FIG. 1.

Disclosed herein are processor-executable methods, computing systems, and related technologies for an insurance company to determine driver signatures and to determine risk and pricing information based on those driver signatures.

For example, an insurance customer may report that a first driver drives vehicle 1 100% of the time and a second and third driver split the use of vehicle 2. In this scenario, a high school student may be the first driver, and vehicle 1 may be an older used vehicle. The parents may be the second and third drivers, driving a new model high end vehicle. The high school student may drive the older vehicle to and from school, but use a parent's vehicle at night to meet friends. Alternatively, the high school student may frequently use the parent's vehicle on weekends. Whether that high school student is an excellent driver, initial pricing may be based upon the correlation of high school drivers and higher expected losses. In one example, an insurance company may generate pricing information on a worst case scenario, wherein the high school student drives the more expensive vehicle 100% of the time. In another example, the insurance company may generate pricing information based on a blended average of expected vehicle usage.

If an insurance company was able to determine how the vehicle is actually used, the insurance company may be able to apply causal data to the pricing analysis, and generate adjusted pricing information. Methods and apparatus described herein allow the insurance company to use telematics data and/or driver settings to determine driver signatures associated with each vehicle's use. These driver signatures may be used to determine the manner in which each vehicle is used. Further, these driver signatures may be used to determine the number of unique signatures associated with each vehicle. The system may assign an identity for each of the unique driving signatures for each vehicle. The system may further be configured to categorize driving segments as being driven by impaired drivers, unregistered drivers, or automatic (vehicle controlled) drivers. These driver signatures may be used for underwriting, pricing, claims, and fraud (Special Investigations Unit (SIU)) applications. This may include adjusting pricing information during scheduled insurance renewal periods as well as proactively adjusting pricing information based on exposure changes.

These exposure changes may include the addition or subtraction of a vehicle or drivers. The system may further be configured to determine that the individual or aggregate driver signatures have changed; this change may be compared to a threshold. Based on this comparison, the system may proactively adjust the pricing information.

In one embodiment, the driver signature information, determined based on telematics data, may be used to adjust insurance pricing information. For example, based on the usage of each vehicle, the system may adjust the insurance rate, provide a discount, or it may be used to credit or penalize the account. Because use of driver signatures may affect pricing, the uncertainty may cause individuals to be reluctant to join the program. Accordingly, the system may be configured to provide a discount to drivers that sign up for this program. Or it may be required for all vehicles for a household with high risk drivers. In another example, a user requesting a quote may be asked to provide telematics information prior to receiving a quote.

A system for monitoring vehicle usage parameters and using those parameters to access a driver signature is disclosed. The system comprises: a computer memory configured to store biographical information associated with at least one driver; a processor configured to receive information associated with telematics data, wherein the telematics data is associated with at least one of the vehicle(s), the telematics data providing information concerning use of the at least one vehicle(s); the processor further configured to access a preconfigured expected information from the stored biographical information associated with at least one driver and any previously received information associated with the telematics data; the processor further configured to determine discrete segments of use for the at least one vehicle(s) based on at least a portion of the received information associated with the telematics data, and to determine a driver signature associated with each of the discrete segments of use using a multivariate analysis based on at least a portion of the received information associated with the telematics data and comparing the at least a portion of the received information associated with the telematics data with the preconfigured expected information; the processor further configured to generate a driver risk assessment responsive to the at least one of the discrete segments of use; the processor further configured to calculate pricing information based at least in part on the at least one risk assessment and the biographical information; and a transmitter configured to transmit the pricing information to a user device or user transmission device, wherein the pricing information is automatically activated to cause the pricing information to be instituted to enable a pricing adjustment.

A computer implemented method for monitoring vehicle usage parameters and using those parameters to determine a driver signature is also disclosed. The method comprises: storing, by a computer memory, biographical information associated with at least one driver; receiving, by a processor, information associated with telematics data, wherein the telematics data is associated with at least one of the vehicle(s), the telematics data providing information concerning use of the at least one vehicle(s); accessing from a database a preconfigured expected information from the stored biographical information associated with at least one driver and any previously received information associated with the telematics data; determining, by the processor, discrete segments of use for at least one of the vehicle(s) based on at least a portion of the received information associated with the telematics data, and to determine a driver signature associated with each of the discrete segments of use using a multivariate analysis based on at least a portion of the received information associated with the telematics data and comparing the at least a portion of the received information associated with the telematics data with the preconfigured expected information; generating, by the processor, a driver risk assessment responsive to at least one of the discrete segments of use; calculating, by the processor, pricing information based at least in part on at least one driver risk assessment and the biographical information; and transmitting, by a transmitter, the pricing information to a user device or a user transmission device, wherein the pricing information is automatically activated to cause the pricing information to be instituted to enable a pricing adjustment.

A system for monitoring vehicle usage parameters and using those parameters to determine a driver signature for an account that covers at least one vehicle and at least one autonomous driver is also disclosed. The system comprises: a computer memory configured to store biographical information associated with at least one driver; a processor configured to receive information associated with telematics data, wherein the telematics data is associated with at least one of the vehicle(s), the telematics data providing information concerning use of the at least one vehicle(s); the processor further configured to access a preconfigured expected information from the stored biographical information associated with at least one driver and any previously received information associated with the telematics data; the processor further configured to determine discrete segments of use for the at least one vehicle(s) based on at least a portion of the received information associated with the telematics data, and to determine a driver signature associated with each of the discrete segments of use using a multivariate analysis based on at least a portion of the received information associated with the telematics data and comparing the at least a portion of the received information associated with the telematics data with the preconfigured expected information; the processor configured to determine which of the discrete segments are driven by the autonomous driver and which segments are driven by a human driver; the processor further configured to generate a driver risk assessment responsive to at least one of the discrete segments of use; the processor further configured to calculate pricing information based at least in part on the at least one driver risk assessment and the biographical information; and a transmitter configured to transmit the pricing information to a user device or user transmission device, wherein the pricing information is automatically activated to cause the pricing information to be instituted to enable a pricing adjustment.

Disclosed herein are processor-executable methods, computing systems, and related technologies for an insurance company to determine driver signatures and to determine risk and pricing information based on those driver signatures, as well as insurance companies accounting for autonomous and semi-autonomous vehicle operation.

The present invention provides significant technical improvements to technologies for an insurance company to determine driver signatures and to determine risk and pricing information based on those driver signatures, as well as insurance companies accounting for autonomous and semi-autonomous vehicle operation technology. The present invention is directed to more than merely a computer implementation of a routine or conventional activity previously known in the industry as it significantly advances the technical efficiency, access and/or accuracy of technologies for an insurance company to determine driver signatures and to determine risk and pricing information based on those driver signatures, as well as insurance companies accounting for autonomous and semi-autonomous vehicle operation by implementing a specific new method and system as defined herein. The present invention is a specific advancement in the area of technologies for an insurance company to determine driver signatures and to determine risk and pricing information based on those driver signatures, as well as insurance companies accounting for autonomous and semi-autonomous vehicle operation by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems.

Again, for example, an insurance customer may report that a first driver drives vehicle 1 100% of the time and a second and third driver split the use of vehicle 2. In this scenario, a high school student may be the first driver, and vehicle 1 may be an older used vehicle. The parents may be the second and third drivers, driving a new model high end vehicle. The high school student may drive the older vehicle to and from school, but use a parent's vehicle at night to meet friends. Alternatively, the high school student may frequently use the parent's vehicle on weekends. Whether that high school student is an excellent driver, initial pricing may be based upon the correlation of high school drivers and higher expected losses. In one example, an insurance company may generate pricing information on a worst case scenario, wherein the high school student drives the more expensive vehicle 100% of the time. In another example, the insurance company may generate pricing information based on a blended average of expected vehicle usage.

If an insurance company was able to determine how the vehicle is actually used, the insurance company may be able to apply causal data to the pricing analysis, and generate adjusted pricing information. Methods and apparatus described herein allow the insurance company to use telematics data and/or driver settings to determine driver signatures associated with each vehicle's use. These driver signatures may be used to determine the manner in which each vehicle is used. Further, these driver signatures may be used to determine the number of unique signatures associated with each vehicle. The system may assign an identity for each of the unique driving signatures for each vehicle. The system may further be configured to categorize driving segments as being driven by impaired drivers, unregistered drivers, or automatic (vehicle controlled) drivers. These driver signatures may be used for underwriting, pricing, claims, and fraud (Special Investigations Unit (SIU)) applications. This may include adjusting pricing information during scheduled insurance renewal periods as well as proactively adjusting pricing information based on exposure changes.

These exposure changes may include the addition or subtraction of a vehicle or drivers. The system may further be configured to determine that the individual or aggregate driver signatures have changed; this change may be compared to a threshold. Based on this comparison, the system may proactively adjust the pricing information.

In one embodiment, the driver signature information, determined based on telematics data, may be used to adjust insurance pricing information. For example, based on the usage of each vehicle, the system may adjust the insurance rate, provide a discount, or it may be used to credit or penalize the account. Because use of driver signatures may affect pricing, the uncertainty may cause individuals to be reluctant to join the program. Accordingly, the system may be configured to provide a discount to drivers that sign up for this program. Or it may be required for all vehicles for a household with high risk drivers. In another example, a user requesting a quote may be asked to provide telematics information prior to receiving a quote.

Autonomous vehicles may provide a decrease in accidents, while potentially driving up the cost of the accidents that remain. Other benefits of autonomous cars include increasing mobility for people who cannot drive today and solving parking issues in urban areas, since the cars can go off and park somewhere else. Insuring the vehicles that include these technologies may require alternate models from those used by the insurance industry today. Because the use of autonomous vehicles may decrease accident rates, the system may adjust the insurance rate, provide a discount, or it may be used to credit or penalize the account. Because these autonomous technologies are new and the idea of a car controlling itself is a bit unsettling to humans, individuals may be reluctant to use the autonomous features of the vehicle. An accounting may be performed to determine if autonomous features are actually enabled during the vehicle's use. Accordingly, the system may be configured to provide a discount to drivers that buy and enable autonomous features.

A system configured to determine a premium associated with an account that covers at least one vehicle including at least one autonomous feature is disclosed. The system comprises: a computer memory that stores biographical information at least including information regarding the at least one autonomous feature; a processor that receives information associated with telematics data associated with at least one of the vehicle(s), concerning use of the at least one autonomous feature; the processor further configured to generate a vehicle signature relativity responsive to the received information and the stored biographical information; the processor further configured to calculate pricing information based at least in part on the vehicle signature relativity; and a transmitter configured to transmit the pricing information to a user device.

A method, implemented in a computer system, for determining a premium associated with an account that covers at least one vehicle including at least one autonomous feature and at least one driver is disclosed. The method comprises: storing, by a computer memory, biographical information associated with at least including information regarding the at least one autonomous feature; receiving, by a processor, information associated with telematics data, wherein the telematics data is associated with at least one of the vehicle(s), the telematics data providing information concerning use of the at least one autonomous feature; generating, by the processor, a vehicle signature relativity responsive to the received information and the stored biographical information; calculating, by the processor, pricing information based at least in part on the vehicle signature relativity; and transmitting, by a transmitter, the pricing information to a user device.

A system configured to determine a premium associated with an account that covers at least one vehicle and at least one autonomous driver is disclosed. The system comprises: a computer memory configured to store biographical information associated with at least one driver; a processor configured to receive information associated with telematics data, wherein the telematics data is associated with at least one of the vehicles, the telematics data providing information concerning use of the at least one vehicles; the processor further configured to generate a vehicle signature responsive to the received information and the stored biographical information; the processor further configured to calculate pricing information based at least in part on the vehicle signature; and a transmitter configured to transmit the pricing information to a user device.

Disclosed herein are processor-executable methods, computing systems, and related technologies for determining expectation based processing and to determine risk and pricing information based on those ratings. The system may be configured to supplement or replace correlative values (i.e. proxies) with causation variables which may be directly based on telematics in combination with loss data. The resultant pricing information may be presented to the user.

During a registration phase for auto insurance, an insurance company or an insurance agent may request biographical data. This biographical data is entered in a database and compared with actuarial data. The system collects, from the user during the registration phase biographical data, such as: Name, Age, Gender, Occupation, Vehicle, Driving History, Geographical Location, Grades if the driver is a student), and frequency of use of the vehicle. Using software based algorithms, using actuarial data, the biographical information is analyzed to generate the initial risk profile. Table 27, below, shows an example initial risk profile for a driver. In the example shown in Table 27, the initial risk profile is compared to a computationally predetermined hypothetical driver. The hypothetical driver, for example, may be a statistically average risk driver for which no penalties or credits would be awarded to, during the registration process.

TABLE 27

Initial Risk Profile for a 16 Year Old Male with
a C+ School Average

| Behavior | Variance from hypothetical driver | Premium Adjustment |
|---|---|---|
| Speeding | +60% | 1.1 |
| Braking | +60% | 1.1 |
| Driving Late at Night | −4% | .99 |
| Driving In Traffic | −9% | .96 |
| Lane Changes per Mile | +85% | 1.8 |
| Total Miles | 2000 | 1.4 |

As shown above, the risk profile contains specific risk behaviors that have been determined to affect the frequency and severity of potential accidents. Based on the received biographical information, the system 100 calculated risk factors for each of these behaviors. The variances from the hypothetical may be based on absolute or relative factors. For example speeding may be determined based on absolute speed, relative to posted speed limits, or speed relative to other nearby drivers. Similarly the variance for the other factors may be analyzed on an absolute or relative basis.

To replace or enhance one or more proxies for driving behavior, a vehicle 140 is equipped with a TrueLane® device that is configured to receive telematics data from one or more telematics devices regarding the actual driving behavior. In one embodiment, the vehicle 140 or the system 100 is configured to determine the identity of the driver.

The system receives the telematics data from the TrueLane® device and compares the measured value with the initial driver expectations. The system may then generate an updated risk profile, based on measured values. An updated risk profile, incorporating telematics data is shown in Table 28.

TABLE 28

Updated Risk Profile for a 16 Year Old Male with a C+
School Average

| Behavior | Expectation | Measured Behavior | Initial Premium Adjustment | Premium Adjustment |
|---|---|---|---|---|
| Speeding | +60% | +40% | 1.1 | 1.05 |
| Braking | +60% | +40% | 1.1 | 1.05 |
| Driving Late at Night | −4% | 0% | .99 | 1 |
| Driving In Traffic | −9% | 2% | .96 | 1.03 |
| Lane Changes per Mile | +85% | +40% | 1.8 | 1.3 |
| Total Miles | 2000 | 432 | 1.4 | .9 |

As a simple, single variable example. For the example above shown in Table 28, the 16 year old driver is expected to drive 2000 miles a year. However, the measured mileage is much less (432). The system 100 may be configured to determine, based on one or more variables, whether to adjust the rate or credit or penalize the driver in the pricing. In the simple case above, if total miles driven were the only important metric, the driver may be in a position to receive a significant discount as soon as the system 100 determines that he will not be driving the expected 2000 miles. In a more complex case, a multivariate analysis may be used incorporating multiple factors, wherein the initial premium may assume this driver would be worse based on the initial driving profile. But measured results allow the insurance company to replace these proxies with actual measured data.

A system for automatically activating dynamically updated insurance pricing information based on telematics data associated with a vehicle is disclosed. The system comprises: a computer memory configured to store an initial risk profile for a driver of the vehicle based on a correlation between received biographical information of the driver and stored claim expected loss information, wherein the initial risk profile includes a plurality of risk factors with associated expected scores for the driver; a processor configured to generate a driver proxy score (DPS) based on a combination of rating variables in an insurance class plan; the processor, configured to receive information associated with telematics data received from a telematics device, wherein the telematics data includes data associated with the plurality of risk factors; the processor further configured to determine a driver telematics score (DTS) based on the information associated with the telematics data; the processor further configured to generate an expectation based rating, based on the DPS and the DTS, which measures a variance of the received telematics data information and the initial risk profile for each of the plurality of risk factors; the processor further configured to update pricing information based on the generated expectation based rating; and a transmitter configured to transmit the updated pricing information to a user device and the update based on the generated expectation based rating to the computer memory, wherein the update is automatically activated to cause the updated pricing information to be instituted to enable a pricing adjustment of a policy.

A computer based method for automatically activating dynamically updated insurance pricing information based on telematics data associated with a vehicle is disclosed. The method comprises: storing, by a computer memory, an initial risk profile for a driver of the vehicle based on a correlation between received biographical information of the driver and claim expected loss information, wherein the initial risk profile includes a plurality of risk factors and with associated expected scores for the driver; generating, by a processor, a driver proxy score (DPS) based on a combination of rating variables in an insurance class plan; receiving, by the processor, information associated with telematics data received from a telematics device, wherein the telematics data includes data associated with the plurality of risk factors; determining, by the processor, a driver telematics score (DTS) based on the information associated with the telematics data; generating, by the processor, an expectation based rating, based on the DPS and the DTS, which measures a variance of the received telematics data information and the initial risk profile; updating, by the processor, pricing information based on the generated expectation based rating; and transmitting, by a transmitter, updated pricing information to a user device and the update based on the generated expectation based rating to the computer memory, wherein the update is automatically activated to cause the updated pricing information to be instituted to enable a pricing adjustment of a policy.

A system for automatically activating dynamically updated insurance pricing information based on telematics data associated with a vehicle is disclosed. The system comprises: a computer memory configured to store an initial risk profile for a driver of the vehicle based on an insurance class plan responsive at least in part to expected claim loss information, wherein the class plan is based on a plurality of risk factors with associated expected scores for the driver; a processor configured to generate at least one driver proxy risk factor score based on the insurance class plan; the processor, configured to receive information associated with telematics data received from a telematics device, wherein the telematics data includes data associated with at least one of the risk factors in the class plan; the processor further configured to generate an expectation based rating, responsive to the at least one driver proxy risk factor score and the telematics data information, which measures a variance of the received telematics data information associated with the at least one risk factor and the class plan expected risk factor scores; the processor further configured to update pricing information based on the generated expectation based rating; and a transmitter configured to transmit the updated pricing information to a user device and the update based on the generated expectation based rating to the computer memory, wherein the update is automatically activated to cause the updated pricing information to be instituted to enable a pricing adjustment of a policy.

Disclosed herein are processor-executable methods, computing systems, and related technologies for destination based underwriting, wherein the pricing for coverage may be modified based on the determined destinations of a vehicle, the length of time and the time of day the vehicle remains at each destination.

Telematics data, such as the destination may be used to determine a risk score associated with one or more coverages, such as bodily injury liability, property damage liability, medical payments, uninsured motorist protection, collision coverage and comprehensive (physical damage). For example, the telematics data may be used to determine a risk score associated with comprehensive coverage. In this example, a location risk factor, entitled driving location risk information (DLRI) score may be used to adjust pricing information based on the destination.

For example, the system may receive real time theft, weather, vehicle damage, and other information from a vendor. Based on this information, the system may determine a risk associated with each destination. For example, the system may determine that a vehicle is parked in a location with frequent hail storms. This system may determine this location may be a higher risk for loss regarding comprehensive coverage. However, the system may also determine that the vehicle is parked in a garage, which mitigates the risk. The system may use these types of factors to adjust the insurance pricing information.

As the term is used herein, the term destination may refer to any location at which a vehicle is stopped for a predetermined period of time or based on a triggering event. For example, the telematics device may report on the location of the vehicle at predetermined intervals (e.g. 1 minute, 30 seconds, 1 second, continuously, etc.). The telematics device may further be configured to report on the location of the vehicle based on triggering events (starting the ignition etc.). The system may determine that a vehicle is at a destination, if stoppage occurs for more than a predetermined amount of time, or the vehicle is turned off.

During a registration phase for vehicle insurance, an account template is opened for a potential customer. The insurance company or an insurance agent may request biographical data, for example via a webpage, to populate information in the account template. The biographical data, may include: name, age, gender, occupation, vehicle, driving history, geographical location, grades if the driver is a student), and frequency of use of the vehicle. Once the account template is completed, the biographical data stored in the account template is formatted and stored in a database. The system, using software based statistical analysis (e.g. regression analysis) compares the biographical data with actuarial data stored in the system. This actuarial data may include statistical data related to insurance pricing and may include loss data. The system, using the results of the statistical analysis generates an initial risk assessment for the account. As an example, the risk assessment may be categorized by vehicle or by driver. This risk assessment may ultimately be used to determine whether to offer coverage, and the rate associated with the coverage.

In states where it is permissible by law, one factor that may be used in generating a risk assessment is the location in which the individual lives or the vehicle is reported to be garaged. However, the methods and apparatus described herein allow the insurance company to generate pricing information based on the distribution of locations where a vehicle was stored for any significant periods of time.

As will be described in greater detail below, telematics data is collected from the vehicle, providing the insurance company with information such as the vehicle destination, the time of day the vehicle is located at a destination, and the duration for which the vehicle is located at the destination.

The telematics data may be analyzed, based on stored information, to determine direct exposure to risks (e.g. theft, vandalism, high traffic areas) as well as indirect exposure to risks (where location is assessed to be a higher risk destination based on loss experience). A computer system may calculate pricing information based on the direct exposure risks and indirect exposure risks associated with the vehicle destinations. The pricing information may be for an overall policy adjustment or for specific coverage, such as comprehensive or uninsured motorist protection.

The telematics data may be received for a predetermined time period. In one example, a telematics device may be installed in a vehicle for a six month period over which the telematics data is collected. Because of seasonal changes in driving patterns, (e.g., for students, no school during summer time), the data processing unit 170 may be configured to account for these differences and compensate for seasonal variations by weighting the time frame of the use. Alternatively, the telematics device may be installed for a full year, or be permanently installed. In another embodiment, a software application installed on a mobile phone or other personal wireless device may be configured to generate the telematics data and communicate with the system 100.

A system for automatically activating a dynamic adjustment based on a vehicle's telematics data is disclosed. The system comprises: a receiver, configured to receive information associated with telematics data related to the vehicle; a processor configured to determine, based at least in part on the telematics data, that the vehicle has reached a destination, a length of time spent at the destination and a time of day during which the vehicle is at a location and store in a computer memory; the processor further configured to determine a direct exposure rating for the vehicle based on at least a determined destination, the length of time spent at the destination, and the time of day during which the vehicle is at the location; the processor further configured to adjust an insurance pricing information related to the vehicle based on the direct exposure rating; and a transmitter configured to transmit the adjusted pricing information to a user device and the adjustment associated with the direct exposure rating to the computer memory; and wherein the adjustment is automatically activated to cause the adjustment to be instituted to enable a pricing adjustment of a policy.

A computer based method for automatically activating a dynamic adjustment based on a vehicle's telematics data is disclosed. The method comprises: receiving, by a receiver, information associated with telematics data related to the vehicle; determining, by a processor, based at least in part on the telematics data, that the vehicle has reached a destination, a length of time spent at the destination and times of day during which the vehicle is at a location and storing in a computer memory; determining, by the processor, a direct exposure rating based on at least the determined destination, the length of time spent at the destination, and the times of day during which the vehicle is at the location; adjusting, by the processor, insurance pricing information associated with the vehicle based on the direct exposure rating; and transmitting, by a transmitter, the adjusted pricing information to a user device and the adjustment associated with the direct exposure rating to the computer memory, wherein the adjustment is automatically activated to cause the adjustment to be instituted to enable an electronic pricing adjustment of a policy database.

A system for automatically activating a dynamic adjustment based on a vehicle's telematics data is disclosed. The system comprises: a receiver, configured to receive information associated with telematics data related to the vehicle; a processor configured to determine, based at least in part on the telematics data, a direct exposure rating for the vehicle based on at least the determined destination and the length of time spent at the destination and store in a computer memory; the processor further configured to determine, based at least in part on the telematics data, an indirect exposure rating for the vehicle based on at least the determined destination and the length of time spent at the destination; and the processor further configured to adjust an insurance pricing information related to the vehicle based on the direct and indirect exposure rating and the adjustment associated with the direct and indirect exposure rating to the computer memory, wherein the adjustment is automatically activated to cause the adjustment to be instituted to enable a pricing adjustment of the policy.

Disclosed herein are processor-executable methods, computing systems, and related technologies for telematics based underwriting.

In one example, the processor-executable methods and computing systems are configured to use relativity information in the underwriting process. The system may determine expected losses based on loss experience and actual driving behavior.

During a registration phase for vehicle insurance, an account template is opened for a potential customer. The insurance company or an insurance agent may request biographical data, for example via a webpage, to populate information in the account template. The biographical data, may include: name, age, gender, occupation, vehicle, driving history, geographical location, grades if the driver is a student), and frequency of use of the vehicle. Once the account template is completed, the biographical data stored in the account template is formatted and stored in a database. The system, using software based statistical analysis (e.g. regression analysis) compares the biographical data with actuarial data stored in the system. This actuarial data may include demographic data related to insurance pricing and may include loss data. The system, using the results of the statistical analysis generates an initial risk assessment for the account. As an example, the risk assessment may be categorized by vehicle or by driver. This risk assessment may ultimately be used to determine whether to offer coverage, the rate associated with the coverage, and discount or penalize the rate associated with the coverage.

As will be greater described in detail below, telematics data is collected from the vehicle, providing the insurance company with information such as speed, acceleration, deceleration, left turns, right turns, braking, time of day, mileage, and location.

The telematics data may be analyzed based on stored demographic information, to determine a plurality of relativity factors. These relativity factors may be based on speeding, braking, acceleration, turns, mileage, time of day analysis, driving location risk, distracted driving, hot spot driving, and the types of weather during driving. Further these relativity factors may be numeric value(s) for a type of measured driving behavior. The relativity factor may be relative to other drivers within the same demographic, driving on the same or similar roads under the same or similar conditions, or to the posted speed limit, or driving regulations. Based on the determined relativity factors, the system can determine a discount relativity factor. A computer system then uses a multivariate analysis to generate an adjusted risk score based on the results of this analysis. This risk score may be used to determine adjusted rates. The adjusted rates may be for an overall policy adjustment or for specific coverage, such as for property damage liability, medical payments, uninsured motorist protection, collision coverage, and comprehensive physical damage more accurately.

The telematics data may be received for a predetermined time period. In one example, a telematics device may be installed in a vehicle for a six month period over which data is collected. Because of seasonal changes in driving patterns, (e.g. for students no school during summer time), the DCU 110 may be configured to account for these differences and compensate for seasonal variations by weighting the time frame of the use, using a seasonality factor. Alternatively, the telematics device may be installed for a full year, or be permanently installed. In another embodiment, a software application installed on a mobile phone or other wireless device may be configured to generate the telematics data and communicate with the system 100.

A system for automatically activating a dynamic adjustment based on a vehicle's telematics data is disclosed. The system comprises: a computer memory for storing biographical information associated with one or more drivers related to the vehicle, the biographical information including an expected total mileage driven by the vehicle, the computer memory further configured to store an initial risk assessment based on at least on the expected total mileage driven; a receiver configured to receive information associated with a vehicle's related telematics data indicating at least vehicle location and a time stamp; a processor configured to determine, based at least in part on the vehicle's related telematics data, a plurality of relativity factors including at least braking relativity, speeding relativity and mileage relativity, wherein each of the plurality of relativity factors is a numerical value generated based on a comparison of the information associated with the received telematics data for the vehicle with other vehicles' corresponding telematics related data; the processor further configured to calculate a product of the plurality of relativity factors and compare the product with a predetermined threshold; the processor further configured to adjust insurance pricing information based on the calculated comparison; and a transmitter configured to transmit the adjusted insurance pricing information to a user device and the adjustment associated with the calculated comparison to the computer memory, wherein the adjustment is automatically activated to cause the adjustment to be instituted to enable a pricing adjustment of the policy.

A computer based method for automatically activating a dynamic adjustment based on a vehicle's telematics data is disclosed. The method comprises: storing, by a computer memory, biographical information associated with one or more drivers related to the vehicle, the biographical information including an expected total mileage driven by the vehicle, the computer memory further configured to store an initial risk assessment based at least on the expected total mileage driven; receiving, by a receiver, information associated with a vehicle's related telematics data indicating at least vehicle location and speed and a time stamp; determining, by a processor, a plurality of relativity factors including at least braking relativity, speeding relativity and mileage relativity, based at least in part on the telematics data, wherein relativity factors are numerical values generated based on a comparison of the information associated with the received telematics data for the vehicle with other vehicle's corresponding telematics related data; calculating, by the processor, a product of the plurality of relativity factors and compare the product with a predetermined threshold; and adjusting, by the processor, an insurance pricing information based on the calculated comparison; and transmitting, by a transmitter, the adjusted insurance pricing information to a user device and the adjustment associated with the calculated comparison to the computer memory, wherein the adjustment is automatically activated to cause the adjustment to be instituted to enable a pricing adjustment of the policy.

A system for automatically activating an adjustment based on a vehicle's telematics data is disclosed. The system comprises: a computer memory for storing biographical information associated with one or more drivers related to the vehicle; a receiver configured to receive information associated with a vehicle's related telematics data indicating at least two insurance risk factors; a processor configured to determine, based at least in part on the telematics data, a plurality of relativity factors including at least braking relativity, speeding relativity and mileage relativity, wherein each of the plurality of relativity factors is generated based on a comparison of the risk factor information associated with the received telematics data for the vehicle with a plurality of other vehicles' corresponding telematics related data; the processor further configured to adjust insurance pricing information based at least in part on the calculated comparison; and a transmitter configured to transmit the adjusted insurance pricing information to a user device and the adjustment associated with the calculated comparison to the computer memory, wherein the adjustment is automatically activated to cause the adjustment to be instituted to enable a pricing adjustment of the policy.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or BLURAY-DISC, or other type of device for electronic data storage.

Although the methods and features described above with reference to FIGS. 2-25 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-25 may be used alone without the other features and elements or in various combinations with or without other features and elements. Sub-elements of the methods and features described above with reference to FIGS. 1-25 may be performed in any arbitrary order (including concurrently), in any combination or sub-combination.

What is claimed is:

1. A system configured to monitor use conditions of a vehicle and provide feedback to a user of the vehicle to maintain use within certain parameters, said system comprising:

a plurality of sensors located proximate to the vehicle, each sensor configured to monitor at least one vehicle parameter, each sensor generating a signal encapsulating the monitored vehicle parameter;

a control unit that receives the generated signal from each of a plurality of sensors, the control unit selectively combining the received signal with other signals received from others of the plurality of sensors;

a transmitter coupled to the control unit capable of transmitting the selectively combined signal;

a transceiver remote from the vehicle that receives the transmitted selectively combined signal and a processor that processes the selectively combined signal to capture the signal from each of the plurality of sensors, and compares the condition identified by the captured signals to received conditions from other vehicles and provides a signal to the transceiver to broadcast to the vehicle providing feedback to adjust the use of the vehicle based on the comparison, wherein the comparison of the condition utilizes a plurality of relativity factors, wherein each of the relativity factors is a numerical value generated based on the comparison of the condition for the vehicle to the conditions for other vehicles corresponding conditions; and a user interface for providing feedback to a user including at least one indication associated with the signal.

2. The system of claim 1 wherein the feedback is at least one of a visual indication and an audible indication.

3. The system of claim 1 wherein the feedback is provided to cause a physical alteration of the use of the vehicle.

4. The system of claim 3 wherein physically altering the use of the vehicle includes at least one of applying the brakes, shutting down cylinders, lowering the volume of the radio, reducing fuel consumption, and steering from a location.

5. The system of claim 1 wherein at least one of the plurality of sensors is an accelerometer, a speed sensor, and a location sensor.

6. The system of claim 1 wherein at least one of the plurality of sensors monitors distance traveled.

7. The system of claim 1 wherein at least one of the plurality of sensors are coupled to the control unit with a controller area bus (CAN).

8. The system of claim 1 wherein the control unit utilizes a database for storage of the signal in the control unit memory.

9. The system of claim 1 wherein the transmitter transmits over an RF network.

10. The system of claim 1 wherein the comparison of the condition further includes initial conditions for the vehicle.

11. The system of claim 1 wherein one of the plurality of relativity factors is a driving location relativity factor that is numerical based at least in part on a zip code in which the vehicle is located.

12. The system of claim 1, wherein one of the plurality of relativity factors is a braking relativity factor that is a numerical value based at least in part on a measured number of braking events over a road segment.

13. The system of claim 1, wherein one of the plurality of relativity factors is a speeding relativity factor that is a numerical value based at least in part on a measured speed of the vehicle.

14. The system of claim 13, wherein the speeding relativity factor is relative to a posted speed limit.

15. The system of claim 13, wherein the speeding relativity factor is relative to other nearby drivers.

16. The system of claim 1, wherein one of the plurality of relativity factors is a mileage relativity factor that is a numerical value based at least in part on a measured mileage driven over a predetermined time range.

17. The system of claim 1, wherein one of the plurality of relativity factors is a time of day relativity factor that is a numerical value based at least in part on a measured time of day during which the vehicle is driven.

18. A method for monitoring use conditions of a vehicle and providing feedback to a user of the vehicle to maintain use within certain parameters, said method comprising:

monitoring at least one vehicle parameter with one of a plurality of sensors located proximate to the vehicle;

generating a signal encapsulating the monitored vehicle parameter;

transmitting the generated signal to a control unit;

receiving the generated signal at the control unit from each of a plurality of sensors, and selectively combining the received signal with other signals received from others of the plurality of sensors;

transmitting the combined signal with a transmitter coupled to the control unit;

receiving the combined signal by a transceiver remote from the vehicle;

processing the received combined signal to capture the signal from each of the plurality of sensors;

comparing, via a processor, the condition identified by the captured signals to received conditions from other vehicles, wherein the comparison of the condition utilizes a plurality of relativity factors, wherein each of the relativity factors is a numerical value generated based on the comparison of the condition for the vehicle to the conditions for other vehicle's corresponding conditions; and providing a signal to the transceiver to broadcast to the vehicle to provide feedback to adjust the use of the vehicle based on the comparison the signal being sent to provide feedback to the user.

19. A system configured to monitor use conditions of a vehicle and provide feedback, said system comprising:

a plurality of sensors located proximate to the vehicle, each sensor configured to monitor at least one vehicle parameter, each sensor generating a signal encapsulating the monitored vehicle parameter;

a control unit that receives the generated signal from each of a plurality of sensors, the control unit selectively combines the received signal with other signals received from others of the plurality of sensors;

a transmitter coupled to the control unit capable of transmitting the combined signal;

a transceiver remote from the vehicle that receives a transmitted combined signal, and a processor that processes the combined signal to capture the signal from each of the plurality of sensors, and compares the condition identified by the captured signals to preconfigured expected information to identify a driver of a plurality of driven segments;

a database for storing the captured signals as a plurality of attributes of the identified driver based on the preconfigured expected information; and the transceiver for providing at least one of the plurality of attributes of the identified driver to the identified driver as feedback on the driver's driving.

20. The system of claim 19 wherein the database storing by identified driver improves at least one of efficiency and power usage of the processor in accessing and using the signals.

* * * * *